(12) United States Patent
Walker et al.

(10) Patent No.: US 9,064,321 B2
(45) Date of Patent: *Jun. 23, 2015

(54) IMAGING OR COMMUNICATIONS SYSTEM UTILIZING MULTISAMPLE APODIZATION AND METHOD

(71) Applicant: University of Virginia Patent Foundation, Charlottesville, VA (US)

(72) Inventors: William F. Walker, Charlettesville, VA (US); Drake A. Guenther, Dublin, OH (US); Kevin Owen, Crozet, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/293,771

(22) Filed: Jun. 2, 2014

(65) Prior Publication Data

US 2014/0348442 A1 Nov. 27, 2014

Related U.S. Application Data

(63) Continuation of application No. 12/371,911, filed on Feb. 16, 2009, now Pat. No. 8,744,155.

(60) Provisional application No. 61/029,329, filed on Feb. 16, 2008, provisional application No. 61/049,244, filed on Apr. 30, 2008.

(51) Int. Cl.
*G06K 9/40* (2006.01)
*G06T 5/00* (2006.01)
*G01S 7/52* (2006.01)
*G01S 15/89* (2006.01)
*G10K 11/34* (2006.01)

(52) U.S. Cl.
CPC ............. *G06T 5/009* (2013.01); *G01S 7/52046* (2013.01); *G01S 15/8927* (2013.01); *G10K 11/346* (2013.01); *G06T 5/002* (2013.01); *G06T 2207/10132* (2013.01); *G06T 2207/20024* (2013.01)

(58) Field of Classification Search
None
See application file for complete search history.

(56) References Cited

U.S. PATENT DOCUMENTS

| 6,031,672 | A | 2/2000 | Bergquist et al. |
| 8,744,155 | B2 | 6/2014 | Walker et al. |
| 2009/0299184 | A1 | 12/2009 | Walker et al. |

OTHER PUBLICATIONS

"U.S. Appl. No. 12/371,911, Notice of Allowance mailed Feb. 20, 2014", 13 pgs.
"U.S. Appl. No. 12/371,911, Response filed Jan. 6, 2014 to Restriction Requirement mailed Sep. 19, 2013", 11 pgs.
"U.S. Appl. No. 12/371,911, Restriction Requirement mailed Sep. 19, 2013", 7 pgs.

*Primary Examiner* — Atiba O Fitzpatrick
(74) *Attorney, Agent, or Firm* — Schwegman Lundberg & Woessner, P.A.

(57) ABSTRACT

Methods, systems and system components for optimizing contrast resolution of an imaging or sensing system utilizing multiple channels of broadband data associated with an array of transducers. Channels of data are filtered by passing the channels of data through finite impulse response (FIR) filters on each channel. The filters each have multiple taps having tap weights pre-calculated as a function of distance of the array from an object that energy is being transmitted to or reflected from. The weights are pre-computed through a deterministic equation based on an a priori system model.

20 Claims, 41 Drawing Sheets

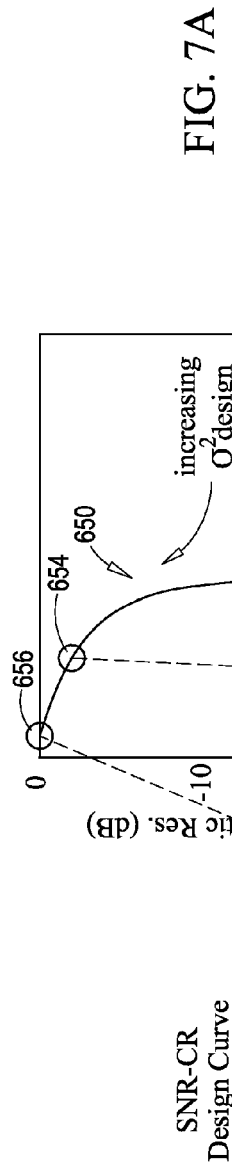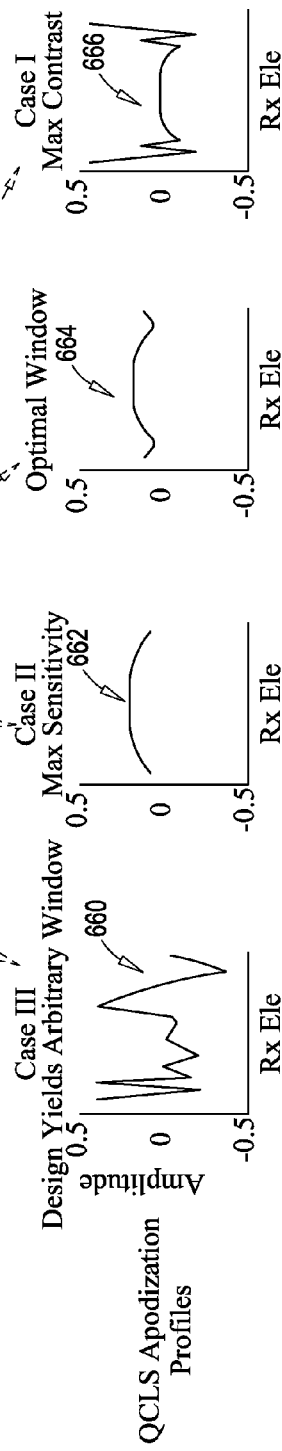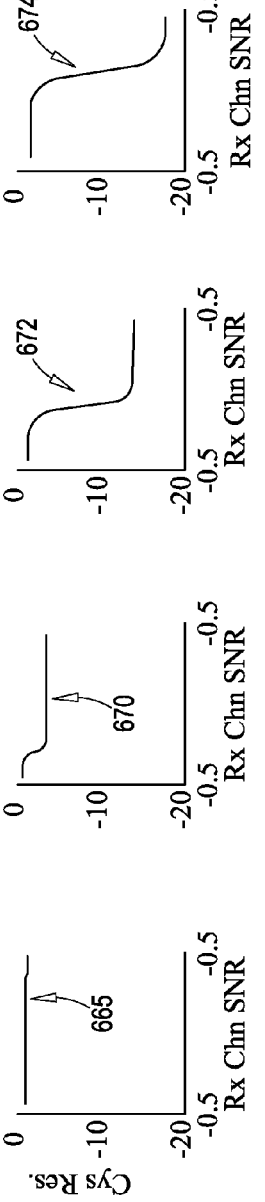
FIG. 7A
FIG. 7B
FIG. 7C
FIG. 7D
FIG. 7E
FIG. 7F
FIG. 7G
FIG. 7H
FIG. 7I

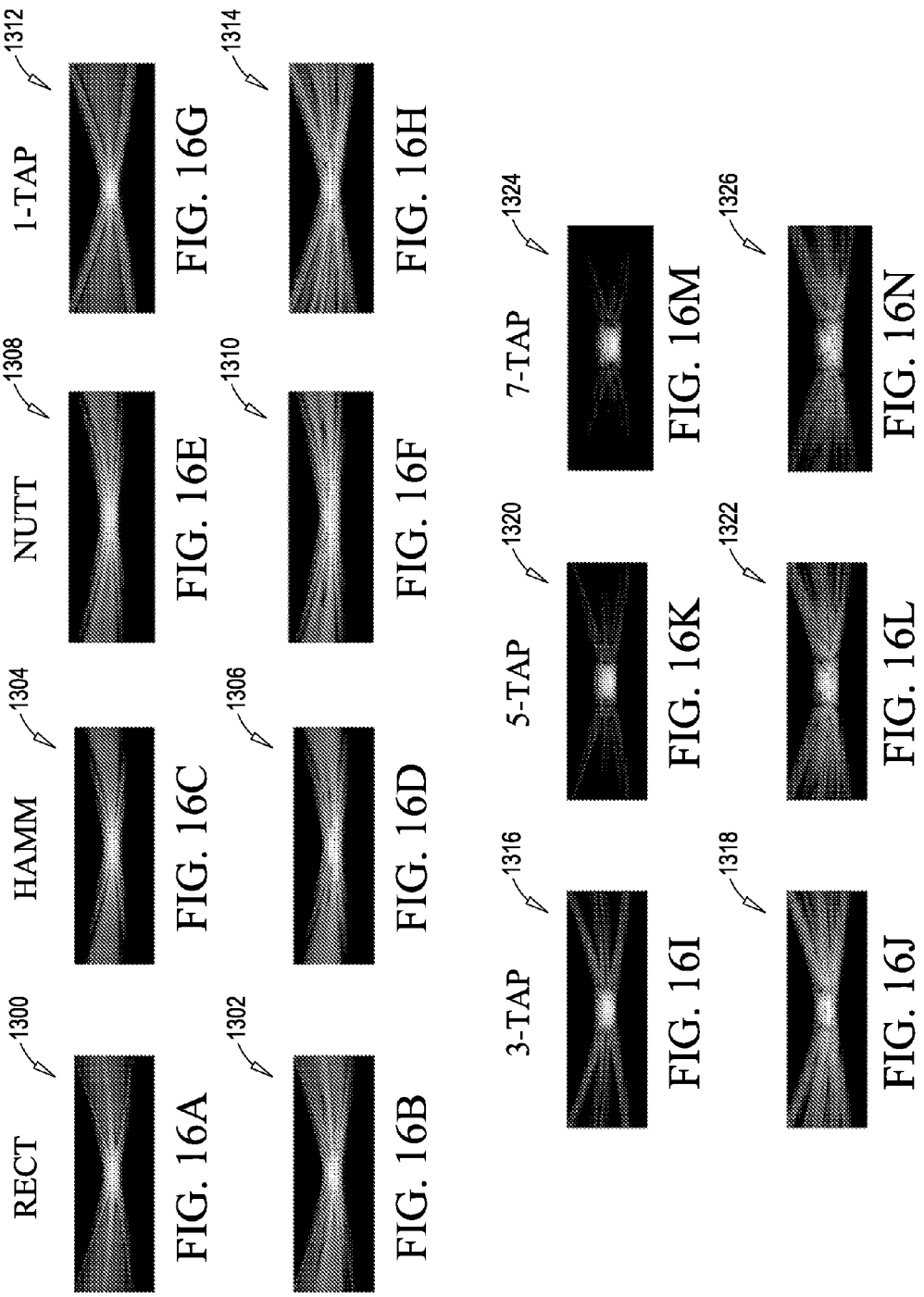

RECT

HAMM

NUTT

1-TAP

7-TAP

CYST

IMAGING OR COMMUNICATIONS SYSTEM UTILIZING MULTISAMPLE APODIZATION AND METHOD

CROSS-REFERENCE

This application is a continuation of U.S. patent application Ser. No. 12/371,911, filed Feb. 16, 2009, and issued as U.S. Pat. No. 8,744,155 on Jun. 3, 2014, which claims the benefit of U.S. Provisional Application No. 61/029,329, filed Feb. 16, 2008, and claims the benefit of U.S. Provisional Application No. 61/049,244, filed Apr. 30, 2008, which application is hereby incorporated herein, in its entirety, by reference thereto.

GOVERNMENT RIGHTS

This invention was made with government support under Grant No. 5R01EB5433 awarded by The National Institutes of Health and under Grant No. W81XWH-04-1-0590 awarded by The U.S. Army Congressionally Directed Research Program. The government has certain rights in the invention.

FIELD OF THE INVENTION

The present invention relates to the field of array-based imaging and sensing, and more particularly to optimizing contrast resolution of a beamformer used in such applications.

BACKGROUND OF THE INVENTION

The relative weighting of individual channels in an array based imaging or sensing system can significantly change the sensitivity and resolution of a beamformer. FIG. 1 schematically illustrates a prior art Delay and Sum (DAS) beamformer 1000 in which dynamic focusing is performed by the application of time delays 1002 to the channels of signals 1004 received from the transducer array 2. The dynamically focused channels of signals 1006 are then weighted by scalar apodization weights 1008 ("W", "X", and "Y", respectively in FIG. 1) and the weighted channels of signals 1010 are then summed by a summer 1012. In medical ultrasound imaging, the summed channel output is envelope detected to form an "A Line," which is combined with additional A Lines to form a B-mode image, as known in the art.

Apodization is also applied to transmit beamformers in order to alter the beam shape, lower sidelobe levels, and improve depth of field. Depth of field refers to the range over which the transmitted beam is reasonably focused. Apodization on transmit can be implemented in the most straightforward manner by simply changing the amplitude of waveforms transmitted by different array elements. Given that transmit circuits rarely have the ability to arbitrarily change the amplitude of the transmit waveform, it is often easier to implement transmit apodization by using pulse width modulation to alter the effective power transmitted by each element. Conventional apodization functions, like the rectangular, Hamming, or Nuttall window, (e.g., see Nuttall, "Some Windows with Very Good Sidelobe Behavior", IEE Trans. Acoust., Speech, and Signal Process., col. 29, no. 1, pp. 84-91, 1981, which is hereby incorporated herein, in its entirety, by reference thereto) typically offer a tradeoff between the width of the main lobe of the system spatial impulse response and the sidelobe levels (i.e., heights of the sidelobes). It is also notable that the selection of these conventional apodization functions is based upon the assumption that the imaging or sensing system is operating at a range from the array that occurs in the far-field of the array. This is almost never true for medical ultrasound imaging and is dubious for many other applications. Thus these conventional windows, though widely used, are known to be an imperfect solution. Furthermore, these windows are further limited because they are derived for a single operating frequency and modern array based imaging and communications systems almost entirely operate in a broad band mode.

Because receive channel weighting changes the shape of the overall system point spread function (PSF), the particulars of the applied apodization function greatly affect the contrast and resolution of the final output image.

Russell, U.S. Pat. No. 4,841,492 discloses the use of resistors to attempt to achieve a selected percent Gaussian apodization of a focused ultrasound wavefront when transmitted from a linear or phased array. In this case apodization is applied to the transmit beamformer, rather than the receive beamformer. Russell uses a string of resistors, one resistor positioned between the drivers of each element in the transducer array.

Lee et al. in "A hardware efficient beamformer for small ultrasound scanners, 2005 IEEE Ultrasonics Symposium, describes a digital receive beamformer that uses fractional delay (FD) filters to generate delayed samples in order to reduce the complexity of existing interpolation beamformers. Generally, FD filters are well known in the art and have been employed successfully to enable the application of focusing delays that are substantially smaller than that signal sampling rate. While FD filters do improve image quality, their design (i.e. determination of the proper degree of sub-sample delay) must be determined empirically. Furthermore, FD filters can only achieve image quality that is equivalent to the use of continuously varying focal delays (i.e. no delay quantization). The application of such continuously varying delays will not achieve the optimal image quality (contrast and resolution) possible for a given system.

There is a continuing need in the art for systems and methods for optimizing the directionality, sensitivity, contrast, and resolution of sensing, imaging, and communications systems that use arrays of sensors (or sources). This need is particularly acute in near-field and broadband signal applications. In the art of medical ultrasound imaging there exists a need for improved receive beamformers and methods for designing such beamformers to improve image contrast, resolution, and robustness to noise and tissue inhomogeneities.

SUMMARY OF THE INVENTION

The present invention provides methods, systems and components for optimizing contrast resolution of an imaging or sensing system utilizing multiple channels of broadband data associated with an array of transducers.

A method of optimizing contrast resolution of an imaging or sensing system utilizing multiple channels of broadband data associated with an array of transducers is provided, including: filtering the channels of data by passing the channels of data through finite impulse response (FIR) filters on each channel, the filters each having multiple taps having tap weights pre-calculated as a function of distance of the array from an object that energy is being transmitted to or reflected from, the weights having been pre-computed through a deterministic equation based on an a priori system model; and performing one of sending the filtered channels of data to the array or processing the filtered channels of data to form processed data and outputting the processed data for use by a human user.

In at least one embodiment, the deterministic equation comprises a quadratically constrained least squares (QCLS) algorithm that uses a cystic resolution metric.

In at least one embodiment, the quadratically constrained least squares (QCLS) algorithm comprises a weighted quadratically constrained least squares (WQCLS) algorithm.

In at least one embodiment, the filtering comprises dynamically applying the tap weights.

In at least one embodiment, the dynamically application of the tap weights varies the finite impulse response filters temporally and spatially.

In at least one embodiment, the tap weights have varying spatial sensitivity to distances between objects and the array.

In at least one embodiment, the quadratically constrained least squares (QCLS) algorithm includes a value to account for an impact of noise in the system, thereby utilizing weights that balance the signal to noise ratio of the system with other considerations.

In at least one embodiment, the filtering optimizes sensitivity and contrast based on a signal-to-noise ratio versus cystic resolution (SNR-CR) design curve.

In at least one embodiment, the quadratically constrained least squares (QCLS) algorithm includes a spatial weighting function that emphasizes or deemphasizes one or more predefined locations in an instantaneous spatial response (ISR) of the system.

In at least one embodiment, the deterministic equation comprises a weighted quadratically constrained least squares (WQCLS) algorithm, and wherein the filtering optimizes sensitivity and contrast based on a signal-to-noise ratio versus cystic resolution (SNR-CR) design curve.

In at least one embodiment, the finite impulse response (FIR) filters each have separate I and Q channel finite impulse response (FIR) filters.

In at least one embodiment, the finite impulse response (FIR) filters are designed to compensate for phase aberration in the data.

In at least one embodiment, the finite impulse response (FIR) filters are designed to compensate for amplitude aberration in the data.

In at least one embodiment, the finite impulse response (FIR) filters are designed to compensate for spatially distributed aberrations in the data.

In at least one embodiment, the processing the filtered channels of data to form processed data is performed, the processing comprising: summing data from the taps and across the channels to form a sample; and forming sufficient samples to generate an image.

In at least one embodiment, the outputting comprises: outputting the image for viewing by a human user.

In at least one embodiment, the forming sufficient samples to generate an image comprises: iterating the filtering the channels of data and summing data to form additional samples; forming an A-line when sufficient number of samples have been formed; repeating the iterations the filtering the channels, summing data and forming an A-line until a sufficient number of A-lines have been formed to produce the image.

In at least one embodiment, the system comprises a Direct Sampled In-phase Quadrature (DSIQ) beamformer.

In at least one embodiment, the method is performed on the imaging system, wherein the imaging system is a real time imaging system.

A method of optimizing contrast resolution of a broadband imaging signal received by a receive beamformer of a broadband imaging system, the receive beamformer including multiple receive channels is provided, wherein the method includes: filtering focused receive signals, received by the multiple channels, by passing the receive signals through finite impulse response filters addressing multiple receive time samples on each receive channel, the multiple time samples being weighted according to weights pre-calculated using a quadratically constrained least squares (QCLS) algorithm; summing outputs from the multiple time samples across the multiple receive channels to form a sample; iterating the filtering and summing to form additional samples; forming an A-line when sufficient number of samples have been formed; repeating the iterations the filtering, summing and forming an A-line until a sufficient number of A-lines have been formed to produce an image; and outputting the image for viewing by a human user.

In at least one embodiment, the finite impulse response filters are depth dependent finite impulse response filters comprising multi-tap finite impulse response filters, and wherein weighting values of taps in the multi-tap finite impulse response filters are varied by the system with variation in depth of an object being imaged from an array receiving energy reflected from the object.

In at least one embodiment, the finite impulse response filters are depth dependent finite impulse response filters comprising multi-tap finite impulse response filters, and wherein the iterating includes changing tap weights of taps included in the multi-tap impulse response filters.

In at least one embodiment, the finite impulse response filters applied to the signals are chosen to optimize contrast resolution of the imaging signal.

In at least one embodiment, the filter weights are pre-calculated using a general cystic resolution metric.

In at least one embodiment, the filter weights are selected from a look-up table storing a set of filter weights for particular FIR apodization profiles.

In at least one embodiment, the object is located in organic tissue.

In at least one embodiment, the object is located in living tissue.

In at least one embodiment, the method is performed in vivo on an object in living tissue.

In at least one embodiment, the broadband imaging system is a real time imaging system.

In at least one embodiment, the beamformer comprises a Direct Sampled In-phase Quadrature (DSIQ) beamformer.

A system for optimizing contrast resolution of multiple channels of data forming a broadband signal is provided, wherein the system includes: an array of sensors electrically connected to a plurality of channels for performing at least one of receiving and sending the multiple channels of data; and finite impulse response (FIR) filters connected respectively to the plurality of channels, the finite impulse response filters each having multiple taps adapted to apply variable tap weights pre-calculated as a function of distance of the array from an object that energy is being transmitted to or reflected from, the weights having been pre-computed through a deterministic equation based on an a priori system model.

In at least one embodiment, the deterministic equation comprises a quadratically constrained least squares (QCLS) algorithm that uses a cystic resolution metric.

In at least one embodiment, the system includes a memory and a processor, the memory being accessible by the processor; wherein the memory stores a look-up table of sets of filter weights for particular FIR apodization profiles, wherein a set of the filter weights is selectable to apply to taps of the multi-tap finite impulse response filters to change FIR apodization profiles thereof.

In at least one embodiment, each tap weight is calculated by minimizing a ratio of energy outside of a cyst being imaged by an instantaneous spatial response calculated for the tap for which the filter weight is being calculated, relative to the energy inside of the cyst.

In at least one embodiment, the FIR apodization profiles are quadratically constrained least squares FIR apodization profiles.

In at least one embodiment, the FIR apodization profiles are calculated using a weighted quadratically constrained least squares (WQCLS) algorithm.

In at least one embodiment, the FIR apodization profiles are dynamically applied and vary with distance of the array from an object being transmitted to or received from.

In at least one embodiment, the FIR apodization profiles are calculated to provide varying spatial sensitivity to distances between an object and the array.

In at least one embodiment, the FIR apodization profiles are calculated using a quadratically constrained least squares (QCLS) algorithm including a value to account for noise in the system, thereby balancing the signal to noise ratio of the system with other considerations.

In at least one embodiment, the FIR apodization profiles optimize sensitivity and contrast based on a signal-to-noise ratio versus cystic resolution (SNR-CR) design curve.

In at least one embodiment, the FIR apodization profiles are calculated using a quadratically constrained least squares (QCLS) algorithm that includes a spatial weighting function that emphasizes or deemphasizes one or more predefined locations in an instantaneous spatial response (ISR) of the beamformer.

In at least one embodiment, the FIR apodization profiles are calculated using a weighted quadratically constrained least squares (WQCLS) algorithm, and wherein the filters optimize sensitivity and contrast based on a signal-to-noise ratio versus cystic resolution (SNR-CR) design curve.

In at least one embodiment, the finite impulse response (FIR) filters each have separate I and Q channel finite impulse response (FIR) filters.

In at least one embodiment, the finite impulse response (FIR) filters are designed to compensate for phase aberration in the data.

In at least one embodiment, the finite impulse response (FIR) filters are designed to compensate for amplitude aberration in the data.

In at least one embodiment, the finite impulse response (FIR) filters are designed to compensate for spatially distributed aberrations in the data.

In at least one embodiment, the finite impulse response (FIR) filters are applied to a Direct Sampled In-phase Quadrature (DSIQ) beamformer.

In at least one embodiment, the system comprises a real time sensing or imaging system.

A receive beamformer for optimizing contrast resolution of a broadband imaging signal is provided, including: multiple electrically conductive receive channels for receiving the broadband imaging signal; and a finite impulse response filter connected to each receive channel, each the finite impulse response filter having multiple time samples; the multiple time samples being weighted according to weights pre-calculated using a quadratically constrained least squares (QCLS) algorithm.

In at least one embodiment, the receive beamformer is provided in combination with a multi-element array electrically connected to the receive channels, the array being configured to receive energy reflected from an object, convert the energy to the broadband signal, and send the broadband signal through the receive channels.

In at least one embodiment, the beamformer includes a memory and a processor, the memory being accessible by the processor; wherein the memory stores a look-up table of sets of filter weights for particular FIR apodization profiles, wherein a set of the filter weights is selectable to apply to taps of the multi-tap finite impulse response filters to change FIR apodization profiles thereof.

In at least one embodiment, each filter weight is calculated by minimizing a ratio of energy outside of a cyst being imaged by an instantaneous spatial response calculated for the tap for which the filter weight is being calculated, relative to the energy inside of the cyst.

In at least one embodiment, the FIR apodization profiles are quadratically constrained least squares FIR apodization profiles.

In at least one embodiment, the FIR apodization profiles are calculated using a weighted quadratically constrained least squares (WQCLS) algorithm.

In at least one embodiment, the FIR apodization profiles are dynamically applied and vary with distance of the array from the object reflecting the energy.

In at least one embodiment, the FIR apodization profiles are calculated to provide varying spatial sensitivity to distances between the object and the array.

In at least one embodiment, the FIR apodization profiles are calculated using a quadratically constrained least squares (QCLS) algorithm including a value to account for signal to noise ratio in the beamformer, thereby balancing the signal to noise ratio of the beamformer with other considerations.

In at least one embodiment, the apodization profiles optimize sensitivity and contrast based on a signal-to-noise ratio versus cystic resolution (SNR-CR) design curve.

In at least one embodiment, the apodization profiles are calculated using a quadratically constrained least squares (QCLS) algorithm that includes a spatial weighting function that emphasizes or deemphasizes one or more predefined locations in an instantaneous spatial response (ISR) of the beamformer.

In at least one embodiment, the apodization profiles are calculated using a weighted quadratically constrained least squares (WQCLS) algorithm, and wherein the filters optimize sensitivity and contrast based on a signal-to-noise ratio versus cystic resolution (SNR-CR) design curve.

In at least one embodiment, the finite impulse response (FIR) filters each have separate I and Q channel finite impulse response (FIR) filters.

In at least one embodiment, the finite impulse response (FIR) filters are designed to compensate for phase aberration in the data.

In at least one embodiment, the finite impulse response (FIR) filters are designed to compensate for amplitude aberration in the data.

In at least one embodiment, the receive beamformer comprises a Direct Sampled In-phase Quadrature (DSIQ) beamformer.

A broadband imaging system is provided that includes: a multi-element array configured to receive energy reflected from an object, convert the energy to a broadband signal, and output the broadband imaging signal; a receive beamformer for optimizing contrast resolution of an image formed from the broadband, the beamformer comprising: multiple electrically conductive channels electrically connected to elements of the multi-element array for receiving the broadband signal sent by the array; a finite impulse response filter connected to each channel, each the finite impulse response filter having multiple time samples; a processor configured to selecting a FIR apodization profile and apply tap weights to taps of the finite impulse response filters; and a display for displaying an image formed from the broadband signal.

In at least one embodiment, the system includes an envelope detector configured to form A-lines generated from samples, each the sample formed from summing outputs of the taps across the channels.

In at least one embodiment, the system further includes a scan converter configured to form a B-mode image from the A-lines and to output the B-mode image to the display.

In at least one embodiment, the system further includes a transmit beamformer electrically connected to the array and configured to control the array to transmit energy having specified characteristics from the array.

In at least one embodiment, the system is an ultrasound imaging system.

In at least one embodiment, the system includes a Direct Sampled In-phase Quadrature (DSIQ) beamformer.

A method of facilitating optimization of contrast resolution of a broadband signal by a system, the system including multiple channels, and finite impulse response filters having multiple taps connected to the multiple channels is provided, including: storing sets of pre-calculated tap weights in computer memory, each set of tap weights providing a tap weight for each tap of each of the finite impulse response filters; and displaying at least one of: at least a portion of the sets of tap weights or at least one indicator for selecting one of the sets of tap weights.

In at least one embodiment, the tap weights are pre-calculated by: calculating instantaneous spatial responses of the system for each channel and each tap for an object of pre-defined size and at a predefined distance from the array; determining tap weights that minimize energy of a combined instantaneous spatial response reflected from locations outside of the cyst relative to total reflected energy of the instantaneous spatial response; and selecting the determined tap weights that minimize the energy outside to total energy as the calculated set of tap weights for the predefined object size and predefined distance.

In at least one embodiment, the minimization comprises least square minimization with a quadratic constraint.

A method for expanding the depth of field of an imaging system during transmission is provided, wherein the method includes: filtering channels of data by passing the channels of data through finite impulse response (FIR) filters having multiple taps on each channel, the filters each having tap weights pre-calculated to simultaneously optimize cystic point contrast across a series of cysts located at different distances from a transducer array of the system; sending the filtered channels of data to the array; transducing the filtered channels of data to form energy waves; and emitting the energy waves from the array.

In at least one embodiment, the method further includes weighting a contribution of cysts from the series of cysts that would otherwise have relatively more attenuated responses by the system, when the tap weights are pre-calculated.

In at least one embodiment, the method further includes: receiving the energy waves reflected from an object; processing the reflected waves to form an image of the object; and displaying the image for viewing by a human user.

These and other features of the invention will become apparent to those persons skilled in the art upon reading the details of the systems, components and methods as more fully described below.

BRIEF DESCRIPTION OF THE DRAWINGS

FIGS. 7A-7I highlight how the GCR metric can be used to design beamformers.

FIGS. 3D-13F show plots of cystic contrast vs. cyst size.

FIGS. 16A-16N show unaberrated and aberrated simulation instantaneous spatial responses (ISRs) for different apodization functions.

DETAILED DESCRIPTION OF THE INVENTION

Figure 1:
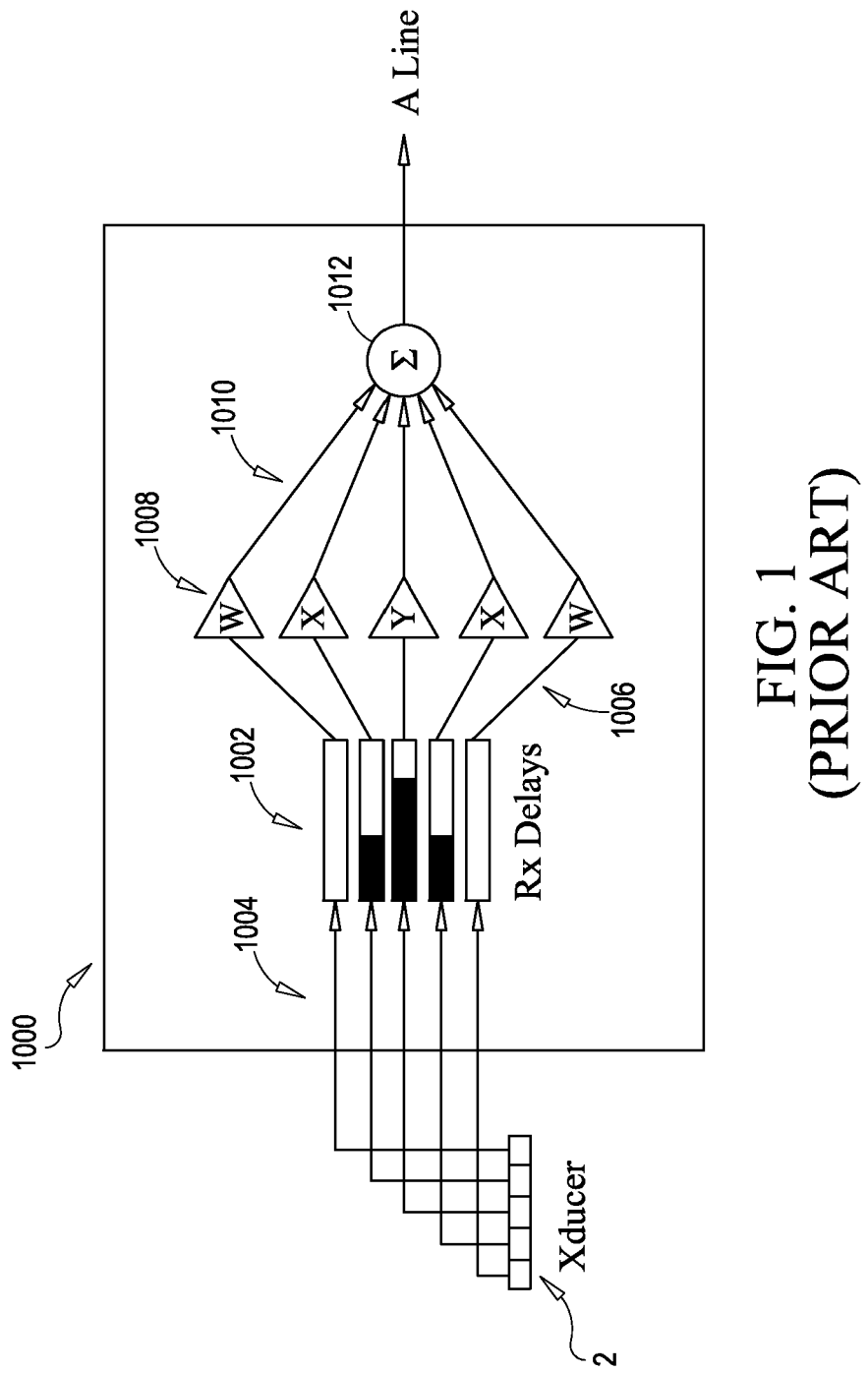
FIG. 1 is a schematic illustration of a prior art delay and sum (DAS) beamformer.

Before the present systems, methods and computer readable storage media are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise. Thus, for example, reference to "a tap" includes a plurality of such taps and reference to "the signal" includes reference to one or more signals and equivalents thereof known to those skilled in the art, and so forth.

Throughout this disclosure the superscript "T" is intended to indicate a matrix or vector transpose operation. In cases where the matrix or vector of interest is complex rather than simply real it should be understood that the Hermitian or Complex Transpose should be applied.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed. Further, all references identified herein, including non-patent literature, patents, patent applications and patent application publications are incorporated herein, in their entireties, by reference thereto.

DEFINITIONS

The terms "f-number" and "f/#", as used herein, refer to the range of interest (often the focal length) divided by the linear dimension of the aperture over which data is collected (receive aperture) or transmitted (transmit aperture). The transmit aperture is the width of the number of simultaneous firing transducer elements in the array of the system used to transmit the beam that caused the returning wave to be reflected off of an object. The above definition is typically referred to as the lateral f-number, recognizing that most modern imaging systems utilize linear or phased arrays that have a diversity of elements in only one dimension. For such systems one of ordinary skill in the art will also recognize the elevation f-number which simply refers to the range of interest divided by the elevation dimension of the array. Two-dimensional transducer arrays are now becoming common and for these systems lateral and elevation f-number have their clear meaning, with the difference being that such arrays have a plurality of elements in both the lateral and elevation dimensions. Lateral resolution is typically best (smallest), where there is a large aperture, short focal length, and short wavelength. In terms of f-number, resolution is best (finest) when the f-number is low and the wavelength is short.

The "point spread function" or "PSF" describes the response of an imaging system to a point source or object. Generically, the PSF refers to the system response over a combination of temporal and spatial dimensions. The specific combination of temporal and spatial dimensions much be determined from context, although in some cases the term may be used generically to refer to the system response to a point target.

"Apodization" refers to the act of reducing side lobes that occur in the point spread function.

An "apodization profile" refers to the amplitude weighting function applied across the transmit or receive aperture. Typical apodization functions are Gaussian, Hamming, or Rectangular window functions. In systems operating on complex data the apodization function may include a phase perturbation in addition to the amplitude weighting. Such phase perturbations are particularly useful for spreading the focus of a transmit beam over a larger range. In receive mode the apodization function is typically dynamically adjusted with range to maintain a constant f-number and thus constant speckle size.

"Cystic resolution" refers to a metric that can be used to characterize the resolution of arbitrary broadband coherent imaging systems. Conceptually, cystic resolution describes the achieved contrast for a perfect anechoic cyst of a given diameter. Such measures can be considered over a range of cyst diameters to form a cystic resolution curve. This metric is described in detail in Ranganathan et al., "Cystic Resolution: A Performance Metric for Ultrasound Imaging Systems", IEEE Transactions on Ultrasonics, Ferroelectrics and Frequency Control, Vol. 54, No. 4, April 2007, which is hereby incorporated herein, in its entirety, by reference thereto. A more broadly defined version of this metric is described in detail in Guenther, D. A. and W. F. Walker, "Generalized Cystic Resolution: A Metric for Assessing the Fundamental Limits on Beamformer Performance," IEEE Transactions on Ultrasonics, Ferroelectrics, and Frequency Control, vol. 56, no. 1, pp. 77-90, 2009, which is also incorporated herein, in its entirety, by reference thereto.

"Contrast resolution" is a general term describing the contrast of targets in an image. "Cystic resolution" is a specific term which can be stated mathematically and is representative of contrast resolution. Technically, the present invention is aimed at optimizing the "cystic resolution" of the imaging system so by default it improves the contrast resolution.

A "finite impulse response filter" or "FIR filter" is a type of a digital filter. The impulse response, the filter's response to a Kronecker delta input, is finite because it settles to zero in a finite number of sample intervals. This is in contrast to infinite impulse response filters which have internal feedback and may continue to respond indefinitely. The impulse response of an Nth order FIR filter lasts for N+1 samples, and then dies to zero.

A FIR filter includes a delay line, so at sample time "n" access to samples n−1, n−2, n−3, ... are available, for as many prior samples as needed. A "tap", as used herein refers to any point in the delay line where the FIR filter uses the data. The number of taps of a FIR filter is typically the number of delays plus one, e.g., a four tap filter would use sample n, sample n−1, sample n−2 and sample n−3. The difference equation which defines how the input signal to the FIR filter is related to the output signal from the FIR filter is defined by:

$$y[n]=b_0x[n]+b_1x[n-1]+\ldots+b_Nx[n-N] \quad (1)$$

where x[n] is the input signal, y[n] is the output signal and $b_i$ are the filter coefficients. N is known as the filter order; an $N^{th}$-order filter has (N+1) terms on the right-hand side; these are commonly referred to as taps.

DETAILED DESCRIPTION

The present invention provides methods for focusing data with an array of sensors, as well as systems and components for performing such methods. Examples of uses of methods described herein include, but are not limited to use in: a receive ultrasound beamformer, a transmit ultrasound beamformer, reception of acoustic data from an array of microphones, reception of data from an array of seismic sensors, such as used in oil exploration, reception and/or transmitting using an array of radio antennas, such as for communications or radio astronomy, etc.

Figure 2:
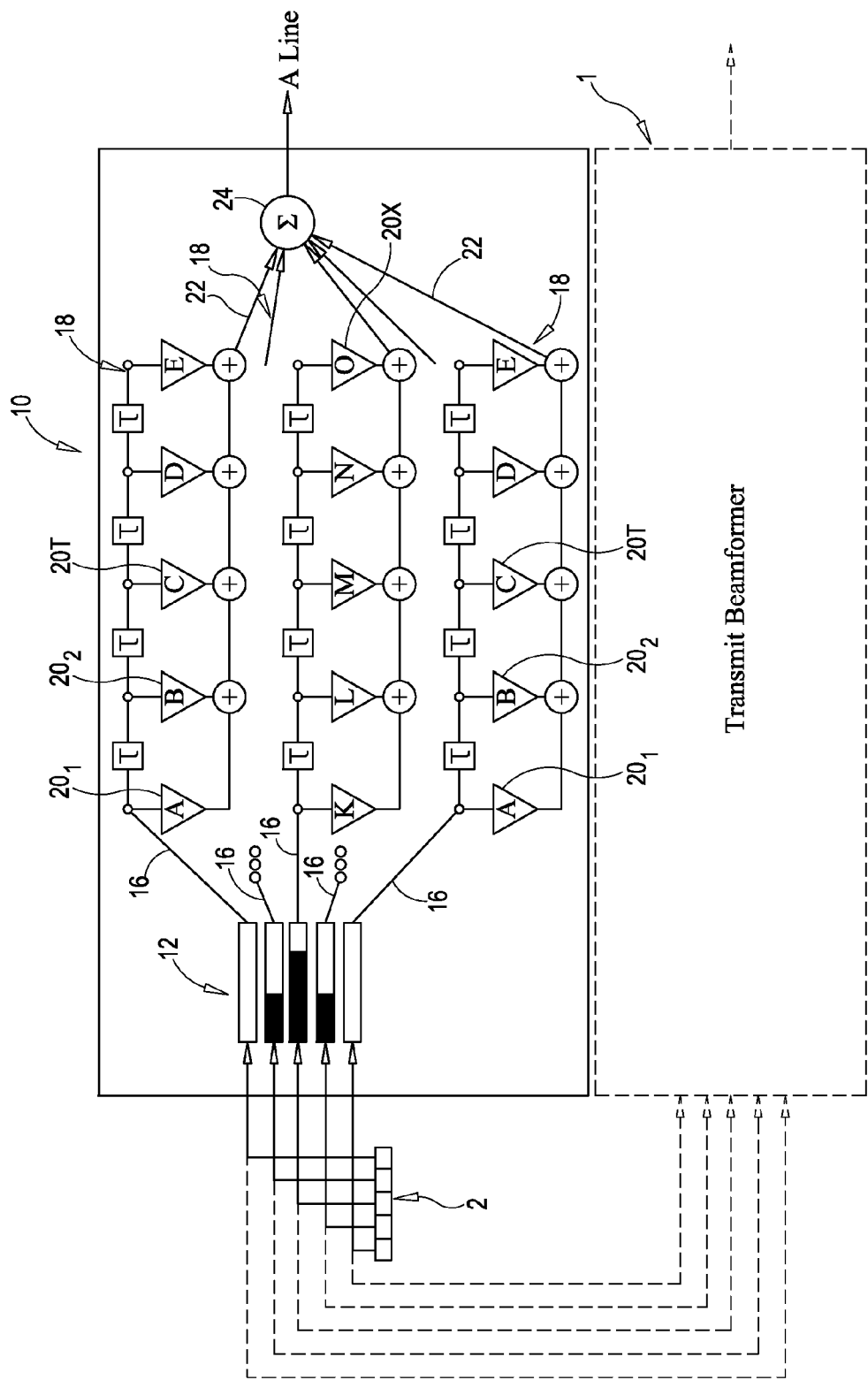
FIG. 2 is a schematic illustration of a receive beamformer according to the present invention.

FIG. 2 is a schematic representation of a receive beamformer 10 according to the present invention. Like the prior art beamformer 1000 of FIG. 1, beamformer 10 applies apodization after the dynamic focal delays 12 have been applied. Rather than applying scalar apodization weights to the delayed channels 16 however, the present invention uses FIR filters 18 to apply the apodization. Note that only three FIR filters 18 are presented in FIG. 2 for simplicity and clarity. In reality, there would be five FIR filters 18 in the example of FIG. 2, as each delay line 16 has a FIR filter 18 applied thereto. The FIR filters of FIG. 2 not only mimic the function of conventional apodization weights, but also apply frequency dependent weights and phase delays. It is this capability that accounts for the improved performance of the FIR apodization beamformer.

Also, it is noted that the beamformer 10 can be used for receive only systems that do not employ a transmit beamformer, or can be used equally as well in systems that do include a transmit beamformer 1 as represented in phantom lines in FIG. 2. For example, some passive SONAR systems employ receive only beamforming to enable rapid tracking and avoid enemy detection, and opto-acoustic imaging devices use the ultrasound transducer purely as a receiver. As noted, the present beamforming architecture and methods can be readily applied to these systems, and offers the potential to significantly improve point resolution and contrast of the output images.

It should also be noted that the FIR apodization method described herein is also directly applicable to a transmit beamformer, either operating alone or as a part of a transmit-receive system. While channel varying transmit waveforms are known in the prior-art, notably the frequency dependent focusing method described by Hossack et. al. (U.S. Pat. No. 6,108,273), by J. A. Hossack et. al., "Extended focal depth imaging for medical ultrasound" in Proceedings of the 1996 IEEE Ultrasonics Symposium, p. 1535-40, and "Dynamic-transmit focusing using time-dependent focal zone and center frequency" by Zhou and Hossack in IEEE Transactions on Ultrasonics, Ferroelectrics, and Frequency Control February 2003, p. 142-52) and the minimum sum squared error beamformer of Ranganathan et. al. (Ranganathan, K. and W. F. Walker, "A Novel Beamformer Design Method for Medical Ultrasound: Part I: Theory," IEEE Trans. Ultrason. Ferroelec. Freq. Contr., IEEE Trans. Ultrason. Ferroelec. Freq. Contr, vol. 50, no. 1, pp. 15-24, January 2003. and Ranganathan, K. and W. F. Walker, "A Novel Beamformer Design Method for Medical Ultrasound: Part II: Simulation Results," IEEE Trans. Ultrason. Ferroelec. Freq. Contr., vol. 50, no. 1, pp. 25-39, January 2003), these methods are more difficult to implement in hardware and do not achieve the same level of improvement as the methods described herein. In order to optimize the apodization weights $20_1, 20_2, \ldots, 20_x$ applied by beamformer 10 to optimize contrast resolution, the present invention provides methods for calculating optimal weights $20_1, 20_2, \ldots 20_x$ that are applied in the FIR filters 18. The time delays applied in the example shown in FIG. 2 are all equal across the FIR filter and between all the channels, but need not be. By using different time delays among the channels, it is possible to further increase performance, but possibly at the cost of increased system complexity. Varying delays between channels are of course already applied through dynamic receive focusing, so in such cases the additional complexity would occur in the design phase but not necessarily in implementation. The delays within the FIR filter bank may also be varying between the different taps. One likely application of such variation would be in applying the present invention to the Direct Sampled In Phase-Quadrature beamformer ("Ultrasonic Imaging Beam-former Apparatus and Method," T. N. Blalock, W. F. Walker, and J. A, Hossack, PCT application filed Jan. 14, 2004, U.S. patent application Ser. No. 11/160, 915 and Ranganathan, K., M. K. Santy, T. N. Blalock, J. A. Hossack, and W. F. Walker, "Direct Sampled IQ Beamforming for Compact and Very Low Cost Ultrasound Beamforming," IEEE Trans. Ultrason. Ferroelec. Freq. Contr., vol. 51, no. 9, pp. 1082-94, September 2004.) . . . ) . . . ), both of which are hereby incorporated, herein, in their entireties, by reference thereto. After applying the apodization weights $20_1$, $20_2, \ldots, 20_x$ via taps 20T (note that five-tap FIR filters 18 are shown in FIG. 2, but the number of taps may vary), the filtered channels of signals 22 are then summed by a summer 24. The summed channel output at a particular instant in time is a single sample of a summed RF line. Successive time samples from the summer form a complete summed RF line. After applying the apodization weights $20_1$, $20_2, \ldots, 20_x$ via taps 20T (note that five-tap FIR filters 18 are shown in FIG. 2, but the number of taps may vary), the filtered channels of signals 22 are then summed by a summer 24. The summed channel is output as summed RF line. In a typical embodiment this summed RF line is streamed continuously into an envelope detector 40 and is output continuously as a single "A-Line." A-Lines are processed/combined by scan converter 45 to form a B-mode image, which can be displayed for viewing by a human user. Alternatively, the summed RF lines may be processed to measure blood velocity or tissue motion, to estimate tissue properties using any of a broad range of techniques known as tissue characterization, to measure tissue displacements or strains for tissue elasticity estimation, or for any of a number of other methods well known to those of skill in the art.

The present invention provides a beamformer configured to dynamically apply receive aperture weights using spatially and temporally variant finite impulse response (FIR) filters 18. In general, the FIR filters 18 on each channel are unique for every spatial point in the output image (which is formed from the A lines combined into a B-mode image). In one simple embodiment, the present invention provides a linear array 2 without beamsteering, where the receive FIR filters 18 vary only with depth (i.e. distance from the object that an image is being constructed of). The filter weights $20_1$, $20_2, \ldots 20_x$ are calculated to maximize contrast resolution.

Figure 3:
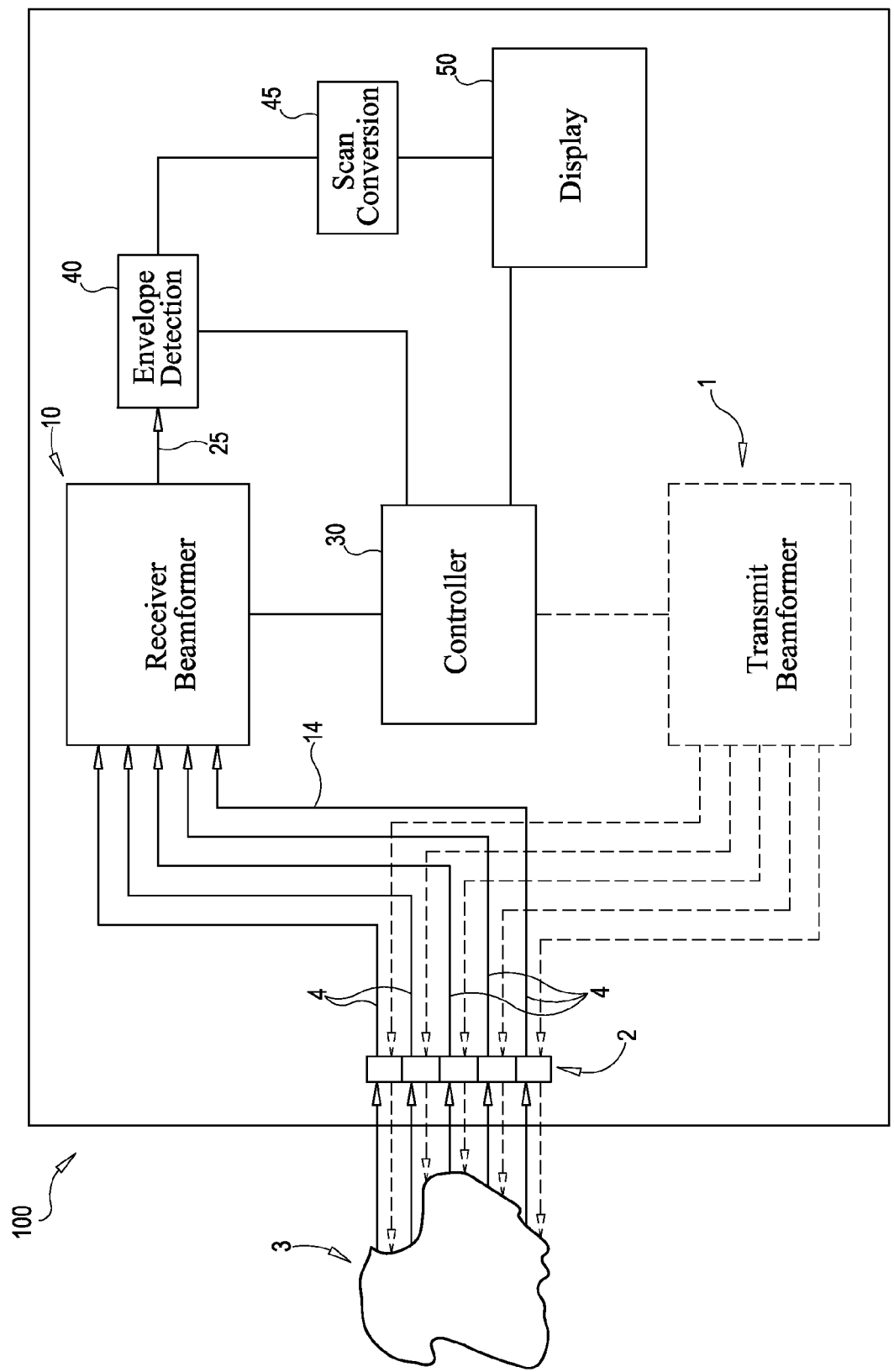
FIG. 3 is a schematic illustration of a system according to the present invention.

FIG. 3 is a basic, schematic representation of an ultrasound system 100 according to one embodiment of the present invention that is referred to in order to generally describe the operations of an ultrasound system to produce an image of an object 3. System 100 may optionally include a transmit beamformer, which may include input thereto by controller 30 to send electrical instructions to array 2 as to the specifics of the ultrasonic waves to be emitted by array 2. Alternatively, system 100 may be a receive only system and the emitted waves may be directed to the object 3 from an external source.

In either case, waves 4 reflected by the object 3 (and surrounding environment) are received by array 2 and converted to radio frequency (RF) signals 14 that are input to receive beamformer 10. Controller 30 may be external of the beamformer 10, as shown, or integrated therewith and may be directed by a user to select a set of tap weights based on a particular cyst size that the tap weights have been calculated for. In one embodiment the user directly selects the cyst size of interest, while in another realization the user may select the cyst size indirectly by trading spatial resolution for image contrast. In many applications the desired cyst size may be selected by default based on trials performed by the system designers. Additionally, controller 30 automatically and dynamically changes sets of tap weights used in the FIR filters 18 of receive beamformer 10 as the distance between the array 2 and object 3 changes, as described in more detail below. Thus the time delays change as a function of distance, and accordingly, the FIR tap weights will also change as a function of distance. The tap weights may be updated as frequently as every sample taken by the system, but do not necessarily need to be updated this frequently, since they do not change that rapidly with distance Distance/depth is typically calculated assuming a constant speed of sound in tissue (i.e. 1540 m/s) and then time of flight is recorded such that the returning echoes have a known origination. Thus, system 100 also stores in memory (either memory integrated into controller 30 or beamformer 10, or connected thereto for ready access) a look up table that contains sets of tap weights useable in the FIR filters 18, wherein the tap weight sets vary according to cyst size, as well as distance of the array 2 from the cyst. Tap weights will also vary depending on system characteristics such as aperture size, transmit frequency, bandwidth, and other parameters that affect the system's ISR. The summed RF lines output by the receive beamformer are input to an envelope detection module, which may be separate from and controlled by, or incorporated in controller 30. Envelope detected A-Lines are output from the detection module 40 and input into a scan converter module 45. The scan converter 45 processes data from multiple A-Lines to determine the data to be output at each image pixel. The B-mode image formed within the scan converter 45 is displayed on display 50.

The apodization applied by beamformer 10 is data independent and the filter tap weights $20_1$, $20_2, \ldots, 20_x$ are deterministic given the a priori system model. The FIR filter weights (i.e., tap weights) are computed through a deterministic equation (the QCLS algorithm) as described herein, which requires system modeling and characterization (the "a priori system model.") Beamformer 10 maximizes contrast resolution using a constrained least squares design algorithm that incorporates a general cystic resolution metric, which implicitly controls the mainlobe size of the resultant spatial point spread function (PSF). Notably, the system"), which may include one or more of the system's ISR must be characterized for the imaging conditions under which the FIR filters are to be employed. This characterization may be performed using computer simulations, experimental measurement, analytical theory, or some combination of the three. In addition, the required characterization may be extrapolated from known conditions to save the time required to fully characterize each condition. In some circumstances, such as designing FIR filter weights to extend the depth of field of a transmit beamformer, it may be necessary to consider ISRs at a number of ranges and time points. In a related design problem the system designer might combine ISRs for a number of possible phase aberration profiles and then design the FIR filter weights that would optimize cystic contrast over that set of possible aberrations. Other variations of the present invention are possible. For instance, utilizing the baseband or envelope representation of the ISR may be necessary in order to implement complex FIR weights or use the FIR beamformer with baseband I/Q data. In other circumstances, utilizing ISRs with different system parameters (transmit frequency, transmit focus, fractional bandwidth) in order to design for FIR filter weights that are optimal over a range of operating parameters and conditions, complex information, envelope data, multiple ISRs, multiple instances of the same ISR, noise statistics, SNR, cyst size, etc.

The filter tap weight calculations are not limited by nearfield, narrowband assumptions and do not require estimation of the receive signal second order statistics. This is an important contrast with so-called adaptive beamformers (e.g., Frost Beamformer, Capon Beamformer, etc.) that adjust their operation and weights depending upon the data input to the beamformer. Thus the present invention avoids the need for extensive computation and adaptive adjustment of the adaptive beamformers and is thus more suited to cost efficient implementation.

Beamformer 10 can be readily adapted to existing commercial architectures and previously described architectures including, but not limited to those described in U.S. Patent Application Publication No. 2007/0016022.

The present invention offers the potential to significantly improve the point resolution and contrast of one-way beamforming systems, including, but not limited to passive ultrasound systems. The present invention is further applicable to improve performance of the so-called, spatial matched filter beamformer, e.g., see Kim et al., "Efficient array beam forming by spatial filtering for ultrasound B-mode imaging", Journal of the Acoustic Society of America, vol. 120, pp. 852-861, 2006.

Definition of the Instantaneous Spatial Response

The present invention uses a priori knowledge of the imaging system. Specifically the present invention either models or measures the system's spatial response at an instant in time. The spatial response used by the present invention is different than that commonly accepted as the system's PSF. A point spread function (PSF) is a measure of the imaging system's spatio-temporal sensitivity and includes the effects of beamforming. It is measured by translating a point target in front of the transducer and beamforming the receive echoes for each spatial location of the point target. The point target is typically translated in azimuth at a fixed range, which generates a space-time (azimuth-time) PSF. The responses used by the present invention are purely spatial PSFs. In order to produce a two-dimensional (2D) space-space (azimuth-range) PSF, the point target needs to be translated in azimuth and range. At each point target location the received signals are beamformed, and a three-dimensional (3D) dataset (azimuth-range-time) is generated thereby. The 2D (azimuth-range) spatial PSF used in the present invention is the 2D matrix at one time index in the 3D beamformed dataset. Since the space-space PSF is conceptually different than the conventional PSF (space-time), the spatial PSF used herein is referred to as the Instantaneous Spatial Response (ISR). The ISR is the purely spatial sensitivity response of the system at an instant in time. The ISR can be measured experimentally, modeled numerically using computer simulation, or predicted analytically.

Linear Algebra Formulation of the Spatial Point Spread Function

The sensitivity field for a transducer during pulse-echo imaging can be expressed as the product of a propagation matrix, S, and a set of aperture weightings, w. The propagation matrix uses superposition to describe the contribution of each transducer element at each field point at an instant in time. The propagation matrix S in the formulation below is a function of the transmit aperture weights used in the transmit beamformer, the excitation pulse, and the individual element impulse responses of the transmit and receive apertures.

Dynamic receive focusing is also applied in the formulation described herein, by adjusting the receive delays 12 of each individual element. Delays are updated with depth, and update rates can vary. The delays are typically applied through a combination of a FIFO (first in, first out) buffer which applies whole sample delays and an FIR interpolation filter to apply sub-sample delays. The FIR filters of the present invention may be applied directly after the FIR interpolation filters or may be designed so as it incorporate the interpolation process. Accurate subsample interpolation would likely increase, the length of the filters described herein, but the overall hardware complexity may be reduced by combining these features. The sensitivity field for a transducer during pulse-echo imaging can be expressed as the product of a propagation matrix, S, and a set of aperture weightings, w. The propagation matrix uses superposition to describe the contribution of each transducer element at each field point at an instant in time. The propagation matrix S in the formulation below is a function of the transmit aperture weights used in the transmit beamformer, the excitation pulse, and the individual element impulse responses of the transmit and receive apertures. Dynamic receive focusing is also applied in the formulation described herein, by adjusting the receive delays 12 of each individual element. Delays are updated with depth, and update rates can vary.

The two way pulse echo propagation matrix, S, for a fixed transmit aperture and a n element dynamically focused receive aperture at a total number of p points in three dimensional space is defined by:

$$S = \begin{bmatrix} s_{1,1} & s_{1,2} & \cdots & s_{1,n} \\ s_{2,1} & \vdots & \cdots & \vdots \\ \vdots & \vdots & \ddots & \vdots \\ s_{p,1} & \cdots & \cdots & s_{p,n} \end{bmatrix} \quad (2)$$

where $s_{:k,i,j}$ is the contribution of the jth element at the ith point in space for the kth filter tap. Adequate spatial and temporal sampling of the three dimensional yields very large propagation matrices, and therefore, for simplicity, the present disclosure describes analysis in two spatial dimensions only, i.e., azimuth and range, and assume a temporal sampling rate of 40 MHz for the FIR filters 18. This is not meant to be limiting of the invention as extension to three spatial dimensions and alternate sampling rates is straightforward, although requiring more computation time.

The receive FIR filter tap weights, $w_{FIR}$, can also be written in vector form as:

$$w = [w_1 w_2 w_3 \ldots w_n]^T, \quad (3)$$

where T denotes the vector transpose operation. Using (2) and (3), the complete two-way pulse echo system PSF, P, can be defined as:

$$P = Sw, \quad (4)$$

i.e., the propagation matrix multiplied by the receive weighting vector. Note that this results in the one dimensional column vector, P, of length p the total number of points in three dimensional space where the system PSF is measured.

To expand the formulation to include receive channel FIR filters 18, it is noted that the final spatial PSF is a linear superposition of multiple dynamically focused 2-way PSFs (wherein a "2-way PSF" refers to a pulse-echo PSF or a transmit and receive PSF). A new propagation matrix, $S_{FIR}$ is defined that is the result of a simple combination of the propagation matrices associated with each dynamic receive focus. The number of propagation matrices included corresponds to number of FIR filter taps, k:

$$S_{FIR} = [S_{z1}, S_{z2}, S_{z3}, \ldots, S_{zk}] \quad (5)$$

$$= \begin{bmatrix} s_{z1,1,1} & s_{z1,1,2} & \cdots & s_{z1,1,n} & \cdots & s_{zk,1,1} & s_{zk,1,2} & \cdots & s_{zk,1,n} \\ s_{z1,2,1} & \cdots & \cdots & \cdots & \cdots & s_{zk,2,1} & \cdots & \cdots & \cdots \\ \vdots & \vdots & \ddots & \vdots & \cdots & \vdots & \vdots & \ddots & \vdots \\ s_{z1,p,1} & \cdots & \cdots & s_{z1,p,n} & \cdots & s_{zk,p,1} & \cdots & \cdots & s_{zk,p,n} \end{bmatrix},$$

where $s_{zk,i,j}$ is the contribution of the jth element at the ith point in space for the kth filter tap. Adequate spatial and temporal sampling of the three dimensional ISR yields very large propagation matrices, and therefore, for simplicity, the present disclosure describes analysis in two spatial dimensions only, i.e., azimuth and range, and assume a temporal sampling rate of 40 MHz for the FIR filters 18. This is not meant to be limiting of the invention as extension to three spatial dimensions and alternate sampling rates is straightforward, although requiring more computation time.

The receive FIR Filter tap weights, $w_{FIR}$, can also be written in vector form as $$w_{FIR}[w_{z1,1} w_{z1,2} w_{z1,3} \cdots w_{z1,n} \cdots w_{zk,1} w_{zk,2} w_{zk,3} \cdots w_{zk,n}]^T. \quad (6)$$

where $w_{zk,j}$ is the weight applied for the $k^{th}$ receive focus on the $j^{th}$ receive element of the array 2. Using (5) and (6), the complete two-way pulse echo system PSF for the receive channel FIR beamformer 10 using k-taps 20T on each channel 16 is written as follows:

$$P_{FIR} = S_{FIR} w_{FIR}. \quad (7)$$

Algorithm for Computing the FIR Filter Tap Weights

The cystic resolution metric described in Ranganathan et al., "Cystic Resolution: A Performance metric for Ultrasound Imaging Systems", IEEE Trans. On Ultrason., Ferroelec. And Freq. Control, Vol. 54, No. 4, April. 2007, quantifies the contrast at the center of an anechoic cyst embedded in a speckle generating background. Note that this metric measures contrast at a specific point in space (the center of the cyst) at an instant in time. This is a different parameter than the overall cystic contrast computed from a B-mode image. Therefore the result computed when using the cystic resolution metric is referred to as a "point contrast" to avoid confusion with the overall cystic contrast. The point contrast of the center of a cyst relative to the background, neglecting electronic noise, can be defined as:

$$C = \sqrt{\frac{E_{out}}{E_{tot}}} \quad (8)$$

where $E_{out}$ is the ISR energy outside the cyst and $E_{tot}$ is the total ISR energy. The contrast resolution metric identifies the contribution of specific points in the system's instantaneous spatial response to the overall contrast. Note that if all of the ISR energy lay within the cyst, C would be 0, indicating the best possible contrast. On the other hand, if most of the ISR energy lies outside the cyst, C approaches a value of 1. Therefore, when contrast curves are plotted to show contrast as a function of cyst radius, a relatively more negative dB value indicates relative better contrast performance.

The FIR filter design algorithm uses the above cystic resolution metric (point contrast of the center of the cyst C) to formulate a least squares minimization problem with a quadratic constraint. The weight values that result as the solutions to the least squares minimization problem with a quadratic constraint are referred to as quadratically constrained least squares (QCLS) apodization profiles. Further details regarding the constrained least squares techniques used can be found in Guenther et al., "Optimal Apodization Design for Medical Ultrasound Using Constrained Least Squares Part I: Theory" IEEE Trans. On Ultrason., Ferroelec. And Freq. Control, Vol. 54, No. 2, February, 2007 and in Guenther et al., "Optimal Apodization Design for Medical Ultrasound Using Constrained Least Squares Part II: Simulation Results" IEEE Trans. On Ultrason., Ferroelec. And Freq Control, Vol. 54, No. 2, February, 2007, both of which are hereby incorporated herein, in their entireties, by reference thereto.

The algorithm for computing the FIR filter tap weights utilizes the linear algebraic representation of the ISR presented above. The contrast is optimized according to equation (8) by minimizing the ratio of ISR energy outside a specified cyst boundary to the total ISR energy. This is equivalent to minimizing the ratio of ISR energy outside the cyst to ISR energy inside the cyst, which can be expressed as:

$$\min_w \|S_{out} w\|^2 \text{ subject to the quadratic constraint } \|S_{in} w\|^2 = 1, \quad (9)$$

where $\|\cdot\|^2$ denotes the square of the $l^2$-norm, which is the square root of the dot product of a vector with itself. For example, for x=[x1, x2, x3], the $l^2$-norm of x=sqrt(x1$^2$+x2$^2$+x3$^2$). The $l^2$-norm is also called the Euclidean norm. $S_{out}$ is the propagation matrix for all the spatial points of the ISR lying outside the cyst boundary, and $S_{in}$ is the propagation matrix for all the spatial points of the ISR lying inside the cyst boundary. Note that the quadratic constraint minimizes the ratio of ISR energy outside the cyst to ISR energy inside the cyst. The optimal receive aperture weighting satisfying the quadratic constraint is the eigenvector, $w_{eig}$, corresponding to the minimum eigenvalue resulting from the generalized eigenvalue decomposition problem of $S_{out}^T S_{out}$ and $S_{in}^T S_{in}$; see Gander, "Least Squares with a Quadratic Constraint", Numerische Mathematik, col. 36, pp. 291-307, 1981, which is hereby incorporated herein, in its entirety, by reference thereto. The generalized eigenvalue problem for a matrix pair (A, B) both n by n matrices, is finding the eigenvalues, $\lambda_k$, and the eigenvectors, $x_k \neq 0$, such that:

$$Ax_k = \lambda_k B x_k. \quad (10)$$

The problem described in equation (10) above can be efficiently computed and solved using MATLAB (The Mathworks, Inc., Natick, Mass.) with the eig( ) function. An important advantage of the QCLS technique described herein, compared to other least squares beamforming techniques, is that no matrix inversion is required to solve for the optimal apodization profile.

Note that cyst size is an important parameter in the QCLS apodization design method: specifying the propagation matrices in equation (9) and implicitly defining mainlobe size in the resulting ISR. ISRs constructed with QCLS profiles designed for larger cysts will naturally have a large mainlobe, but lower overall sidelobe levels i.e., lower overall heights of the sidelobes. The term "design cyst size" is used as a convenient way to differentiate between apodization (QCLS) profiles that contain different sets of tap weights. Every design cyst size will produce a different, optimal QCLS profile, yet experience shows that the general shape of the QCLS weights remains similar over a range of cyst sizes. Furthermore, a set of apodization profiles can be produced to achieve optimal contrast for any particular cyst size. A "QCLS profile" is an apodization profile computed via the QCLS algorithm. The FIR filter weights can be considered as a series of sequential QCLS profiles. This analogy is imperfect however as the FIR filter weights consider the combined effect of each of the weights, while simply stringing together QCLS apodization curves would not generate the same useful synergy.

Designing the FIR Filter Weights with Varying Spatial Sensitivity

The FIR Filter weights designed using the algorithm above are determined to optimize the point cystic contrast. While this metric is particularly valuable for assessing system performance, there are some situations where the challenges of imaging in the body are not fully encompassed within this metric. For example during ultrasound imaging of the internal organs (e.g. liver) the imaging system must contend with extremely bright echoes originating from gas within the bowel. Although the bowel may be at some distance, and thus the ISR in that region may have a low value, the extreme echogenicity of bowel gas may significantly degrade the local image contrast within the liver. In this situation, and many others, it is thus desirable to more strongly suppress the ISR energy at greater distances from the cyst (focal point). In other instances, it may be desirable to increase the importance/levels of sidelobes to become increasingly greater as the distance outside the cyst boundary grows.

To design FIR apodization weights with varying spatial sensitivity one need only apply the design equation described above in equation (9) using a modified version of the ISR. In the most general situation the spatial sensitivity both within and outside the cyst can be modified so that:

$$\min_{w} \|\rho S_{out} w\|^2 \text{ subject to the quadratic constraint } \|q S_{in} w\|^2 = 1, \quad (9a)$$

Where $\rho$ is a vector with a value for each location outside the cyst weighted by the inverse of its desired significance in the final solution. Thus a location that is to be strongly minimized in the final solution should have a high value in $\rho$. Likewise, q is a vector with a value for each location inside the cyst weighted by its desired significance in the final solution. Thus a point that should be maximized should have a high value in q. Although this expression may seem to complicate the solution of the FIR filter weights, simple grouping of the terms yields the following minimization problem:

$$\min_{w} \|T_{out} w\|^2 \text{ subject to the quadratic constraint } \|T_{in} w\|^2 = 1, \quad (9b)$$

Where $T_{out} = \rho S_{out}$ and $T_{in} = q S_{in}$. It is of course straightforward to solve this problem using the generalized eigenvalue decomposition approach described above. It is also straightforward to populate either p or q with ones to make the relative weighting outside or inside the cyst uniform. The robust algorithm for computing FIR filter weights can also be adjusted using this method.

Robust Algorithm for Computing the FIR Filter Tap Weights

The QCLS design algorithm disclosed above offers substantial improvements over conventional apodization methods and is straightforward to implement. The above method is limited however in that it does not explicitly consider the impact of noise on image contrast and can thus design FIR filter weights that are ineffectual in noisy environments. An alternate design approach, described below, can be employed to explicitly consider noise and thereby generate FIR beamformer weights that are robust to noise. While design using this "robust" method is somewhat more complex, that complexity is likely well worth the achieved improvement in performance.

Generalized Cystic Resolution Metric

One important effect of a receive beamformer is to improve the signal to noise ratio of the received waveforms/signals. The beamforming architecture of the present invention is constructed to maximize the contrast resolution of the system. If the FIR filter weights are designed considering pure cystic contrast, with no consideration of electronic noise, then the resultant beamformer will offer improved contrast resolution in high SNR environments, but may not offer adequate SNR in other environments. If the SNR of signals input to the beamformer is taken into account in the FIR filter weight design it is possible to balance sensitivity (SNR gain) and contrast resolution. With this and other possible design assumptions it is important to analyze how the receive channel FIR filters affect the system's sensitivity. Liu et al., in "Correction of ultrasonic waveform distortion using back-propagation and a reference waveform method for time-shift compensation", J. Acoust. Soc. Amer., vol. 96, no. 2, pp. 649-660, 1994, defined a rigorous measure of a beamformer's echo signal-to-noise ratio (SNR) to compare the sensitivities of various beamforming strategies such as the conventional delay-and-sum (DAS) beamformer and the spatial matched filter (SMF) beamformer. The disclosed analysis in Liu et al. however ignored contrast resolution performance.

A generalized cystic resolution (GCR) metric, as described in Ranganathan et al. (cited above) can be used to simultaneously characterize the contrast resolution and SNR performance of an arbitrary beamformer. The GCR metric is thus used to analyze the performance of the FIR beamformer 10 according to the present invention, compared to a conventional DAS beamformer 1000. Results are presented as simple curves, which plot cystic resolution either as a function of cyst size or input channel SNR. Performance improvements are easily depicted and determined by the beamformer that achieves better cystic resolution at a smaller cyst size or worse input SNR. When analyzed with the generalized cystic resolution metric, by plotting cystic contrast versus cyst size, the set of QCLS apodization profiles will generate a lower bound on cystic contrast for the FIR beamformer 10 and DAS beamformer 1000, given the specified system characteristics. Since scanning through all the different apodization profiles would not be realistic in a real-time clinical setting, it is interesting to see how the apodization profile (or FIR filter weights) designed for a specific cyst size performs over a range of cyst sizes.

A further description of the generalized cystic resolution metric follows. For an even more thorough explanation, see Guenther, D. A. and W. F. Walker, "Generalized Cystic Resolution: A Metric for Assessing the Fundamental Limits on Beamformer Performance," IEEE Transactions on Ultrasonics, Ferroelectrics, and Frequency Control, vol. 56, no. 1, pp. 77-90, 2009, which was incorporated by reference above. For an n element linear array (where "n" is a positive integer) consisting of equally spaced sensors operating in pulse-echo mode, the time record of the receive signal at the output of the beamformer is:

$$y(t) = \int_{-\infty}^{+\infty} \sum_{k=1}^{N} w_k P_k(\overline{x}, t) N(\overline{x}) d\overline{x} + \sum_{k=1}^{N} w_k E_k(t). \quad (11)$$

Note that the integration performed over three-dimensional space. $P_k(\overline{x}, t)$ is the spatio-temporal response of the kth receive element, where $w_k$ is the weight applied to the kth receive element; $N(\overline{x})$ is the target scattering function assumed constant with time; and $E_k(t)$ is the electronic noise on the kth receive channel. The spatial and temporal dependence of the weights has been omitted for clarity. All transmit conditions are incorporated into $P_k(\overline{x},t)$ including transmit apodization, transmit aperture spatial impulse response, electromechanical impulse response, etc.

A beamformer's performance is typically analyzed at an instant in time. In order to avoid confusion between the purely spatial response of an element and the full four-dimensional PSF of an element, the purely spatial response is referred to herein as the Instantaneous Spatial Response (ISR), $P_k(\overline{x},t_0)$, as noted above, where $t_0$ denotes an instant in time. The ISR measures the sensitivity of the system, including all aspects of beamforming, at all spatial locations at an instant in time. The PSF would be the time record of all the system ISRs. Using a linear algebra formulation for a receive element's ISR, it has been shown that the signal-to-noise ratio (SNR) and cystic resolution (CR) at the output of the beamformer can be expressed as [I]:

$$SNR_{out} = \sqrt{\frac{\Delta_{\overline{x}}^2 \sigma_N^2 w^T R_{tot} w}{w^T R_E w}}, \quad (12)$$

$$CR = \sqrt{\frac{\Delta_{\overline{x}}^2 \sigma_N^2 w^T (R_{out} + R_E) w}{\Delta_{\overline{x}}^2 \sigma_N^2 w^T (R_{tot} + R_E) w}}, \quad (13)$$

Note that these values are calculated at an instant in time. The $R_{tot}$ matrix represents the inner product of the propagation matrix describing the ISR of the aperture at all points in space. The propagation matrix has columns corresponding to the spatially sampled individual receive element ISRs. The $R_{out}$ matrix represents the inner product of the propagation matrix describing the ISR at all spatial points that lie outside a specified cyst boundary. The constant $\sigma_N^2$ is the variance of the target scattering function, which is modeled as a stationary, zero-mean, multivariate normal (MVN) stochastic process: $N(\overline{x}) \sim MVN(0, \sigma_N^2 I)$, where I is an identity matrix. $R_E$ is the noise autocovariance matrix. The $\Delta_{\overline{x}}$ term is a constant related to the volume of the discrete spatial sampling and accounts for the approximation of the continuous spatial integral in equation (11) with the linear algebra formulation using a discrete summation of vectors. It is assumes that the noise is spatially and temporally uncorrelated so its autocovariance matrix reduces to: $R_E = \sigma_k^2 I$. Without loss of generality, one can combine the $\Delta_{\overline{x}}$ constant, the scattering medium's variance, $\sigma_N^2$, and noise variance, $\sigma_E^2$, into one parameter, $\sigma_{load}^2 = \sigma_E^2 / \Delta_x^2 \sigma_N^2$, and simplify the above equations:

$$SNR_{out} = \sqrt{\frac{w^T R_{tot} w}{\sigma_{load}^2 w^T w}}, \quad (14)$$

$$CR = \sqrt{\frac{w^T (R_{out} + \sigma_{load}^2 I) w}{w^T (R_{tot} + \sigma_{load}^2 I) w}}, \quad (15)$$

Note that the $\sigma_{load}^2$ parameter is a scaled version of the noise variance, and in most clinical imaging scenarios quantifying $\sigma_N^2$ is intractable. Typically, cystic resolution curves are presented as a function of receive channel input SNR and cyst radius. Input SNR into the beamformer on one channel is calculated as:

$$SNR_{in} = \sqrt{\frac{\Delta_{\overline{x}}^2 \sigma_N^2 w_k S_k^T S_k w_k}{w_k R_{E_k} w_k}} = \sqrt{\frac{S_k^T S_k}{\sigma_{load}^2}}. \quad (16)$$

$S_k$ is a vector describing the ISR for one receive channel, k, and $R_{E_k}$ is the noise autocovariance on the kth channel. Like $SNR_{out}$ and CR above, input SNR, $SNR_{in}$, is also calculated at an instant in time. Given the system's spatial response and assumptions about the noise statistics, input SNR to the beamformer is simply a function of $\sigma_{load}^2$.

Implementation

By describing the ISRs for every point in the final image, a full set of optimal dynamic receive aperture weights (i.e., tap weights) for the beamformer 10 can be calculated. In the most generic implementation, the calculated receive aperture weights require the FIR filters 18 to be spatially and temporally variant relative to one another. Consequently in order to achieve this spatial and temporal variance, this would require computing a new set of channel unique FIR filters for each image point. A simpler embodiment of the present invention employs a linear array 2 with no beamsteering, so that the FIR filters 18 on each channel are only depth dependent. While the most generic implementation would require independent filter weights at each range, empirical experimentation has shown that these weights need not vary rapidly over range to achieve excellent image contrast. Alternate implementations might employ beamsteering for more generic imaging and would in turn require varying the filter taps across scan angle.

Once the set of receive channel FIR filters has been computed, the implementation of the FIR beamformer 10 is straightforward. In order to clarify implementation, reference is made back to the five-tap FIR beamformer architecture in FIG. 2. At an instant in time, $t_i$, each tap 20T on each receive channel has one RF sample. Taps B, G (not shown) and L have the RF samples associated with one particular receive focus, $z_i$. Taps A, F (not shown) and K have RF samples associated with receive focus $z_{i-1}$, taps C, H (not shown) and M have RF samples associated with receive focus $z_{i-1}$, taps D, I (not shown) and N have RF samples associated with receive focus $z_{i-3}$, and taps E, J (not shown) and O have RF samples associated with receive focus $z_{i-3}$. At this instant in time all RF samples on every channel are multiplied by their respective tap weights and summed in order to form one FIR beamformed sample in the output RF line. Note that the embodiment of FIG. 2 assumes a symmetrical array and therefore a system without beamsteering. This is just one possible embodiment and alternative implementations without such limitation are straightforward.

At the next instant in time, $t_{i+1}$, an entire new set of five-tap FIR filter weights for each channel are loaded (the FIR filters are depth dependent). (As stated above, the same FIR filter weights may be reused to simplify implementation, often with little reduction in image quality.) The RF samples with receive focus $z_{i+1}$ that were associated with taps A, F (not shown) and K move to taps B, G (not shown) and L, respectively. Likewise the RF samples with receive focus z, associated with taps B, G (not shown) and L move to taps C, H (not shown) and M, respectively, the RF samples with receive focus $z_{i-1}$ associated with taps C, H (not shown) and M move to taps D, I (not shown) and N, respectively, and the RF samples with receive focus $z_{i-2}$ associated with taps D, I (not shown) and N move to taps E, J (not shown) and O, respectively. The RF samples that were in E, J (not shown) and O are discarded. A new set of RF samples with receive focus $z_{i+2}$ move into the FIR beamformer at taps A, F (not shown) and K. Then all RF samples are multiplied by their respective tap weights and summed, forming the next sample in the FIR beamformed A-line. This process repeats until the entire summed RF line has been formed. The determination as to when an entire summed RF line is complete is typically dependent upon a user setting which is based on the depth to which the user wishes to penetrate/image an object. Most imaging systems have a knob for user operation to set the scan depth. Scan converter 45 forms a B-mode image from a number of A-lines based on a function of frame rate, depth, channel number, display screen, and transducer size. A typical number of A-lines used to form a B-mode image ranges from about 256 to about 1024, although this may vary. Typically, the user selects a tradeoff between framerate and resolution. At a high framerate and low resolution the beams will be broad and there will be fewer A-lines per image. At low frame-rate and high resolution each beam is narrow and more beams are needed to form a single image. In addition, some systems allow the user to select the width of the scan, which also alters the number of A-lines. Thus, the number of A-lines used to make up a B-mode image is largely determined by the user interacting through the controller. The scan converter 45 processes the A-Line data to form a B-Mode image.

Figure 4:
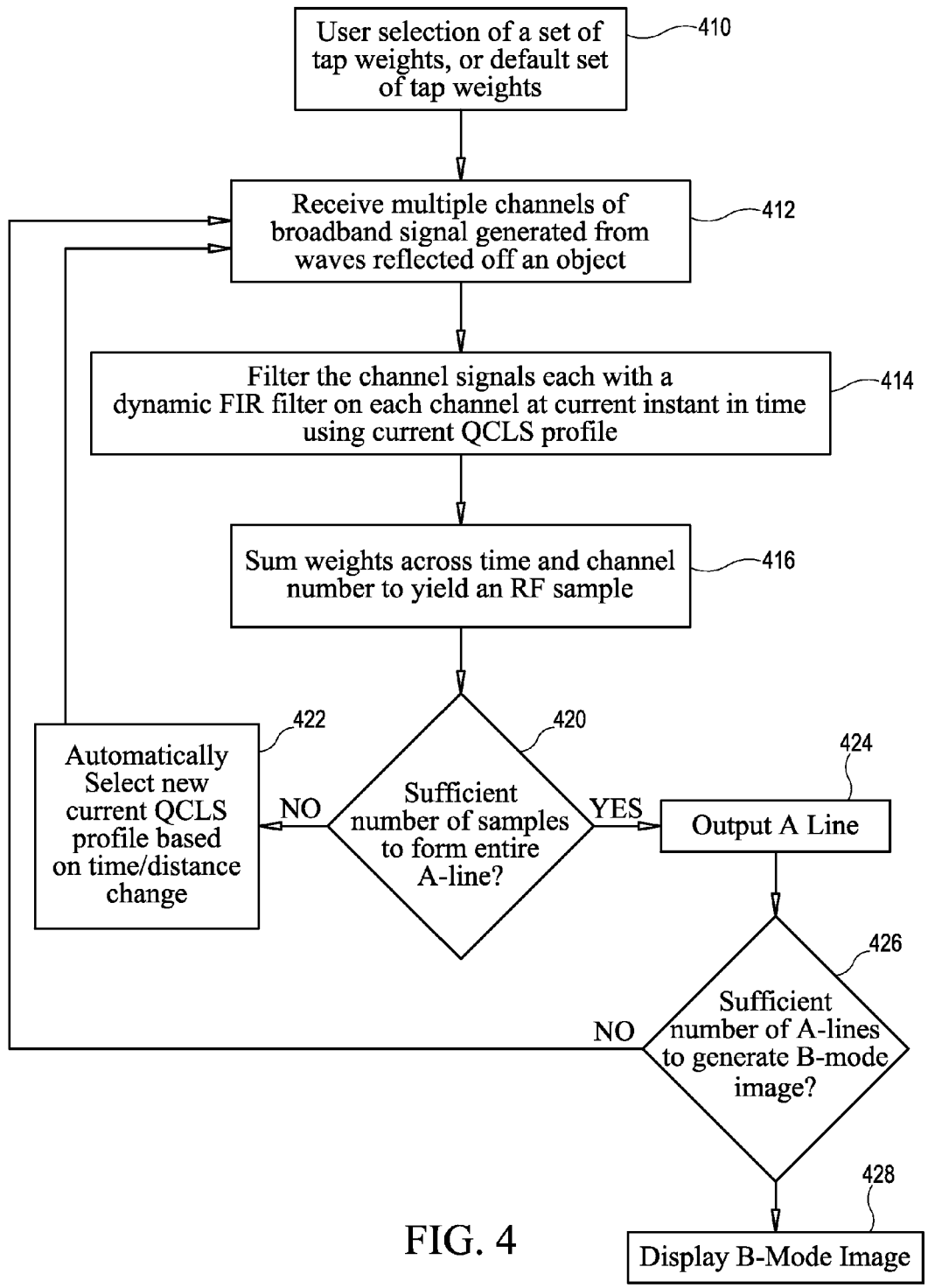
FIG. 4 illustrates events that may be performed in a method of applying dynamic receive apodization to a broadband imaging signal according to an embodiment of the present invention.

FIG. 4 illustrates events that may be performed in a method of applying FIR filter based dynamic receive apodization to a broadband imaging signal according to an embodiment of the present invention to optimize contrast and resolution of an image produced therefrom. At event 410, a user may optionally select parameters defining FIR an apodization, including selection of a set of tap weights to be used initially in the FIR filters 18. Alternatively, if the user does not make a selection, the system 100 may use a default FIR scheme, including a default set of initial tap weights.

At event 412, the system 100 receives multiple channels of broadband signals generated from waves reflected off of an object to be imaged. Array 2 may be used to transduce the received signals to RF signals that are input to receive beamformer 10. The broadband signals may be signals generated by reflecting energy off of any type of object that will reflect the energy, using any type of broadband imaging system. In at least one embodiment, the broadband imaging system is an ultrasound imaging system. In at least one embodiment, the object is living tissue or is located in living tissue. In at least one embodiment, the energy is reflected off of the object during an in vivo procedure.

After applying the appropriate delays 12 the channels of signals are then weighted at event 414 using dynamic FIR filters 18 with the currently selected tap weights. Next, at event 416 the weighted outputs from the taps are summed across time and channel number to yield an RF sample used to form an A-line. At event 420, it is determined at the envelope detector 40 whether there are a sufficient number of samples to form an entire A-line. If there are not yet a sufficient number, then a new FIR apodization profile is automatically selected at event 422 to replace the existing FIR filter weights. These weights differ from those being replaced as a function of the change in distance (represented by the change in sample time).

Processing then returns to event 412, where the signals advance in a manner as described above, and then at event 414 the channel signals are multiplied by the dynamic FIR filters using the new current weights (i.e., new tap weights). Events 422, 414, 416 and 420 are iterated until such a entire A-line can be formed. As noted above, the QCLS profiles change as a function of distance from the array to the object. When a sufficient number of samples have been formed to make an A-line at event 420, then the A-line is outputted at event 424 by envelope detector 40 to scan converter 45. At event 426 it is determined whether a sufficient number of A-lines have been received by the scan converter 45 from envelope detector 40 to generate a B-mode image. The scan converter 45 accumulates the A-line to form a B-mode image, which is then outputted to purge the scan converter 45 of the current A-lines, and the B-mode image is displayed on display 50 at event 428. An exemplary three-dimensional scan converter is described in U.S. Pat. No. 5,546,807.

Figure 5:
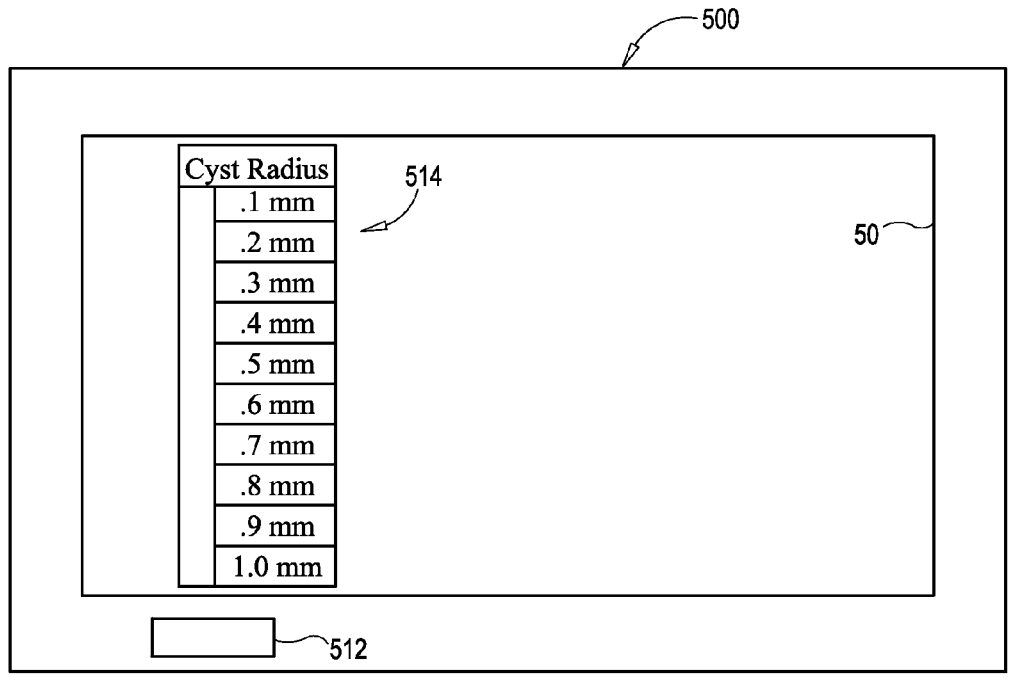
FIG. 5 is a schematic illustration of a user interface according to an embodiment of the present invention, including a display upon which images generated by processing according to the present invention are displayable.

FIG. 5 is a schematic illustration of a user interface 500 including display 50 upon which images generated by processing according to the present invention are displayable. Additionally user interface may include a user selectable feature that allows a user to select a particular set of tap weights to be used in the FIR filters 18, such as at event 410 for example. These tap weight are selected based on cyst size. Additionally, the user may also select a desired SNR/beamformer sensitivity. A further alternative is to provide the system with a user adjustable feature such as a knob, wherein the user can adjust the knob to select an acceptable tradeoff between image resolution and image contrast, which is accomplished by varying the tap weights/cyst size in the same manner described above, but only the interface to the user is provided differently. As an example of cyst size selection, by mouse-clicking or using some other input gesture to select button 512, a menu 514 may pop up on display 50. From this menu, the user can select a cyst size that will determine the tap weights to be used in the FIR filters 18. The tap weights are stored in one or more look-up tables 600.

Figure 6:
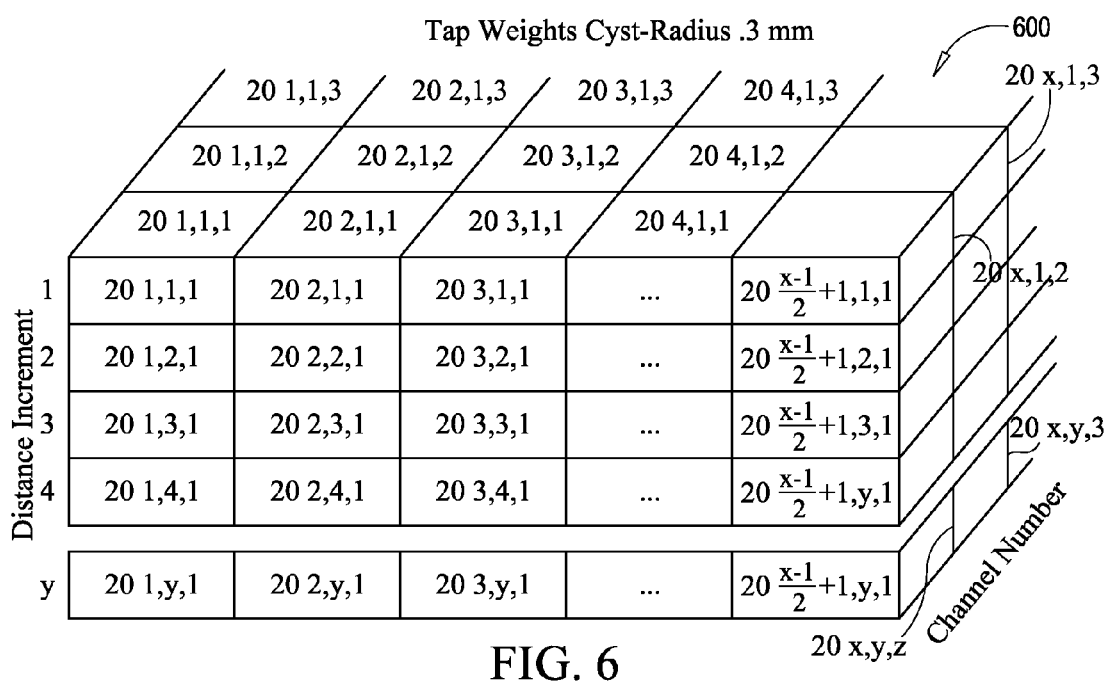
FIG. 6 illustrates a table of tap weights having been pre-calculated for a cyst radius of about 0.3 mm at various distances for a multiplicity of taps and channels.

FIG. 6 illustrates the tap weights having been pre-calculated for a cyst radius of about 0.3 mm at various distances I through Y, for each channel number (while there are a total of five channels for the example shown in FIG. 2. the assumption of symmetry allows storage of only three channels worth of taps). Because of the assumption of symmetry, only $$\frac{X-1}{2} + 1$$

(for an odd number of channels) or $$\frac{X}{2}$$

(for an even number of channels) columns of weights need be stored (a total of three columns for the example of FIG. 2. For each distance, a tap weight 20 is stored for each tap of each FIR filter (channel). At event 422, the system increments from the current distance, to the next consecutive distance, selects the tap weights in the row for that distance and replaces the current tap weights with the newly selected tap weights.

Robust FIR Beamformer

The QCLS apodization design algorithm described above can be used in a FIR beamformer 10 that produces optimized cystic resolution superior to the DAS beamformer 1000, by applying multi-tap 20 FIR filters 18 in the beamformer 10 as described above (e.g., see FIG. 2) while ignoring electronic noise. In the previously described embodiments, the QCLS algorithm minimized equation (15) in the absence of noise ($\sigma_{load}^2$=0). In the robust FIR beamformer embodiments, the QCLS algorithm is extended to include system SNR by setting a particular $\sigma_{load}^2$ value. In the following examples we assume an overly simplistic model for electronic noise. Specifically we assume that the electronic noise is modeled as a multivariate normal stochastic process which is uncorrelated in time and across receive channel. This simplifies the noise autocovariance matrix, $R_E=\sigma_E^2 I$, where I is an identity matrix. In certain scenarios designers may wish to use a more general noise model, or estimate the noise autocovariance experimentally or analytically. Mathematically incorporating noise into the QCLS design procedure constrains the beamformer's output SNR. In this scenario the robust QCLS algorithm minimizes the CR equation in (15), which includes the $\sigma_{load}^2$ diagonal loading term. The optimal QCLS apodization profile that minimizes CR is the eigenvector associated with the minimum positive eigenvalue from the generalized eigenvalue decomposition problem of matrices ($R_{out}+\sigma_{load}^2 I$) and ($R_{tot}+\sigma_{load}^2 I$). Note that a new optimal robust QCLS apodization profile is calculated for each value of $\sigma_{load}^2$. The generalized eigenvalue problem for a matrix pair (A, B) both n by n matrices, is finding the eigenvalues, $\lambda_k$, and the eigenvectors, $x_k \neq 0$, such that:

$$Ax_k = \lambda_k Bx_k \qquad (17)$$

This eigenvalue problem is efficiently computed using the eig( ) function in MATLAB. Although implementation of the QCLS algorithm with diagonal loading is conceptually simple, the effect that this modification has on the resultant optimal weights and beamformer response is unclear. In general, increasing $\sigma_{load}^2$ during the QCLS apodization design procedure will widen the response's mainlobe, raise sidelobe levels, and improve SNR performance of the receive beamformer. In order to further highlight the relationship between SNR and CR of the beamformer, three different cases for the loading constant are described as follows:

Case I: $\sigma_{load}^2$=0, Infinite Electronic SNR

Given this loading value, equation (15) becomes equation (18) as follows:

$$CR = \sqrt{\frac{w^T R_{out} w}{w^T R_{tot} w}}, \qquad (18)$$

Equation (18) is the equation for cystic resolution in the absence of noise. According to equation (14), the output SNR of the beamformer is infinite since $\sigma_{load}^2$=0.

Equation (18) is the cost function minimized to produce the quadratically constrained least squares (QCLS) apodization profiles for optimal cystic contrast in the examples described above, previous to the description of the robust FIR beamformer. The results (see Example 1 below) showed that a 20 dB improvement in cystic resolution, relative to the DAS beamformer of FIG. 1, was achievable with the QCLS algorithm and the receive FIR beamformer architecture of FIG. 2. However, this increase in contrast resolution came with a significant loss in beamformer sensitivity.

Case II: Max Eigenvalue($R_{out}$)<<$\sigma_{load}^2$, Poor Electronic SNR

The function eigenvalue(A) denotes a column vector containing all the eigenvalues of matrix A. Note that both $R_{out}$ and $R_{tot}$ are n by n full rank matrices and therefore will have n distinct eigenvalues. The maximum eigenvalue of $R_{out}$ will be less than the maximum eigenvalue of $R_{tot}$ because $R_{out}$ represents only a fractional portion of the total ISR energy specified by the matrix $R_{tot}$. For this $\sigma_{load}^2$ case, the $R_{out}$ matrix in the numerator of the CR equation is dominated by the diagonal loading:

$$CR = \sqrt{\frac{w^T(R_{out}+\sigma_{load}^2 I)w}{w^T(R_{tot}+\sigma_{load}^2 I)w}} \rightarrow \sqrt{\frac{w^T(\sigma_{load}^2 I)w}{w^T(R_{tot}+\sigma_{load}^2 I)w}} \qquad (19)$$

$$= \sqrt{\frac{\sigma_{load}^2 w^T w}{\sigma_{load}^2 w^T w + w^T R_{tot} w}}.$$

Applying the QCLS optimal apodization design algorithm, the minimization of equation (19) in order to produce optimal contrast is the same as maximizing the inverse of equation (19):

$$\max_w \frac{1}{CR} = \max_w \sqrt{\frac{\sigma_{load}^2 w^T w + w^T R_{tot} w}{\sigma_{load}^2 w^T w}} \qquad (20)$$

$$= \max_w \left(1 + \sqrt{\frac{w^T R_{tot} w}{\sigma_{load}^2 w^T w}}\right)$$

$$= \max_w SNR_{out}.$$

For this case of diagonal loading (poor electronic SNR), the apodization profile that produces optimal contrast is the apodization profile that maximizes the SNR at the output of the receive beamformer. This makes intuitive sense; in a noisy environment, the beamformer maximizes the SNR in order to optimize contrast.

Case III: Max Eigenvalue($R_{tot}$), <<$\sigma_{load}^2$, Extremely Poor Electronic SNR In the extreme case that the noise power far exceeds the sensitivity of the system, i.e. SNR=0, the cystic resolution equation becomes:

$$CR = \sqrt{\frac{w^T(R_{out}+\sigma_{load}^2 I)w}{w^T(R_{tot}+\sigma_{load}^2 I)w}} \rightarrow \sqrt{\frac{w^T(\sigma_{load}^2 I)w}{w^T(\sigma_{load}^2 I)w}} \qquad (21)$$

$$= \sqrt{\frac{\sigma_{load}^2 w^T w}{\sigma_{load}^2 w^T w}}$$

$$= 1.$$

The $R_{out}$ and $R_{tot}$ matrices are dominated by the loading term. In this case it does not matter what the beamformer weights are, the noise completely dominates any relevant signal making the cyst undetectable.

The three $\sigma_{load}^2$ cases point to an interesting relationship between beamformer output SNR and CR. Depending on the level of diagonal loading, or input SNR into the beamformer, the optimal QCLS beamformer weights change from minimizing CR (when $\sigma_{load}^2$=0), to maximizing SNR (when max eigenvalue($R_{out}$)<<$\sigma_{load}^2$), to being completely arbitrary (when max eigenvalue($R_{tot}$) <<$\sigma_{load}^2$). In other words, $\sigma_{load}^2$ parameterizes the QCLS beamformer's cystic resolution as a function of SNR. Therefore, receive channel input SNR can be viewed as a design parameter, and optimal operating conditions can be determined along the SNR-CR design curve. Note that in all loading cases the QCLS algorithm minimizes the cystic resolution equation in (15).

Example SNR-CR Design Curves

The $\sigma_{load}^2$ parameter can be used with the GCR metric to investigate the robustness of an arbitrary beamformer under different input SNR conditions. In the present invention, $\sigma_{load}^2$ is used as a design parameter in the QCLS algorithm when constructing the FIR filters 18 for the robust FIR beamformer. In order to differentiate between when the $\sigma_{load}^2$ parameter is used in the QCLS design algorithm and when it is used for analyzing SNR performance in the generalized cystic resolution metric, it is referred to herein as $\sigma_{design}^2$ when used as a design parameter and $\sigma_{load}^2$ when used in the metric.

FIG. 7A plots an exemplary SNR-CR design curve 650 for an arbitrary beamformer. Each point along the design curve represents a different $\sigma_{design}^2$ value and a different, optimal apodization window. For each window, cystic resolution was computed by substituting $\sigma_{design}^2$ for $\sigma_{load}^2$ in equation (15). In terms of the GCR metric, plot 650 corresponds to a plane at a constant cyst radius. As the value of the design loading parameter, $\sigma_{design}^2$, increases, the operating point moves to the left along the curve 650 and the design SNR decreases. Note that the "optimal window" would lie at the bottom left hand corner of FIG. 7A (increased contrast at poor SNR). On the right end of the design curve 650 is the maximum contrast resolution window 652 (i.e., Case I, described above). Near the other end of the SNR-CR design curve 650 lies a window 654 that maximizes beamformer sensitivity (i.e., Case II, described above). Further increasing $\sigma_{design}^2$ from this point (i.e., moving further left along the curve 650) does not change the optimal profile until computation reaches machine precision and the weights become completely arbitrary at window 656 (i.e., Case III described above). Using the shape of the design SNR-CR curve 650, one can easily quantify and visualize the tradeoff between sensitivity and contrast. The present invention identifies the "optimal" window 658 at the bottom "knee" of the sigmoidal SNR-CR design curve 650. At this point the beamformer 10 is achieving similar cystic resolution compared to the optimal contrast window 652 as well as increasing SNR performance.

FIGS. 7B-7E shows QCLS apodization profiles 660, 662, 664, 666 from different points along the SNR-CR design curve 650 according to points 656, 654, 658 and 652, respectively. FIGS. 7F-7I show cystic resolution curves 668, 670, 672, 674 for the four different windows 656, 654, 658 and 652, respectively, when analyzed using the GCR metric. These curves quantify performance of the different windows as a function of receive channel SNR (varying $\sigma_{load}^2$) at a constant cyst radius. Note that these curves would intersect the SNR-CR design curve at the Case III 656, optimal SNR 654, "knee" 658, and optimal CR 652 operating points on curve 650, respectively.

In general, as the design loading parameter increases, the beamformer's sensitivity increases while the contrast resolution performance decreases. However, given the sigmoidal shape of curve 650, for a slight decrease in contrast, large gains in sensitivity can be made, with these gains being maximized around the lower "knee" 658 of the curve 650.

Using the QCLS algorithm with added SNR constraint makes it possible to quantify the fundamental CR performance limits for any imaging system that can be reasonably well characterized. This lower bound would be a GCR surface; parameterized at every point by a new set of apodization weights calculated using a particular design SNR and design cyst radius. A user can select an operating point (i.e., one set of tap weights 20T) on this lower bound surface and then quantify that beamformer's clinical imaging performance as a function of cyst size and input channel SNR using the metric.

FIGS. 7A-7I highlight how the GCR metric can be used to design beamformers. The graphical representation of the metric condenses a great amount of information into simple curves (or surfaces) so that clinical imaging performance of different beamforming strategies can be evaluated. In the following sections the metric is used to design a robust FIR beamformer and to compare and analyze the diagnostic capabilities of several beamformer architectures.

Arbitrary Weighting Functions for Improved Spatial Responses

In certain imaging scenarios the characteristics of the system's point spread function (PSF) at specific spatial locations may be more important than at other spatial locations. For example, faster sidelobe rolloff may be desired when imaging near bone or the trachea since these bright off axis targets will add clutter to the image. In such situations, a spatial weighting function, $g(\vec{x})$, can be added to the QCLS algorithm that emphasizes or deemphasizes certain locations in the system's instantaneous spatial response.

For example, a weighting function $g(\vec{x})$ can be applied to decrease sidelobe levels preferentially in certain regions of the PSF. Such a weighting function can be defined as:

$$g(\vec{x}) = |\vec{x} - \vec{x}_{focus}|_n, \quad (22)$$

where $\vec{x}_{focus}$ is the receive focus of the aperture in three dimensional space and n=0, 1, 2, 3 . . . .

When n=0, no weighting is applied and as n increases, the QCLS algorithm will tend to decrease sidelobes further away from the focus at the expense of widening the mainlobe. A thorough derivation for applying the weighting function to the QCLS algorithm is described in Golub et al., *Matrix Computations,* 3 ed. Baltimore: Johns Hopkins University Press, 1996, which is hereby incorporated herein, in its entirety, by reference thereto. The weighted quadratically constrained least squares apodization profiles resulting form application of the weighting function described above are referred to as WQCLS (weighted quadratically constrained least squares) apodization profiles, that include WQCLS weights. FIR filters that use WQCLS apodization profiles are referred to as FIR-WQCLS filters. The SNR design constraint and the spatial weighting function can be combined to produce robust WQCLS apodization profiles as well.

Figure 8:
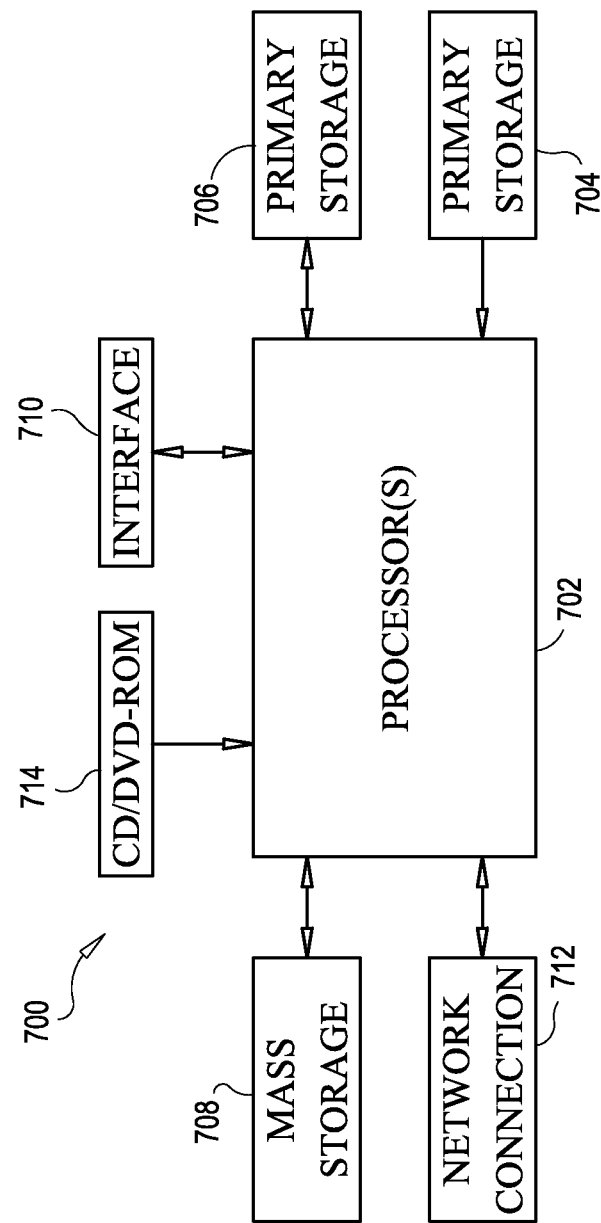
FIG. 8 illustrates a typical computer system, all or a portion of which may be incorporated into a system according to an embodiment of the present invention.

FIG. 8 illustrates a typical computer system, all or a portion of which may be incorporated into a system according to an embodiment of the present invention. The computer system 700 includes any number of processors 702 (also referred to as central processing units, or CPUs) that are coupled to storage devices including primary storage 706 (typically a random access memory, or RAM), primary storage 704 (typically a read only memory, or ROM). As is well known in the art, primary storage 704 acts to transfer data and instructions uni-directionally to the CPU and primary storage 706 is used typically to transfer data and instructions in a bi-directional manner. Both of these primary storage devices may include any suitable computer-readable storage media such as those described above. A mass storage device 708 is also coupled bi-directionally to CPU 702 and provides additional data storage capacity and may include any of the computer-readable media described above. It is noted here that the terms "computer readable media" "computer readable storage medium" "computer readable medium" and "computer readable storage media", as used herein, do not include carrier waves or other forms of energy, per se. Mass storage device 708 may be used to store programs, data and the like and is typically a secondary storage medium such as a hard disk that is slower than primary storage. It will be appreciated that the information retained within the mass storage device 708, may, in appropriate cases, be incorporated in standard fashion as part of primary storage 706 as virtual memory. A specific mass storage device such as a CD-ROM or DVD-ROM 714 may also pass data uni-directionally to the CPU.

CPU 702 is also coupled to an interface 710, which may include user interface 500, for example, and which may include one or more input/output devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. CPU 702 optionally may be coupled to a computer or telecommunications network using a network connection as shown generally at 712. With such a network connection, it is contemplated that the CPU might receive information from the network, or might output information to the network in the course of performing the above-described method steps. The above-described devices and materials will be familiar to those of skill in the computer hardware and software arts.

The hardware elements described above may implement the instructions of multiple software modules for performing the operations of this invention. For example, instructions for applying FIR apodization weights, instructions for summing, instructions for looking up tap weights in the look-up tables, instructions for envelope detection and instructions for displaying a B-mode image, and/or other instructions and/or algorithms, such as an algorithm for calculating tap weights, instructions for applying an arbitrary weighting function to the tap filters of the FIR beamformer, etc. may be stored on mass storage device 708 or 714 and executed on CPU 708 in conjunction with primary memory 706.

Implementation with Complex Data

Figure 9:
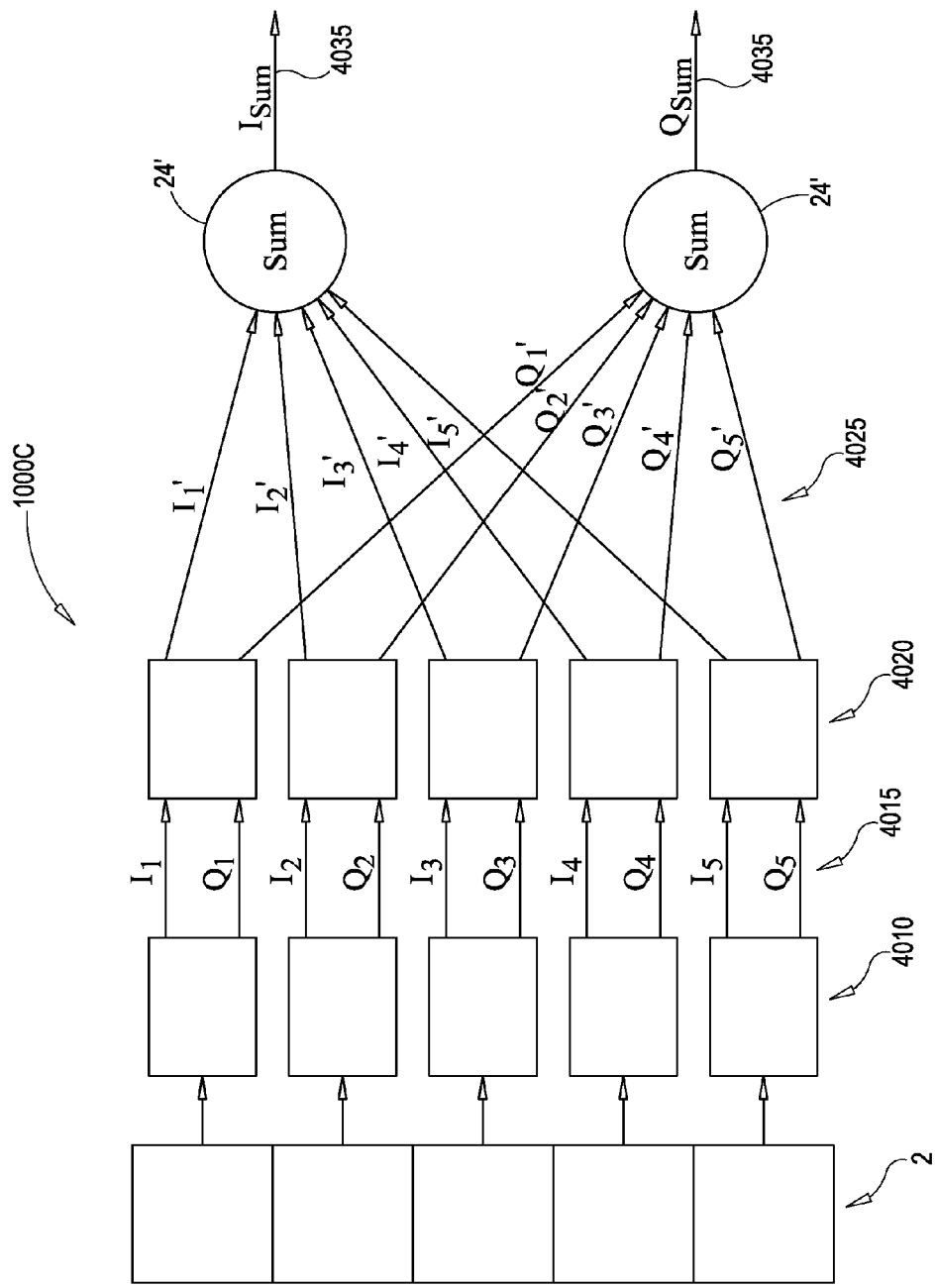
FIG. 9 is a schematic illustration of a prior art complex beamformer.

The majority of broadband ultrasound beamformers use directly sampled RF data as described in the preceding embodiment. In other domains, and in some ultrasound imaging systems however the received data undergoes complex demodulation to reduce the bandwidth required to carry signals throughout the system. Such complex demodulation schemes are particularly common in broadband communications, RADAR, and SONAR systems. One conventional embodiment of such a system 1000C is shown in FIG. 9. The transducer array 2 outputs signals to the demodulator circuits 4010. Demodulators 4010 each use an input demodulation waveform (not shown) to determine both the demodulation frequency and phase. In one simple embodiment each channel in the array uses an identical demodulation waveform so that all signals are demodulated at the same frequency and with the same phase. The demodulated output 4015 comprises two signals that are considered to be 90° out of phase from one another. These signals are typically referred to as the In-Phase and Quadrature components, or the I and Q components. Each channel has its own I and Q signal representing the signal from the transducer array 2. The complex demodulated signals 4015 are input to a focusing component 4020. This focusing component may include a combination of FIFO memories to implement whole sample time delays and a phase rotator to implement sub-sample delays. Such a beamformer is described in detail in U.S. Pat. No. 5,797,847 which is hereby incorporated by reference in its entirety. The outputs of focusing components 4020 comprise focused I and Q signals 4025. These focused I and Q signals are in turn summed by summers 24' to yield summed I and Q signals 4035. These signals can then be envelope detected to form an A-line or otherwise processed to estimate blood or tissue velocities, or processed in any of a number of other manners to extract useful information.

Figure 10:
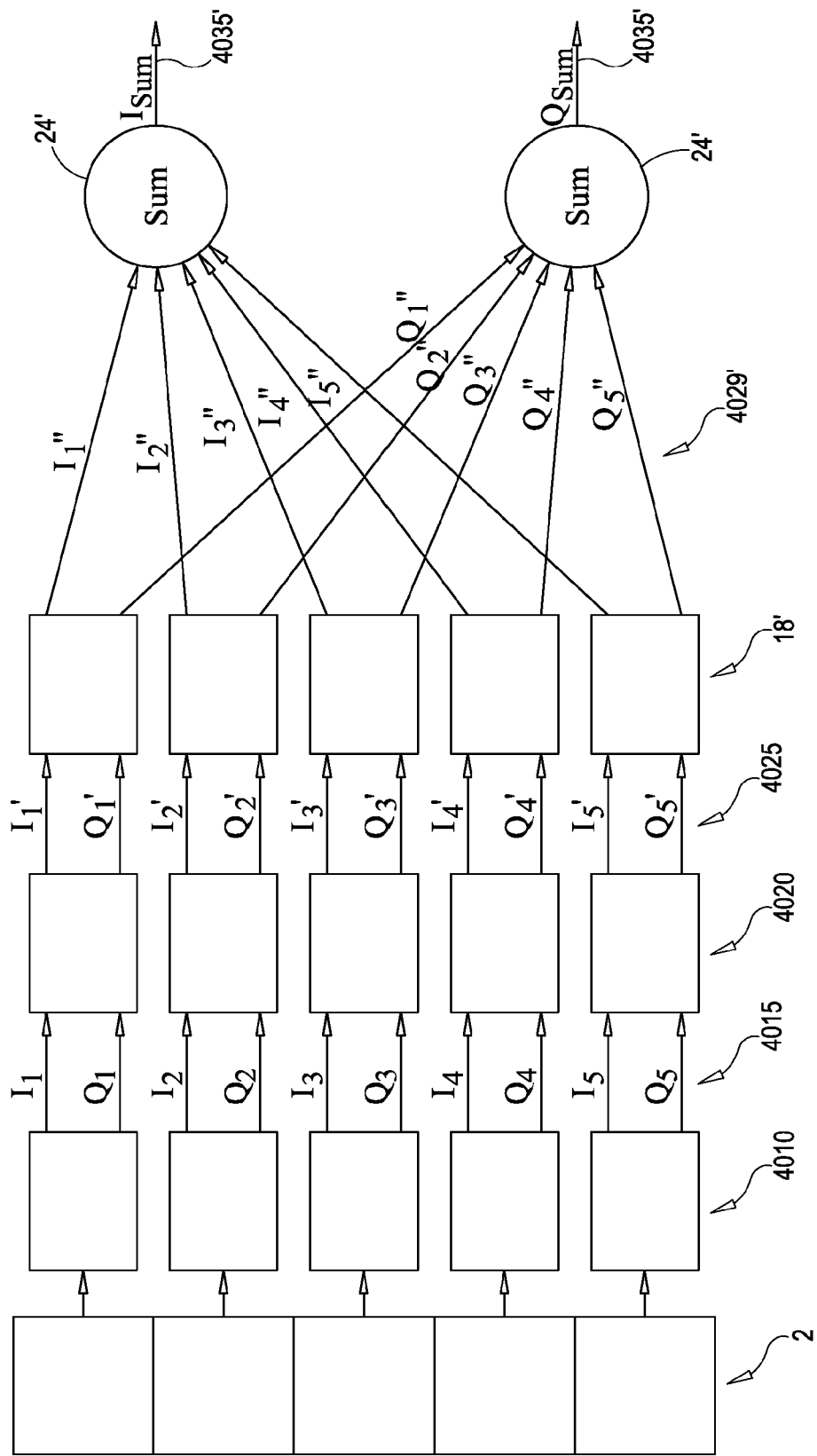
FIG. 10 is a schematic illustration of a complex beamformer according to the present invention.
Figure 11:
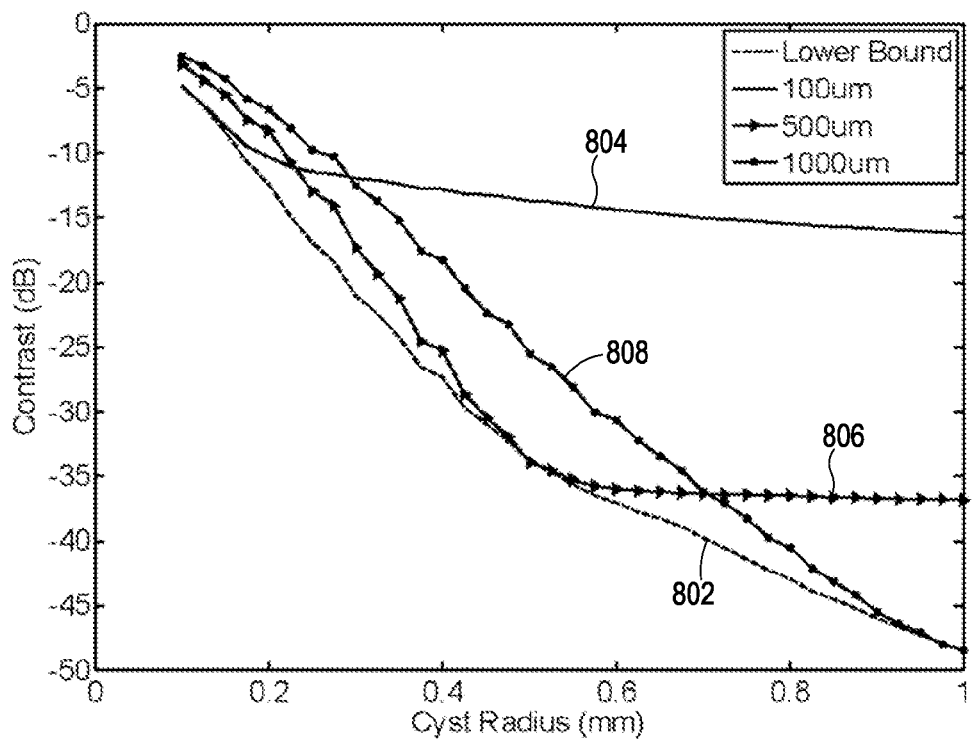
FIG. 11 shows cystic point contrast curves for a 5-tap FIR beamformer according to an embodiment of the present invention.

The complex beamformer 1000C of FIG. 9 can readily be modified to incorporate the present invention as shown in FIG. 10. The notable difference between the conventional beamformer 1000C of FIG. 9 and the complex beamformer 10C according to the present invention shown in FIG. 10 is the addition of the FIR filter banks 18'. The focused outputs 4025 from the focusing components 4020 are input directly into the FIR filter banks 18'. These FIR filter banks incorporate banks of delays and weights analogous to those shown in FIG. 2. The delayed and FIR filtered outputs 4029' of the FIR filter banks 18' are then input to the summers 24' to form the summed I and Q channels 4035.'.

Unlike the FIR banks 18 of FIG. 2, the filter banks 18' may incorporate separate I and Q channel FIR filters. In one embodiment the filter banks 18' incorporate weights as simple phase rotations with amplitude scaling. Such an approach is necessary to maintain orthogonality (90° phase difference) between the I and Q channels. Mathematically such weights for a single tap of the complex FIR filter 18' can be applied using equation (23:):

$$I''+jQ''=(A+jB)(I'+jQ')=(AI'-BQ')+j(AQ'+BI') \qquad (23)$$

This weighting scheme can be readily implemented using the present invention. The FIR weight design methods described above can also be applied in a straightforward manner to determine optimal weights by simply using complex ISRs and complex weights.

Using FIR Apodization to Expand the Depth of Field on Transmit

While high-end ultrasound imaging systems universally use dynamic receive focusing to apply optimal focusing throughout range on receive, their transmit focusing capability is much more limited. If a low f-number is used on transmit then fine image resolution is possible at the focus, but the short depth of field will result in poor transmit resolution away from the focus. If a higher f-number is used on transmit then the resolution at the focus will be degraded, but this resolution will degrade more slowly away from the focus. Apodization of the transmit aperture offers some ability to balance focal resolution and depth of field. This problem has previously been addressed by both Hossack and Ranganathan (see references above), although both of the proposed methods have limitations that limit their utility. Hossack's method requires transmit waveforms consisting of long temporal sequences and subtle waveform changes which may be difficult to implement in modern hardware. Ranganathan's approach requires a desired system response as an input. As the characteristics of an ideal response is well known, but its actual shape is not, this makes it difficult to effectively apply Ranganathan's approach.

The FIR apodization scheme of the present invention offers a way to maintain high resolution at the focus and expand the depth of field during transmission. One version of the optimization problem for computing the FIR filter weights is represented as:

$$\min_w \|S_{out}w\|^2 \text{ subject to the quadratic constraint } \|S_{in}w\|^2 = 1, \quad (24)$$

Our goal in expanding the transmit depth of field is not to improve the contrast of a single cyst at the focus, but is rather to enhance the contrast of a series of cysts located along the beam line, but at differing ranges. If we consider a simple situation with three cysts of interest then the propagation matrix for each of these cysts can be represented as $S_1$, $S_2$, and $S_3$. Each of these propagation matrices can be manipulated to form propagation matrices for the inside and outside of each of these cysts. The overall propagation matrix considering the outer regions of all the cysts is $$S_{out} = \begin{bmatrix} S_{1out} \\ S_{2out} \\ S_{3out} \end{bmatrix}.$$

The overall propagation matrix considering the inner regions of all the cysts is $$S_{in} = \begin{bmatrix} S_{1in} \\ S_{2in} \\ S_{3in} \end{bmatrix}.$$

Substituting these expressions into equation (24) will solve for the FIR filter weights that simultaneously optimize cystic point contrast across the full set of cysts.

In medical ultrasound it is common that frequency dependent attenuation reduces the amplitude of signals received from deeper ranges. This effect can be taken into account by differentially weighting the propagation matrices from the different cysts before combining them. The cysts which have attenuated system responses will typically need to be weighted more highly for the FIR filter weights to be computed in a manner that fairly weights these cysts.

Using FIR Apodization to Improve Robustness to Phase Aberration

Phase aberration, that is inhomogeneities in the speed of sound of tissue, has long been considered a major limitation to clinical ultrasound image quality. While the examples below will show that the FIR apodization scheme of the present invention is intrinsically robust to typical aberrations, the Quadratically Constrained Least Squares FIR weight design method can be employed to design weights that are even more robust to phase aberrations.

If the statistical properties of typical phase aberrations are known then it is possible to form a propagation matrix S for each of a number of possible realizations of the phase aberration. These system models can be concatenated to yield an overall propagation matrix that captures the variability of the phase aberrators and their impact on system performance. In one simple case the propagation matrices would be formed from only three aberrator realizations so that $$S_{out} = \begin{bmatrix} S_{1out} \\ S_{2out} \\ S_{3out} \end{bmatrix}$$

and $$S_{in} = \begin{bmatrix} S_{1in} \\ S_{2in} \\ S_{3in} \end{bmatrix}.$$

The FIR filter weights could then be determined using equation (9).

To form highly robust weights one would likely employ dozens or even hundreds of aberrator realizations, rather than the three described above. Furthermore, the aberrator models might be adjusted to incorporate amplitude aberration, or even spatially distributed aberrations.

Phase aberrations not only reduce image contrast and resolution, but because they often apply a linear phase tilt across the array they tend to shift the image slightly in angle. Since the image shift is not typically important it may be desirable to ignore this effect when determining FIR filter weights to optimize cystic contrast. This can be done by adjusting the center of each mask used to form $S_{in}$ and $S_{out}$ so that it lies at the apparent cyst center, after aberrator induced image shifting.

Applying FIR Apodization in DSIQ Beamforming

The Direct Sampled In-phase Quadrature (DSIQ) beamformer was designed to be a low complexity, low power beamformer. It can be used with very low complexity analog electronics and can implement focusing using simple digital multiplication. Although it offers significant advantages in terms of power consumption and system complexity, DSIQ beamforming has generally been viewed as offering relatively poor image quality because of intrinsic tradeoffs and simplifying assumptions it incorporates. Application of the FIR filter apodization scheme of the present invention can significantly improve the performance of the DSIQ beamformer.

A key difference between the DSIQ beamformer and the other beamformers considered in this disclosure is that the DSIQ beamformer is optimized to form C-Scan images (image planes parallel to the transducer face). As such, it does not form the long time records (RF lines and A-Lines) that are typical for other beamformers. However, as with other beamformers, envelope detection must be performed to produce an image that can be interpreted by users. This requires an alternate approach to envelope detection. In the conventional DSIQ beamformer the output at each pixel consists of a complex value, A+jB, where j=sqrt(-1). The magnitude of the output image at that point (i.e. the envelope) is simply computed as $(A+jB)(A-jB)=A^2+B^2$.

The most straightforward implementation of the DSIQ beamformer with FIR weights is to simply assume that the DSIQ pairs (i.e. samples acquired one quarter period apart) form a single complex sample. In this situation the computed weights are also considered complex and the design process is analogous to that used for complex demodulated signals as described above. If we incorporate a generic noise model (design following the robust algorithm) then the problem can be stated mathematically as solving the generalized eigenvalue problem given as:

$$(S_{out}^T S_{out} + \sigma_{load} R)w = \lambda (S_{tot}^T S_{tot} + \sigma_{load} R)w \quad (25)$$

Where R is the covariance function of the noise. This expression will yield a set of FIR filter weights consistent with the assumption that the DSIQ sample pairs are representative of an underlying complex signal.

Although the above design process assumes that DSIQ pairs are strictly equal to complex signals, they are not. To assume that they are, and require simple complex weights, limits the potential improvements available from the FIR beamformer and associated weight design method. A variety of alternative design methods can be employed to include more flexibility in the design and application of the weights.

In one method of designing FIR filter weights for a DSIQ beamformer, two sets of scalar weights are designed to generate two outputs from the beamformer. An additional design goal is also added to encourage orthogonality between the two outputs and therefore make their combination appropriate for detection. One method of encouraging this orthogonality is to make use of a second propagation matrix, T, which is the axial Hilbert Transform of the true propagation matrix S. Note that T must be orthogonal to S by virtue of the application of the Hilbert Transform. It does not however explicitly model any aspect of the system, but is rather a mathematical construct used to induce orthogonality between the two outputs (per pixel) of the DSIQ beamformer. Utilizing this construct the FIR filter weight design problem becomes:

$$\min_{w}(\|S_{out}w_0\|^2 + \|S_{out}w_1\|^2 + \gamma\|Sw_0 - Tw_1\|^2 + \|E(w_0 + w_1)\|^2) \quad (26)$$

subject to $$\|S_{in}w_0\|^2 + \|S_{in}w_1\|^2 = 1$$

The E term of this expression encompasses electronic noise. Note that the noise term is not included in the constraint in this particular case. The noise term may alternatively be included and the resulting FIR filter weights will have a somewhat different sensitivity to noise. Likewise, the constraint in this example uses only the system model for the echoes originating from the inside of the cyst. Alternatively the system model for the entirety of the field might be used. Again, the solution will be somewhat different but would fall within the scope of the present invention. The solution of the above problem can be found via a generalized eigenvalue problem of the form:

$$\left(\begin{bmatrix} S_{out}^T & S_{out}0 \\ 0 & S_{out}^T S_{out} \end{bmatrix} + \beta \begin{bmatrix} S^T S & -S^T T \\ -T^T S & T^T T \end{bmatrix} + \sigma_{load}\begin{bmatrix} R & 0 \\ 0 & R \end{bmatrix}\right)w = \quad (27)$$

$$\lambda\left(\begin{bmatrix} S_{tot}^T S_{tot} & 0 \\ 0 & S_{tot}^T S_{tot} \end{bmatrix}\right)w$$

Figure 32:
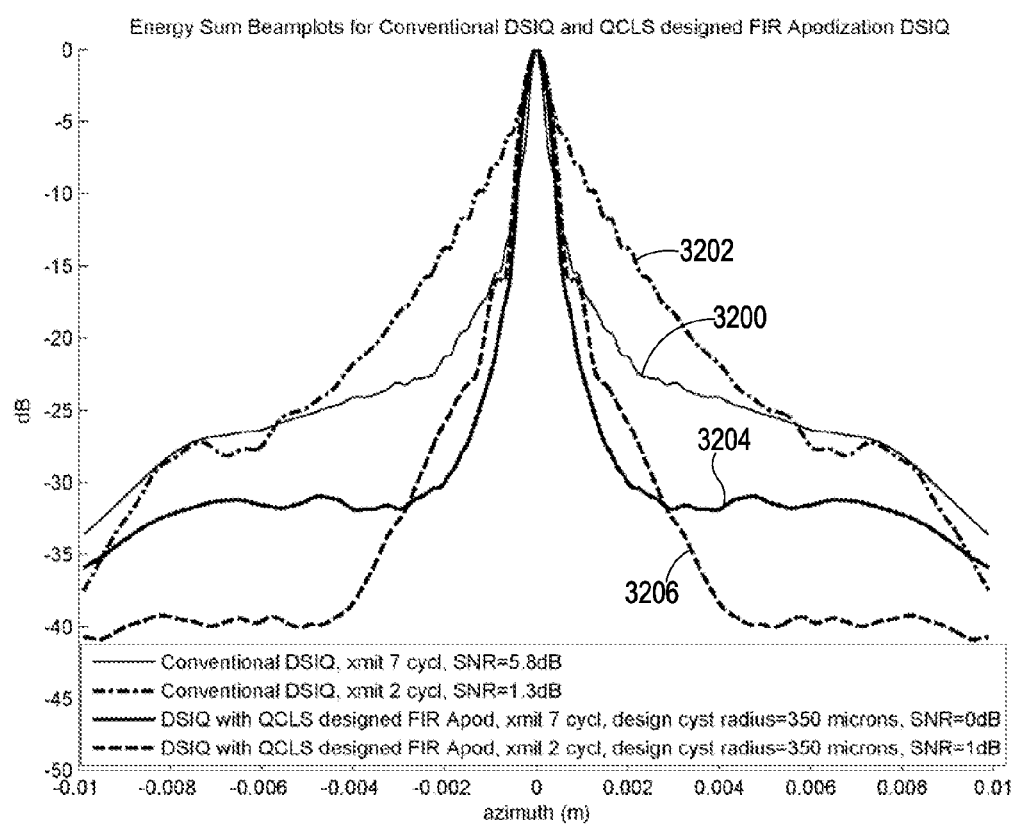
FIG. 32 shows integrated lateral beamplots for a conventional DSIQ beamformer and a DSIQ beamformer according to embodiments of the present invention.

Alternatively the S and T terms can be selected to encompass only the inner region of the cyst. The term β is a parameter adjusted by the designer to determine the importance of orthogonality between the two outputs of the beamformer. Other methods of encouraging orthogonality between the outputs can also be implemented. In going from equation DDD to equation EEE it should be recognized that the term R represents the autocorrelation matrix of the noise represented by E. FIG. 32 shows an integrated lateral beamplot 3200 for a conventional DSIQ beamformer with SNR=5.8 dB, an integrated lateral beamplot 3202 for a conventional DSIQ beamformer with SNR=1.3 dB, an integrated lateral beamplot 3204 for an embodiment of a DSIQ beamformer using designed FIR apodization according to the present invention, SNR=0 dB, and an integrated lateral beamplot 3206 for an embodiment of a DSIQ beamformer using designed FIR apodization according to the present invention, SNR=1B.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1

Comparing the FIR (Non-Robust) and the DAS Beamformers

A 64 element 150 μm pitch ID linear array operating at 6.5 MHz and 75% fractional bandwidth was simulated, using DELFI, a custom ultrasound simulation tool (e.g., see Ellis et al., "A Spline Based Approach for Computing Spatial Impulse Responses", IEEE Trans. on Ultrason., Ferroelect., Freq. Contr., vol. 54, no. 5, pp. 1045-1054, 2007, which is hereby incorporated herein, in its entirety, by reference thereto) that can be downloaded from the Mathworks MATLAB (The Mathworks, Inc., Natick, Mass.) file exchange website (mathworks.com/matlabcentral). All calculations were performed on an IBM Intellistation Z Pro (Processor speed 2.80 GHz, 4.00 Gb RAM, IBM Corporation, Armonk, N.Y.).

Instantaneous spatial responses were calculated in a 2D plane, azimuth and range, with a particular receive focus. Testing was performed to show the ability of the tap weights (QCLS) algorithm to produce optimal responses when using different FIR filter tap lengths (i.e., tap length referring to the number of taps used in a FIR filter) and different receive focal depths. FIR filter tap lengths ranging from 1-tap to 13-taps were implemented and the results of each were compared to ISR's produced using a prior art DAS beamformer with conventional apodization functions applied. In order to investigate the FIR beamformer 10 with multiple taps 20T on each channel, multiple ISRs with different receive foci were calculated. The receive focus of each ISR in the FIR beamformer 10 was separated by 19.3 μm in the axial direction. Thirteen ISRs were acquired/calculated with receive foci centered around a predetermined focal depth in order to calculate the unique 1, 3, 5, 7, 9, 11, and 13-tap FIR filters 10. For example, in order to calculate the tap weights 20 for the 3-tap 20T FIR filters 18 for the FIR beamformer 10 with a receive focus at 2.0 cm, the receive element ISRs that had receive foci of 1.99807 cm, 2.00000 cm, and 2.00193 cm, respectively were used. Each ISR was computed by spatial sampling by 20 μm axially and 50 μm laterally over a large enough area to acquire the entire response.

A cyst size was then specified. For example, a cyst size having a 300 μm radius was specified in one instance, in order to identify the spatial points that lie outside the cyst and inside the cyst to populate the ISR propagation matrices. Once the propagation matrices were populated, weights were calculated according to the QCLS algorithm previously described.

As noted previously, cyst size is an important parameter in the QCLS apodization design method: specifying the propagation matrices in equation (8) and implicitly defining main-lobe size in the resulting ISR. QCLS weights remains similar over a range of cyst sizes. A set of FIR apodization weights was calculated to achieve optimal contrast at every specified cyst size. FIG. 911 shows cystic point contrast curves for the 5-tap FIR beamformer 10 with a receive focus at 2.0 cm (also the transmit focus). Cystic contrast was computed using equation (8) with the ISR centered in the middle of the cyst and plotted as a function of cyst size (from 0.1 mm to 1.0 mm in radius). The dashed line 802 represents the cystic contrast lower bound for this particular beamformer 10 at the stated receive focal depth (i.e., 2.0 cm). This lower bound is constructed by calculating cystic contrast with the optimal apodization profile at each cyst size. The contrast curves for the 5-tap QCLS apodization profiles 804, 806, 808 corresponding to a design cyst radius of 100 μm, 500 μm, and 1000 μm, respectively. For each design cyst radius, the contrast curve 804, 806, 808 touches the lower bound 802 at that cyst size, and contrast performance suffers away from the design cyst size.

It has been determined that the QCLS profile around the "knee" of the lower bound curve 802 offers good performance over a large working range of cyst sizes. For example, in FIG. 911 the 500 μm contrast curve 806 achieves better contrast than the 1000 μm curve 808 for the smaller cyst sizes and also outperforms the 100 μm curve 804 for the larger cyst sizes. The 100 μm and 1000 μm curves 804, 808 show that operating at the extremes (the relatively smallest cyst sizes or the relatively largest cyst sizes) will produce optimal contrast at the specific small or large design cyst size, but performance is seriously degraded at other cyst sizes out of the either extremely small or extremely large range. For the remainder of the simulations, a 400 μm design cyst radius was used for the QCLS profiles unless otherwise noted.

As a result of the comparisons, it was determined that significant improvements in contrast resolution can be achieved with the FIR beamformer 10 using a modest filter tap length. FIG. 1012 shows cystic point contrast curves for the DAS beamformer 1000 and FIR beamformer 10 with a receive focus at 2.0 cm. The dashed vertical line 902 shows the design cyst radius. Cystic contrast curves 904, 906 and 908 are plotted for the DAS beamformer 1000 with Rectangular window, Hamming window, and Nuttall window apodization functions respectively, using a range of cyst sizes to compare performance with the results of the FIR beamformer using weights calculated for a 400 μm design cyst. Cystic contrast curves 910, 912, 914, 916, 918, 920 and 922 are plotted for the FIR beamformer 10 having 1-tap, 3-tap, 5-tap, 7-tap, 9-tap, 11-tap, and 13-tap length FIR filters 18, respectively, using 400 μm design cyst radius. Data were calculated from the ISRs focused at 2.0 cm on transmit (f/2) and 2.0 cm on receive (f/2). It can be observed from FIG. 1012 that for the particular criteria stated above, both the Hamming (see contrast curve 906) and Nuttall (see contrast curve 908) windows degraded the cystic contrast compared to the rectangular window (see contrast curve 904). In those cases, the reduction in sidelobe energy achieved through apodization did not outweigh the increase in mainlobe size of the resultant ISR. The FIR beamformer 10 employing a FIR filter 18 having seven taps 20T (i.e., 7-tap FIR beamformer, see contrast curve 916) improved cystic contrast by almost 20 dB and the 13-tap FIR beamformer (see contrast curve 922) improved contrast by almost 25 dB.

As noted, for the specifications and operating conditions noted above, the conventional receive Hamming window and Nuttall window apodization functions used in the DAS beamformer 1000 performed worse than flat apodization (i.e., using a rectangular window). Although the Hamming and Nuttall ISRs had lower sidelobes, the cystic resolution metrics showed that the lower sidelobes did not outweigh the resulting increase in mainlobe width. The 1-tap QCLS profile on the other hand lowers sidelobe levels, maintains a narrow mainlobe, and outperforms all the conventional apodization functions for a large range of cyst sizes, as shown by the resultant contrast curve 910. More compelling were the dramatic increases in cystic resolution when using the multi-tap FIR beamformer 10. The 3-tap FIR beamformer 10 improved contrast resolution by 10 dB (i.e., compare contrast curve 912 to contrast curve 904), the 5-tap by 15 dB, the 7-tap by 20 dB, and the 9-tap by more than 25 dB. Using even longer tap lengths (11 and 13) improved contrast a few more dB over the 9-tap curve but suggested that there is a limit to the increase in cystic contrast achievable by the FIR beamformer, and showed diminishing returns in the incremental amount of increase in cystic contrast.

In order to show the effects of receive focal depth on the FIR beamformer 10 relative to the DAS beamformer 1000 using a rectangular window, FIGS. 11A-11C13A-13C show integrated lateral beamplots, FIGS. 11D-11F13D-13F show plots of cystic contrast vs. cyst size, and FIGS. 11G-11I13G-13I show plots of cystic contrast vs. receive channel signal to noise ratio (SNR) curves comparing different apodization functions at different dynamic receive focal depths (1.0 cm, 2.0 cm and 3.0 cm, respectively, with transmission (Tx) focus fixed at 2.0 cm). The FIR-QCLS tap weights were calculated for 1-tap, 3-tap, 5-tap, and 7-tap FIR filters 18 with a design cyst radius of 0.4 mm (indicated by the dashed vertical line 1021 in the beamplots of FIGS. 11A-11C13A-13C and in the cystic contrast vs. cyst size plots of FIGS. 11D-11F) 13D-13F). A large reduction in sidelobe levels of the plots in FIGS. 11A-11C13A-13C can be seen in the plots 1024, 1026 and 1028 for the higher tap-length filters.

FIGS. 11D-11F13D-13F show GCR metric curves plotting cystic contrast as a function of cyst radius given infinite channel SNR for the simulated 2D ISRs. Cystic contrast is improved by more than 20 dB for the higher tap FIR filters at dynamic receive focal depths of 1.0 and 2.0 cm (e.g., see 1034, 1036 and 1038 in FIGS. 11D13D and 11E13E, indicating contrast curves for 3-tap FIR filter, 5-tap FIR filter and 7-tap FIR filter, respectively). In general longer tap filters increasingly improve contrast resolution. FIGS. 11G-11I13G-13I show plots of GCR metric curves at a constant cyst radius (i.e., 0.4 mm cyst radius, which was the design cyst size). These plots show how robust the beamformers 10 are to varying levels of electronic noise. Notice that in general the performance of the longer tap-length FIR filters (e.g., see plots 1044, 1046 and 1048 representing 3-tap, 5-tap and 7-tap FIR filters, respectively) rapidly decreases in the presence of noise compared to the rectangular DAS beamformer represented by plot 1040. The single tap FIR filter, represented by plot 1042, also did not perform as well as the longer tap-length filters. In reasonable SNR environments (between 30 and 40 dB) the 3-tap FIR-QCLS beamformer 10 (plot 1044) offers significant gains in contrast resolution compared to the rectangular apodized DAS beamformer 1000 (plot 1040).

Figure 13A:
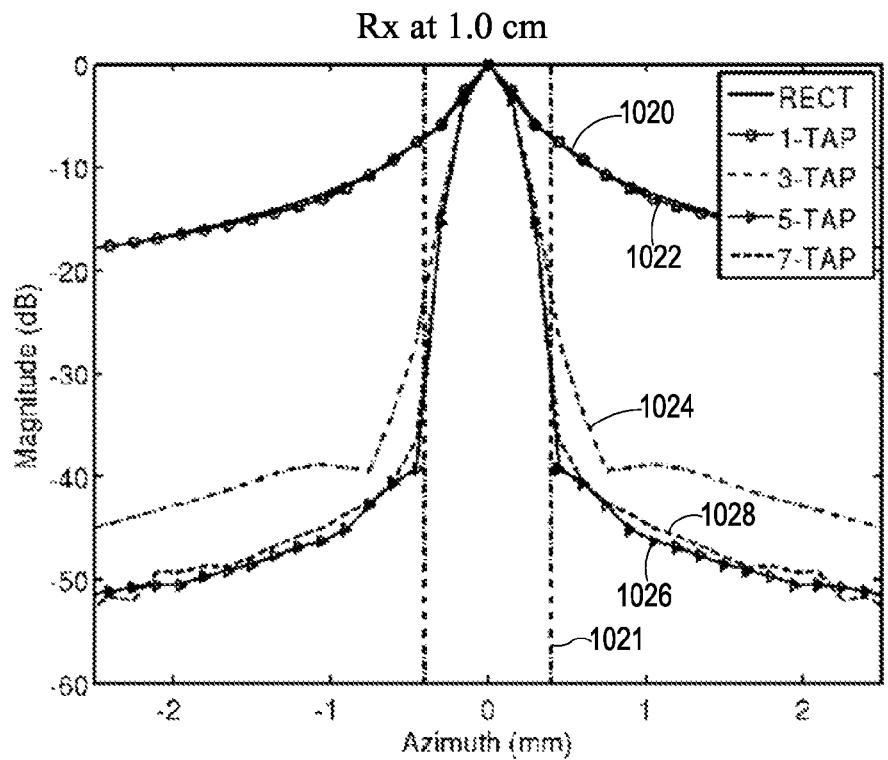
FIGS. 13A-13C show integrated lateral beamplots.
Figure 13B:
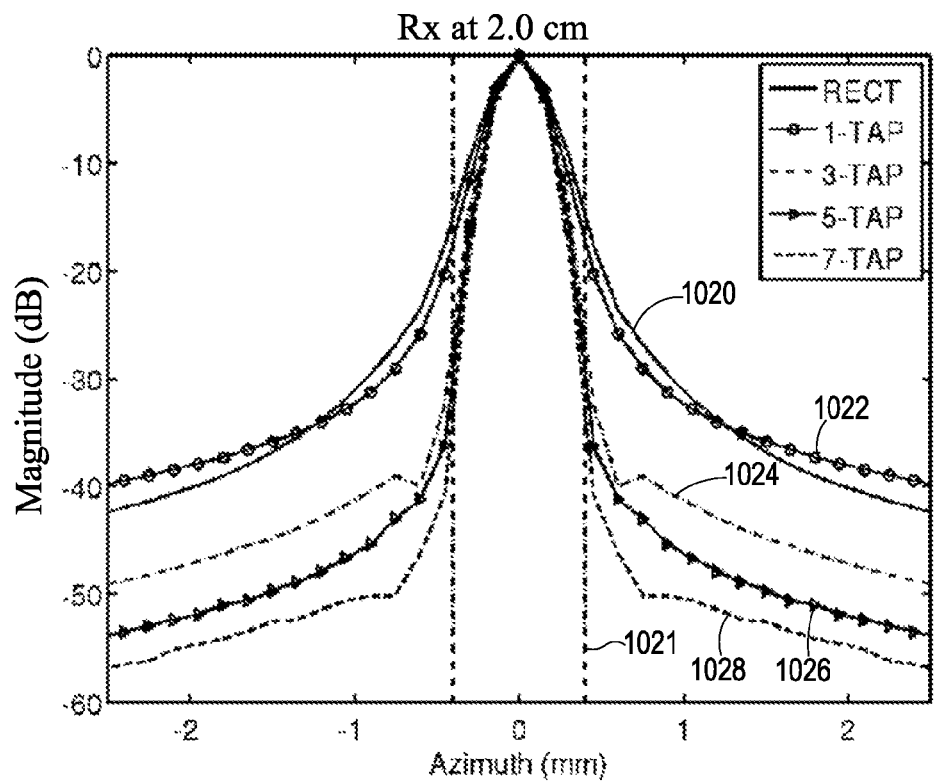
Figure 13C:
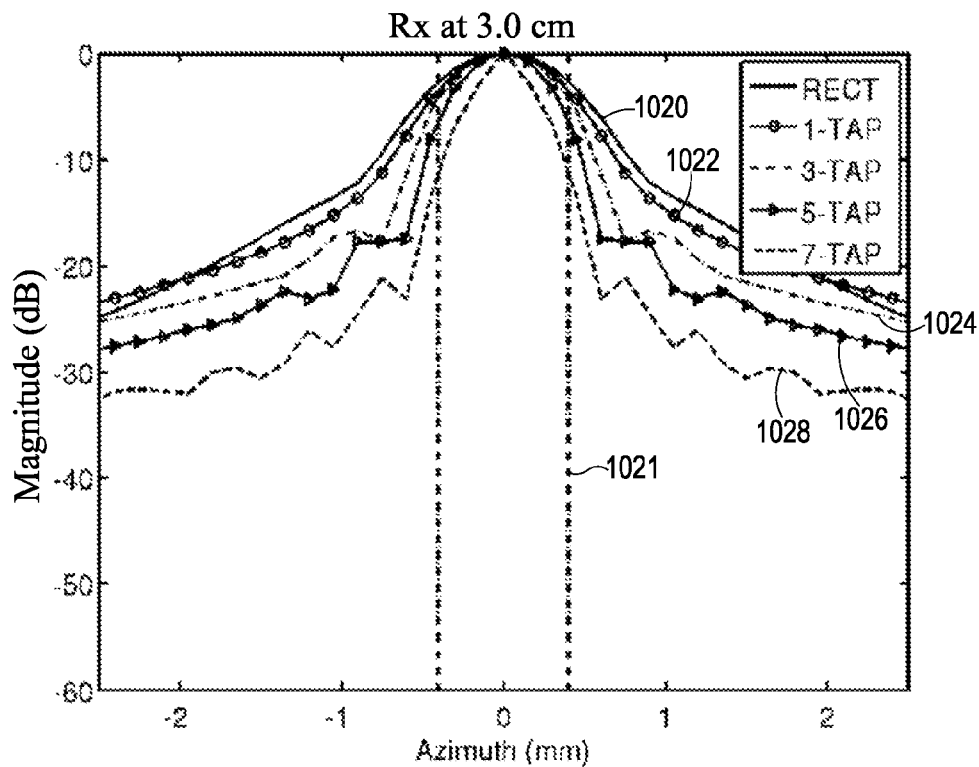
Figure 13D:
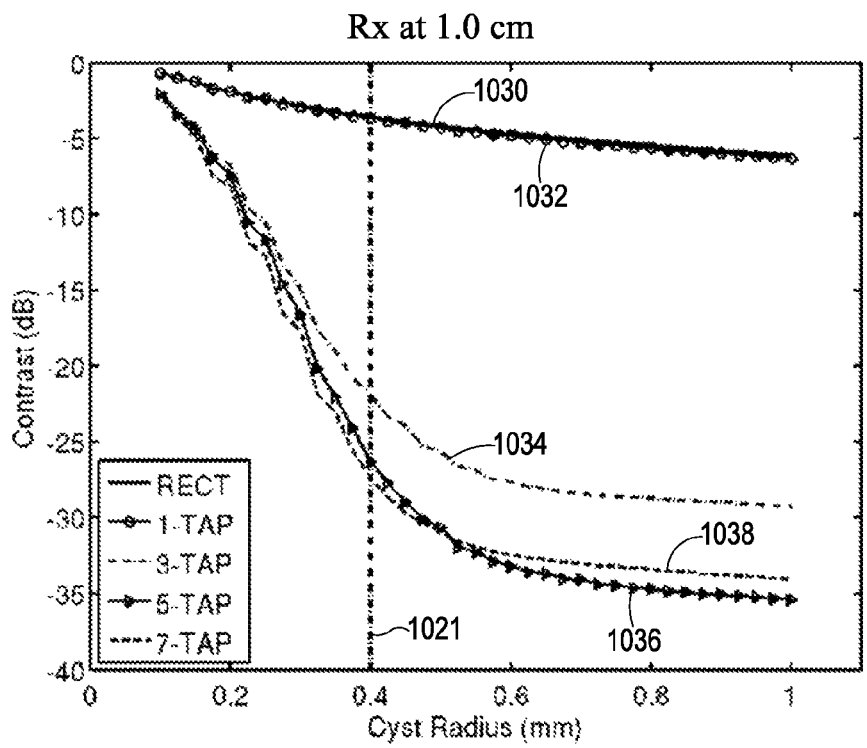
Figure 13E:
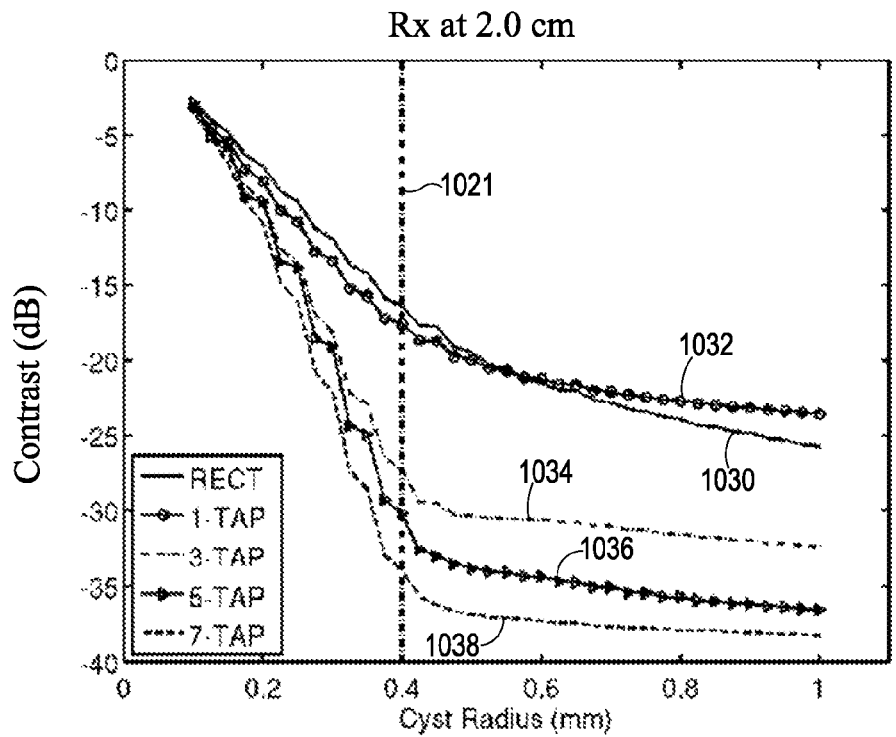
Figure 13F:
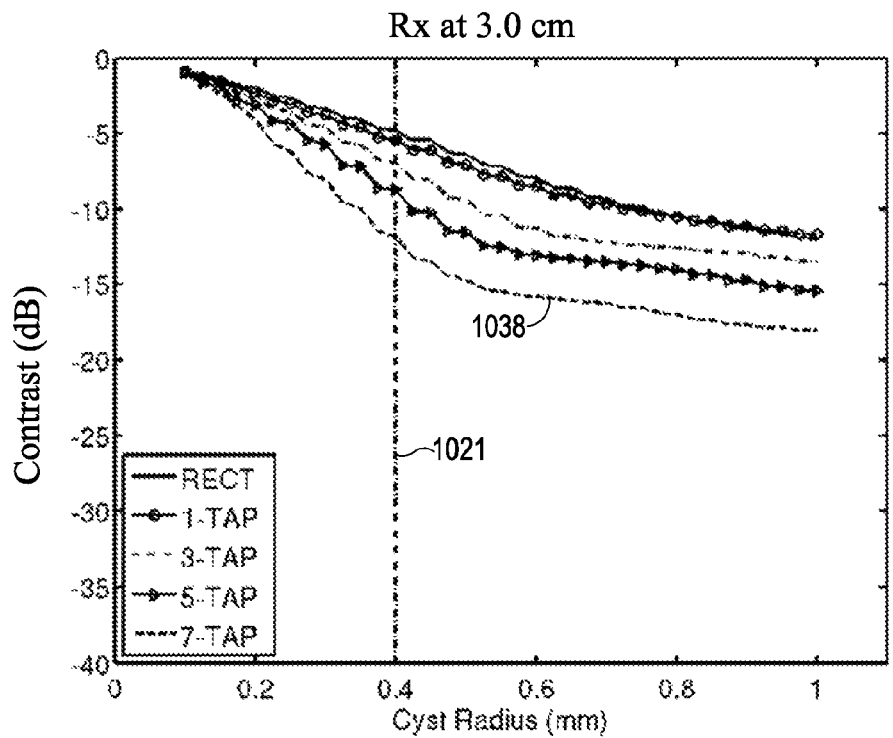
Figure 13G:
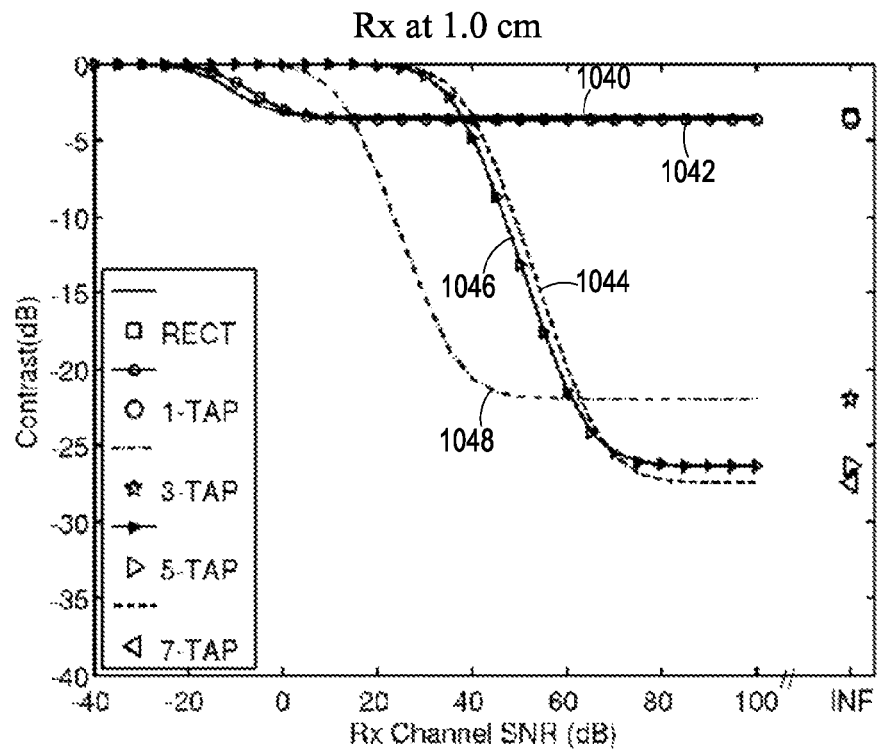
FIGS. 13G-13I show plots of cystic contrast vs. receive channel signal to noise ratio (SNR) curves comparing different apodization functions at different dynamic receive focal depths (1.0 cm, 2.0 cm and 3.0 cm, respectively, with transmission (Tx) focus fixed at 2.0 cm).
Figure 13H:
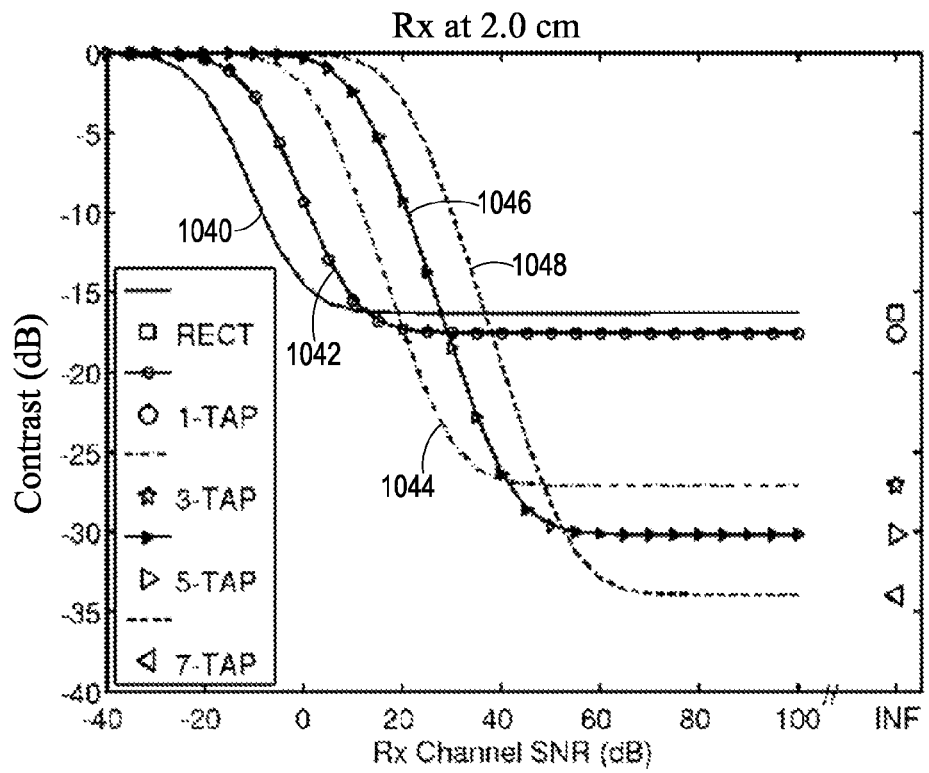
Figure 13I:
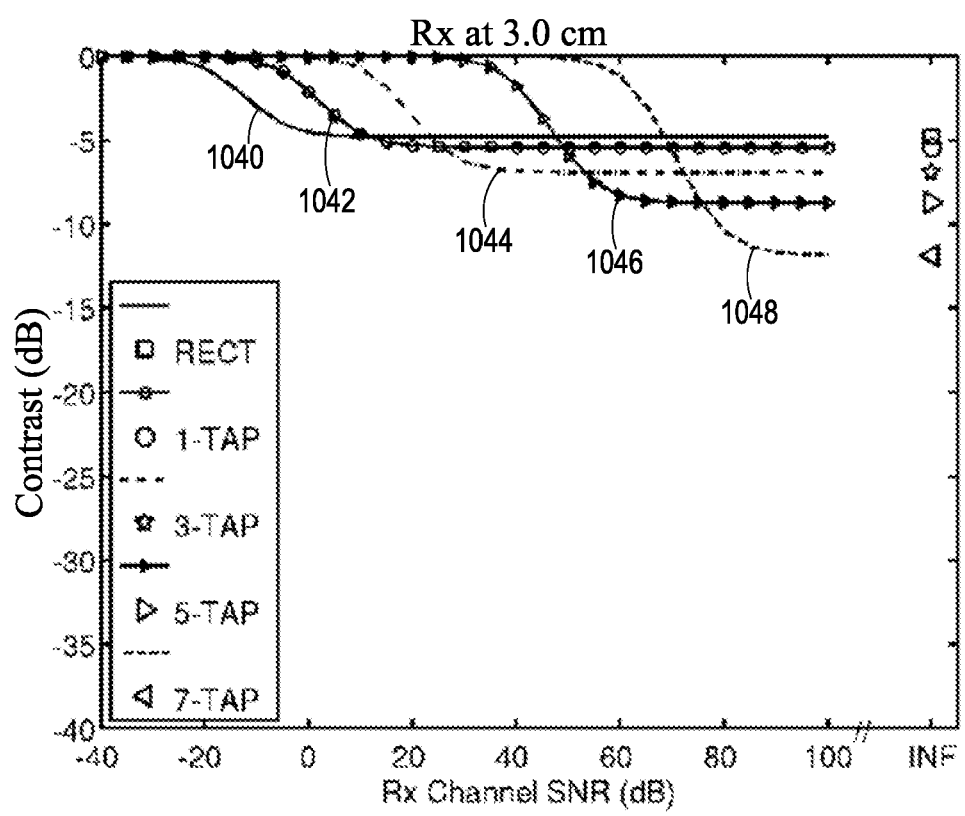
Figure 14:
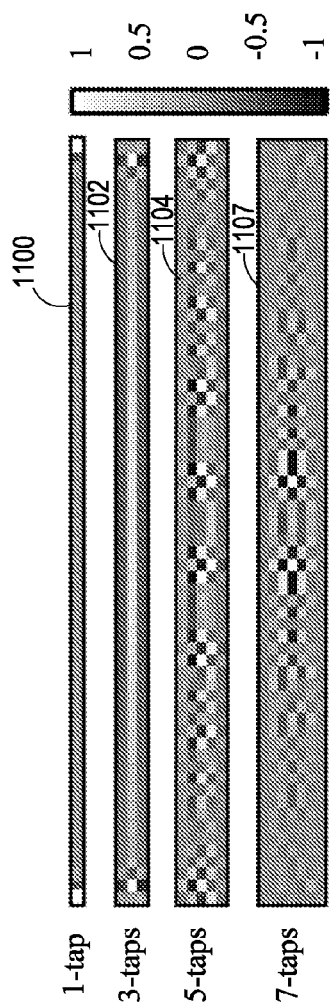
FIG. 14 shows calculated FIR-QCLS weights for data dynamically focused at 2.0 cm according to an embodiment of the present invention.

The results reported in FIGS. 13A-13I were calculated in regard to a 64 element receive aperture dynamically focused at 1.0 cm (FIGS. 13A, 13D and 13G), 2.0 cm (FIGS. 13B, 13E and 13H), and 3.0 cm (FIGS. 13C, 13F and 13I). For these simulations the transmit focus was fixed at 2.0 cm. FIGS. 13A-13C plot the integrated lateral beamplots when using different apodization windows. The beamplots were calculated by integrating the energy of the ISRs in range. The FIR-QCLS windows were compared against conventional windows such as the rectangular, Hamming, and Nuttall windows. The results of FIGS. 13A-13I are shown only for the QCLS windows of the present invention, compared with the prior art rectangular window, since the Hamming and Nuttall windows performed worse than the rectangular window at all receive depths. FIR-QCLS windows were calculated using a design cyst radius of 0.4 mm with 1-tap, 3-taps, 5-taps, and 7-taps per channel.

Notice the marked reduction of the sidelobe levels for the higher tap length FIR-QCLS beamplots (e.g., plots 1024, 1026 and 1028). Some lateral beamplots show sidelobe level reduction of 30 dB compared to the beamplot for a rectangular window. With regard to FIGS. 13D-13F, it can be noted that, in general, contrast improves when increasing the number of taps on each receive channel, however the biggest jump in contrast improvement occurred between one and three taps (compare 1032 with 1034). The GCR metric curves of FIGS. 13G-13I, which plot cystic resolution as function of receive channel input SNR, indicate a tradeoff in beamformer sensitivity and increased contrast resolution performance when using the basic FIR beamformer 10 that does not include the features of the robust beamformer embodiments described above. Compared to the rectangular DAS beamformer (see plot 1040), the multi-tap FIR beamformer's 10 cystic resolution performance degrades more rapidly in the presence of noise. However, given a reasonable input channel SNR between 30 and 40 dB, the 3-tap FIR beamformer (plot 1044) offers more than 10 dB improvement in contrast resolution than the DAS beamformer (plot 1040) at receive depths of 1.0 and 2.0 cm. The SNR performance of the FIR beamformer 10 is discussed further herein.

FIG. 1214 shows the calculated FIR-QCLS weights for the data dynamically focused at 2.0 cm. These weights were computed for a design cyst radius of 0.4 mm. The 1-tap and 3-tap FIR-QCLS weights 1100 and 1102, respectively, are mostly smooth Gaussian like functions across the aperture, except at the endpoints where discontinuities appear. The 5-tap and 7-tap weights 1104 and 1106, respectively, are much more variant and discontinuous. It is interesting to note that some FIR-QCLS weights took on negative values, a phenomenon never seen in conventional windows like the Hamming or Nuttall window. The sign of the weight values also inverted in time on some channels as seen in the middle of the array for the 5-tap and 7-tap filters. Although the weights computed from the FIR-QCLS algorithm were always real, this inversion in time suggests that a 180° phase shift between consecutive time samples reduces sidelobe energy in the ISR.

Figure 12:
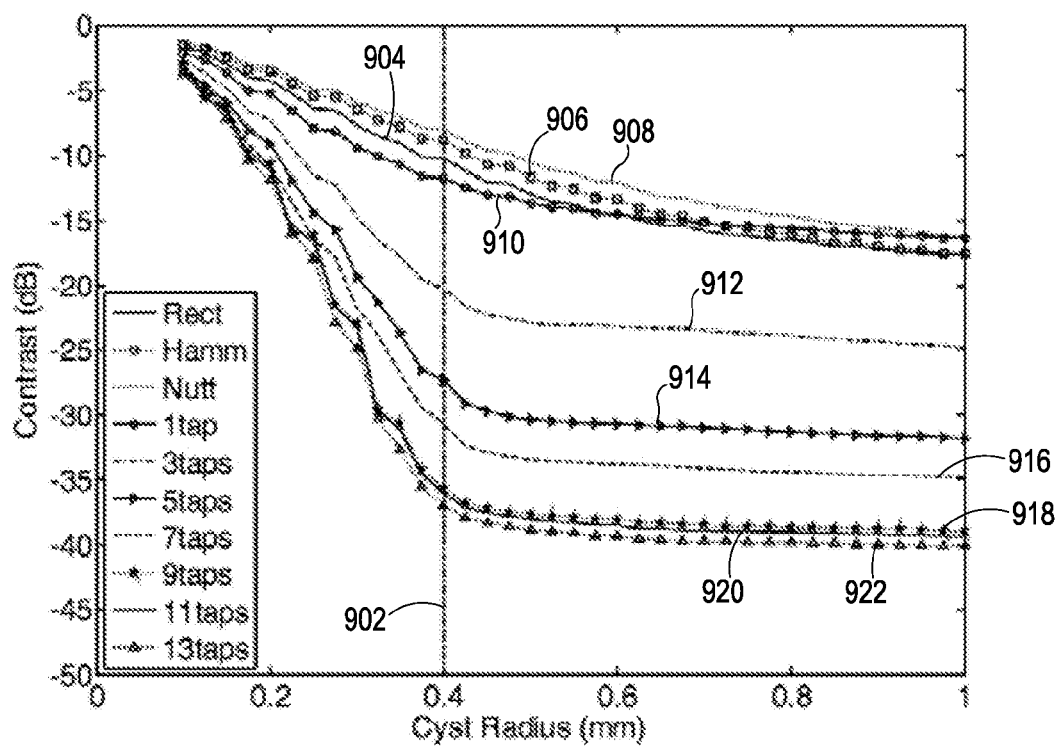
FIG. 12 shows cystic point contrast curves for a prior art beamformer and for an embodiment of a beamformer according to the present invention.

FIG. 1315 shows the magnitude and phase response for the 3-tap, 5-tap and 7-tap FIR filters represented in FIG. 12.14. Plots 1202, 1206 and 1210 show magnitude responses for the 3-tap, 5-tap and 7-tap FIR filters, respectively, and plots 1204, 1208 and 1212 show phase responses for the 3-tap, 5-tap and 7-tap FIR filters, respectively.

The responses shown in FIG. 1315 illustrate that, in general, the FIR filters are high pass, and that the cutoff frequency shifts higher as tap length increases. The phase response for the filters is in general nonlinear, and the responses become more discontinuous as tap length increases. Intuitively the high pass characteristics of the FIR filters make sense. The QCLS algorithm forces narrow mainlobes, which necessitates using the high frequency components in the signal. The filters' frequency response is one reason for the degraded SNR performance of the FIR beamformer seen in FIGS. 11G-11I.13G-13I. The center frequency of the simulated transmitted pulse was 6.5 MHz and the cutoff frequency for the 7-tap FIR filters is around 7 MHz.

Example 2

Performance of the Non-Robust FIR Beamformer in the Presence of Phase Aberration Receive channel focal delays 1002 in the prior art DAS beamformer 1000 are calculated assuming a propagation speed of sound in tissue. Conventional systems assume a uniform sound velocity of 1540 m/s, however actual sound velocities in human tissue vary between human subject and tissue type. Spatial variations from the assumed sound speed cause wavefront distortion, amplitude variation, and phase variation of the ultrasound beam. These distortions or phase aberrations adversely affect the quality of in vivo images. Phase aberration will distort the DAS beamformer's 1000 ISR, reducing the contrast and resolution of the output image.

Recent literature indicates that phase aberrations in the human breast can be modeled as a nearfield thin phase screen characterized by a root mean square (RMS) amplitude strength of 28 ns and a full-width at half-maximum (FWHM) correlation length of 3.6 mm A series of simulations were performed wherein aberrations were used to distort the ISR formed by the FIR beamformer 10. Specifically data from 100 realizations of a one-dimensional aberrator were used to get good statistics. To construct the aberrators, 100 random processes were generated with an a priori 28 ns RMS strength and an a priori 3.6 mm FWHM correlation length. Some of the 100 aberrators were thus stronger or weaker than the 28 ns RMS and 3.6 mm FWHM a priori characteristics. The 100 aberrators' mean RMS value was 27.7 ns with a standard deviation of 9.8 ns and the 100 aberrators' mean FWHM value was 3.7 mm with a standard deviation of 1.7 mm. Each aberrator acted to alter the instant in time at which each receive channel's spatial response was calculated. Note that the same aberration would apply to all the ISRs required for the input into the FIR beamformer 10.

FIGS. 14A-14N16A-16N show unaberrated and aberrated simulated ISRs for different apodization functions, with FIGS. 14A-14B16A-16B showing unaberrated and aberrated simulated ISRs 1300, 1302, respectively for a rectangular window function used to apodize signals received by a DAS beamformer 1000, FIGS. 14C-14D16C-16D showing unaberrated and aberrated simulated ISRs 1304, 1306, respectively for a Hamming window function used to apodize signals received by a DAS beamformer 1000. FIGS. 14E-14F16E-16F showing unaberrated and aberrated simulation ISRs 1308, 1310, respectively for a Nuttall window function used to apodize signals received by a DAS beamformer 1000, FIGS. 14G-14H16G-16H showing unaberrated and aberrated simulated ISRs 1312, 1314, respectively for a 1-tap QCLS apodization function used to apodize signals received by a 1-tap FIR beamformer 10, FIGS. 14I-14J16I-16J showing unaberrated and aberrated simulated ISRs 1316, 1318, respectively for a 3-tap QCLS apodization function used to apodize signals received by a 3-tap FIR beamformer 10, FIGS. 14K-14L16K-16L showing unaberrated and aberrated simulated ISRs 1320, 1322, respectively for a 5-tap QCLS apodization function used to apodize signals received by a 5-tap FIR beamformer 10, and FIGS. 14M-14N16M-16N showing unaberrated and aberrated simulated ISRs 1324, 1326, respectively for a 7-tap QCLS apodization function used to apodize signals received by a 7-tap FIR beamformer 10.

All images In FIGS. 14A-14N16A-16N are of a 6 mm (lateral) by 2 mm (axial) area of the ISR. The absolute value of each ISR was calculated and then log compressed to 60 dB for visualization. The aberration profile 1330 (3.6 mm FWHM, 28.8 ns RMS) associated with this particular realization is shown in FIG. 14O.16O. The aberration distorts the mainlobe and raises sidelobe levels in all ISRs. Note that the FIR beamformer ISRs maintain relatively narrow mainlobes. The sidelobe energy in the aberrated FIR beamformer ISRs continually decreases as tap length increases.

FIGS. 14A-14N 16A-16N show how the simulated ISRs for different receive apodizations are affected by phase aberration. For each apodization function, the top figure shows the unaberrated 2D ISR with a receive focus of 2.0 cm and the bottom figure shows the same ISR that has been aberrated. The 0.4 mm design cyst radius QCLS apodization profiles were used for all FIR beamformer ISRs. It is clear that the aberrator raises sidelobe levels and distorts the mainlobe for every ISR. It is interesting that the FIR beamformer ISRs maintain a narrow mainlobe and low sidelobe levels even in the presence of aberration. Furthermore, the sidelobe energy in the aberrated FIR beamformer ISRs continually decreases as tap length increases. Although the absolute degradation between the unaberrated and aberrated ISRs for the FIR beamformer is more than the DAS beamformer, the aberrated ISRs for the multi-tap FIR beamformer still have lower sidelobes and tighter mainlobes than the unaberrated DAS beamformer ISRs. These results suggest that the FIR beamformer is robust to errors in the model induced by moderate phase aberrations.

Figure 15:
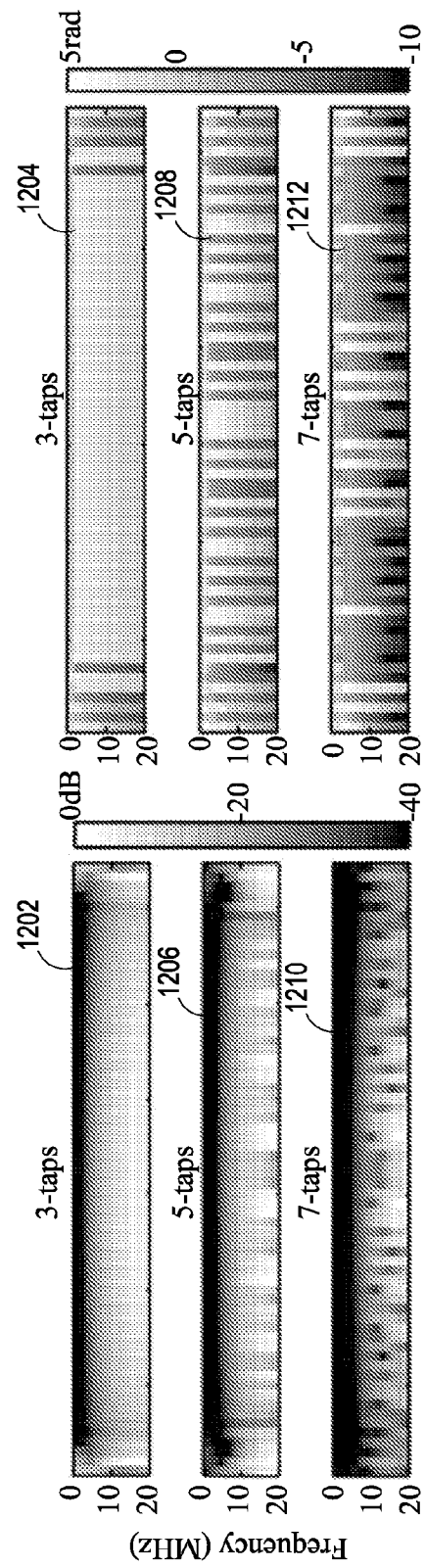
FIG. 15 shows the magnitude and phase responses for 3-tap, 5-tap and 7-tap FIR filters represented in FIG. 14.
Figure 16O:
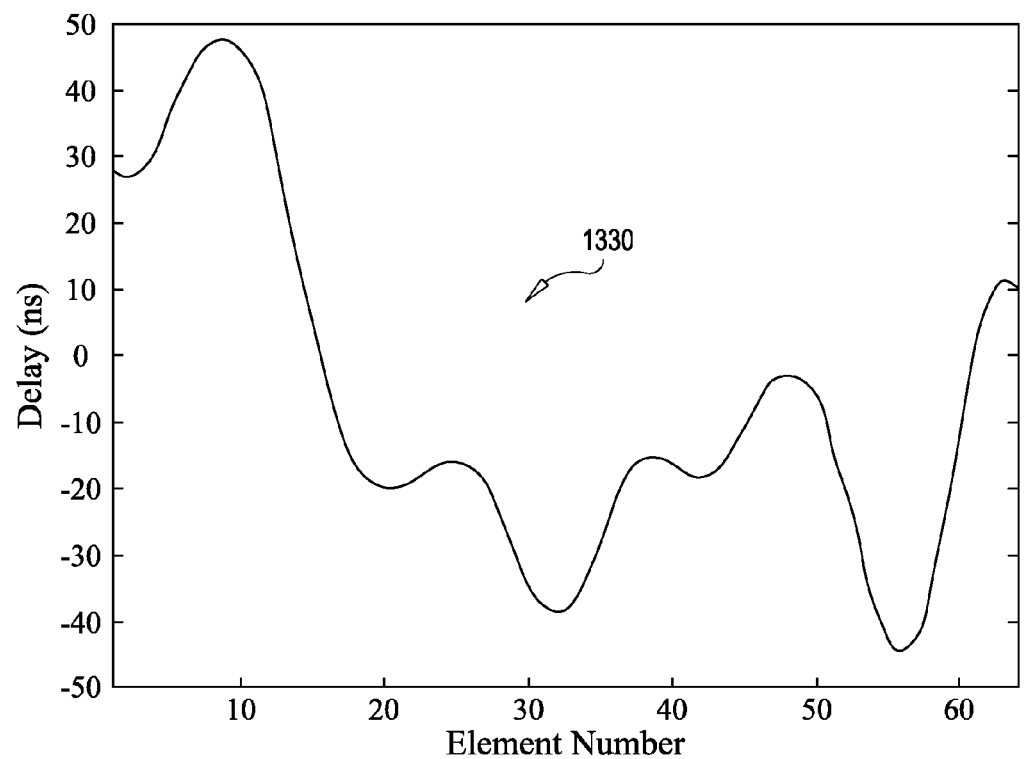
FIG. 16O shows the phase aberration profile used to achieve the results shown in FIGS. 16A-16N.
Figure 17:
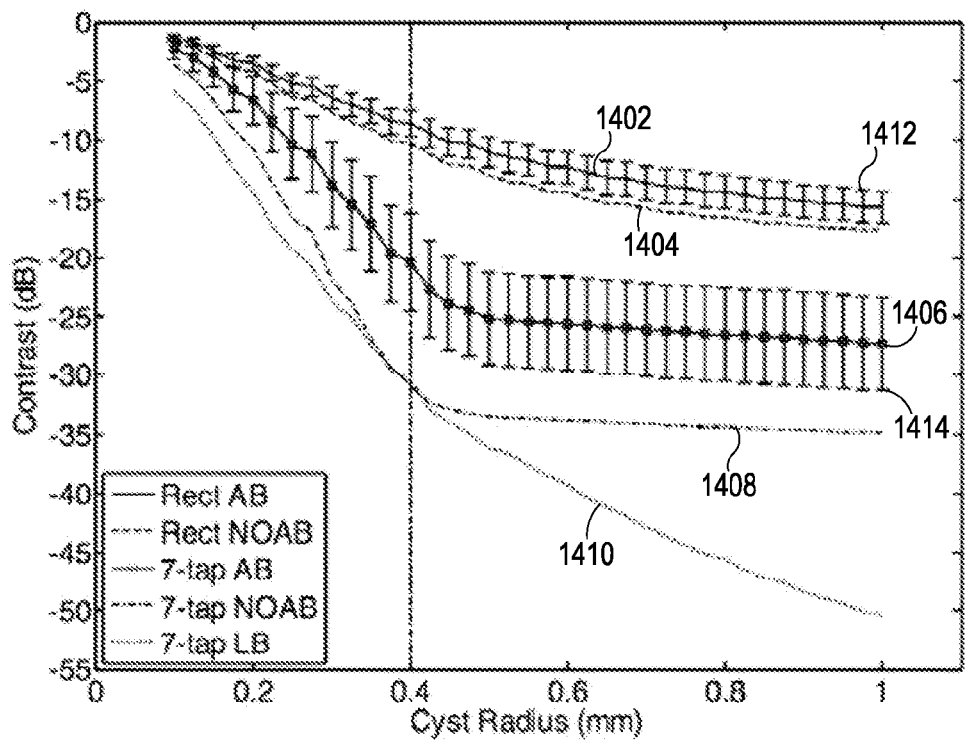
FIG. 17 shows plots of unaberrated and aberrated cystic point contrast curves for rectangular and 7-tap ISRs in the absence of noise.

The linear component of any given aberrator realization will act to steer the ultrasound beam laterally from its intended focus. In order to be consistent when applying the resolution metric, cystic contrast was computed after re-centering the cyst at the maximum of each aberrated ISR. This resulted in a constant measure of the point contrast of the center of the cyst in the final output image, but assumed shift invariance of the aberrated ISR over a small range. FIG. 15 17 summarizes the effects of aberration on the contrast curves of the DAS beamformer 1000 and FIR beamformer 10. FIG. 15 17 shows plots of the unaberrated and aberrated cystic point contrast curves for the rectangular (1402 and 1404, respectively) and 7-tap (1406 and 1408, respectively) ISRs in the absence of noise. Also shown is the lower bound (LB) contrast curve 1410 for the 7-tap FIR beamformer 10, which was calculated by using the optimal FIR-QCLS profile at each cyst size. The errorbars 1412 show +/−1 standard deviation about the mean values of 1402 and errorbars 1414 show +/−1 standard deviation about the mean values of 1414. Aberration degrades the cystic point contrast performance for both apodization functions: the 7-tap ISR by 7 dB and the rectangular ISR by 2 dB. However, the 7-tap aberrated FIR beamformer outperformed the unaberrated rectangular DAS beamformer by 10 dB. The Hamming and Nuttall window functions performed worse than the rectangular window function and are therefore not shown in this plot for clarity.

FIGS. 16A-16C 18A-18C shows plots of the mean cystic contrast for each aberrated ISR relative to the rectangular window. The 0 dB point on the y-axis in each plot indicates the aberrated rectangular window's mean cystic contrast for each cyst size. A more positive dB value indicates better performance than the rectangular window, and errorbars are +/−1 standard deviation. Each of FIGS. 16A-16C 18A-18C show the Hamming 1502, Nuttall 1504 and 1-tap 1506 plots, with FIG. 16A 18A additionally showing the 3-tap plot 1508, FIG. 16B 18B additionally showing the 5-tap plot 1510 and FIG. 16C 18C additionally showing the 7-tap plot 1512, in order to reduce clutter. The Hamming and Nuttall windows achieved worse cystic point contrast (1502 and 1504, respectively) compared to the rectangular window over nearly the entire range of investigated cyst sizes. The 1-tap QCLS weights in the presence of aberration still improve contrast (see plot 1506) for the smaller cyst sizes but perform worse than the rectangular, Hamming, and Nuttall windows for the large diameter cysts. This is to be expected given the 0.4 mm design cyst radius.

It can be seen that contrast continuously improves with longer tap-length filters, and the 7-tap QCLS weights (plot 1512) maintain 10-15 dB cystic point contrast improvements compared to the rectangular window for a large range of cyst sizes. These results show that the FIR beamformer 10 is robust to relatively strong phase aberration errors. Furthermore even the aberrated FIR beamformer 10 would outperform the perfectly phase corrected DAS beamformer 1000. These simulation results suggest that the FIR beamformer 10 can dramatically improve the contrast resolution of ultrasound images and is robust in the presence of phase aberration.

Example 3

Application to an Ultrasonic Scanning System

An embodiment of the beamformer 10 according to the present invention was applied to an existing ultrasound scanner to improve the spatial response characteristics thereof. The ultrasonic scanner system used was the Ultrasonix Sonix RP ultrasound scanner (Ultrasonix Medical Corp., Richmond, BC, Canada). The Sonix RP system has a software development kit (SDK) named TEXO that enables low level scanner control with the ability to acquire single channel RF data sampled at 40 MHz with 12 bit precision. The present inventors created an interface to the TEXO SDK using PYTHON™ programming language that allowed creating of customized pulse sequences without the need to recompile the system C code. Utilizing the PYTHON™ interface with the TEXO SDK a full set of synthetic receive aperture data was acquired from a 64 element transmit aperture and 64 element receive aperture in fractions of a second. In order to measure the 2D ISR required for the inventive algorithm, a 20 μm diameter steel wire in a tank full of deionized water was imaged. The transmit aperture of the system was electronically scanned across the array while mechanically moving the array using a 3-axis positioning system (Newport Motion Controller MM3000, Newport Co., Irvine, Calif.) in order to achieve azimuthal spatial sampling of 75 μm and axial spatial sampling of 50 μm. The data was interpolated using MATLAB, using cubic splines to achieve 25 μm azimuthal sampling and 12.5 μm axial sampling. A 1.95 cm (azimuth) was acquired by 0.2 cm (range) by 3000 time sample dataset to characterize the 3D spatio-temporal PSF. The entire experiment required 29 hours to execute, resulting in over 10 Gbytes of raw, averaged RF data. The water temperature remained relatively constant over the course of the experiment, ranging between 21.6-22.4° C.

An L14-5/38 128 element linear array probe was used and was excited with a 1 cycle 6.67 MHz pulse. The transmit aperture consisted of 64 elements focused at 4.0 cm in range (f/2). 64 receive elements were acquired synthetically and each receive signal was averaged 100 times to improve electronic SNR. The receive data was digitally bandpass filtered in MATLAB using a $101^{st}$ order bandpass filter with cutoff frequencies at 4 and 8 MHz. An experimental 2D ISR was formed by sampling the interpolated 3D spatio-temporal PSF for each receive element according to a dynamic receive focusing profile for a particular receive focus.

Figure 19:
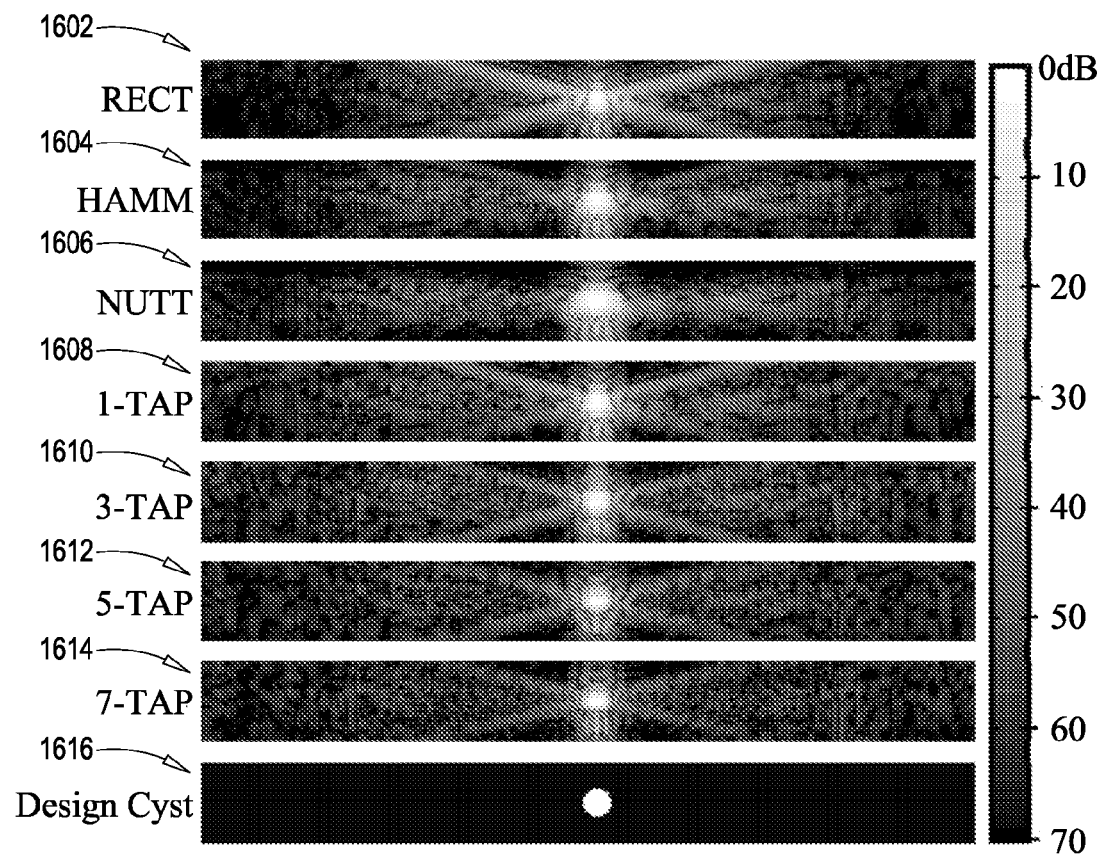
FIG. 19 shows log compressed, envelope detected experimental ISRs.
Figure 20A:
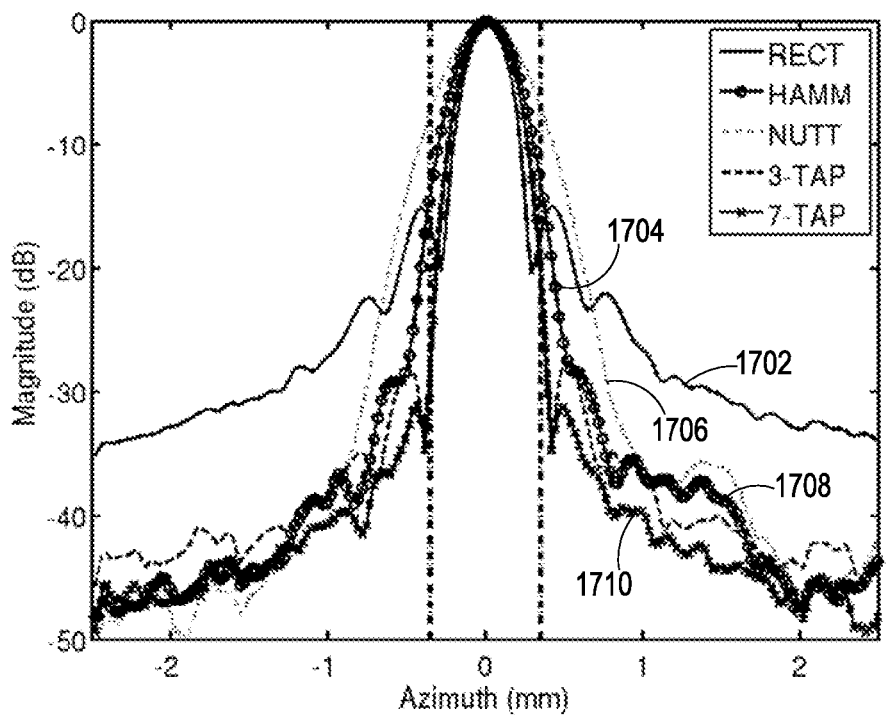
FIGS. 20A-20C show experimental integrated lateral beamplots and GCR metric curves.
Figure 20B:
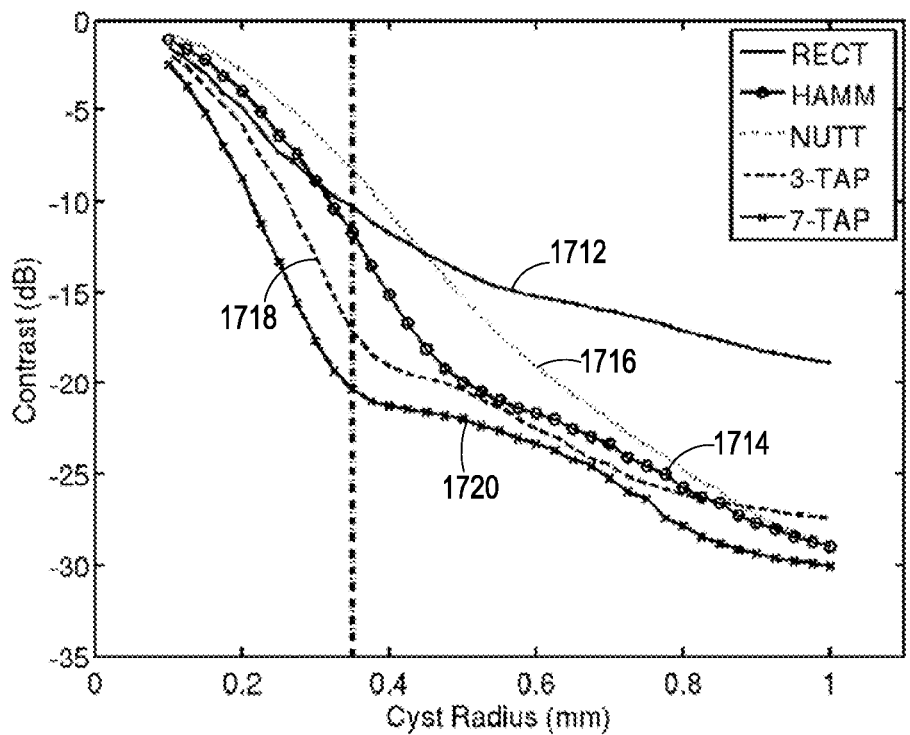
Figure 20C:
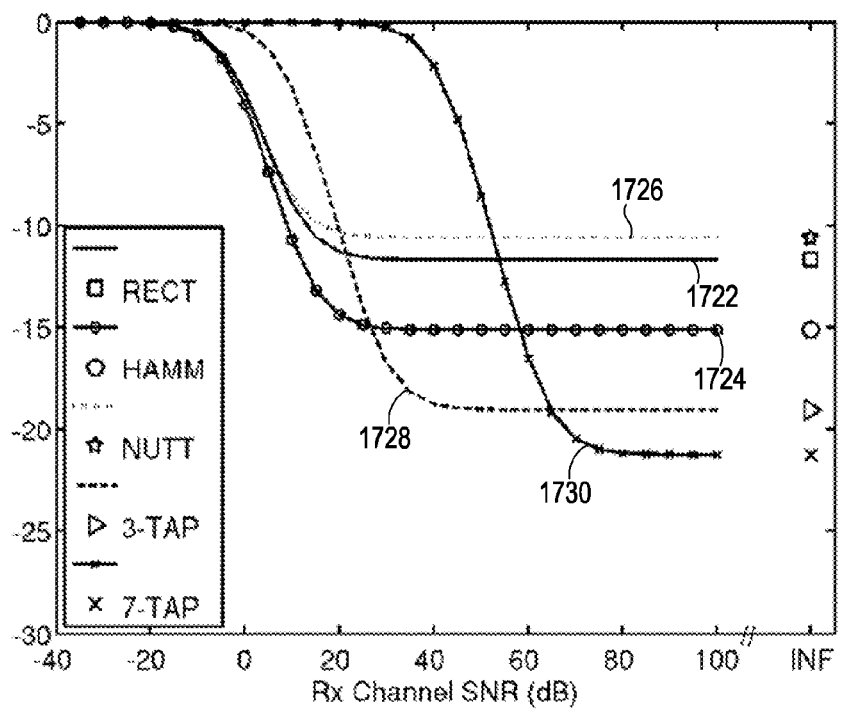

The log compressed, envelope detected experimental ISRs dynamically focused at 2.0 cm are shown in FIG. 17 19. ISRs are shown for conventional apodization functions (rectangular window function 1602, Hamming window function 1604 and Nuttall window function 1606) and 1-tap 1608, 3-tap 1610, 5-tap 1612 and 7-tap 1614 FIR-QCLS windows designed for a cyst radius of 0.35 mm. The cyst 1616 having the design cyst radius is shown for reference. All images are log compressed to 70 dB. Notice the progressive reduction of ISR energy in the sidelobe regions when using the multi-tap FIR-QCLS design. The 7-tap FIR-QCLS ISR 1614 has superior axial and lateral resolution compared to the other ISRs.

Figure 18A:
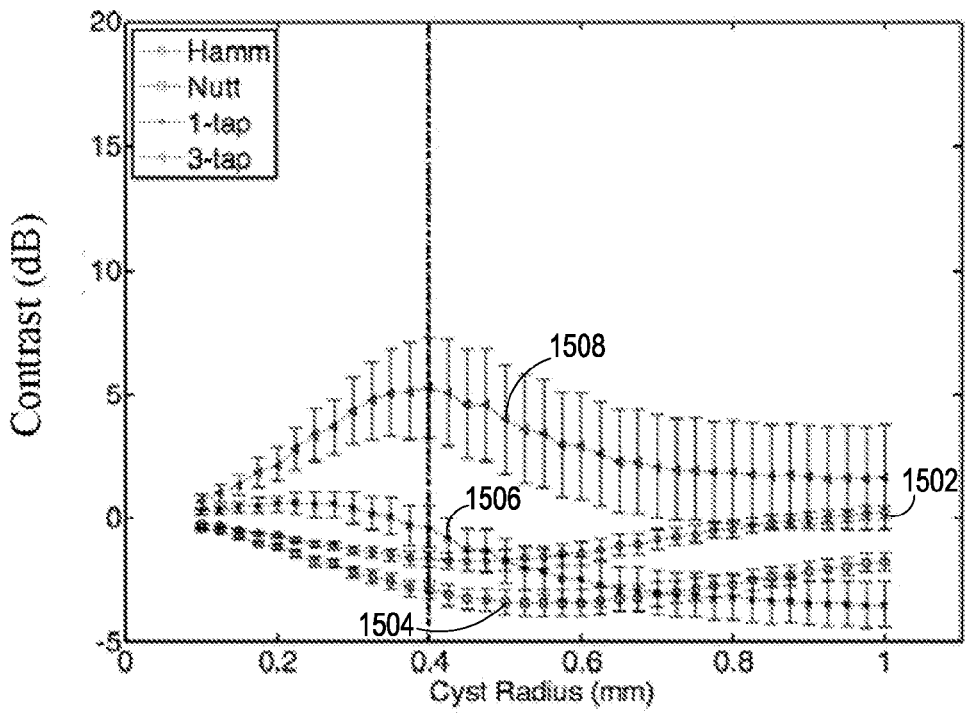
FIGS. 18A-18C show plots of the mean cystic contrast for various aberrated ISRs relative to that formed when using a rectangular window function.
Figure 18B:
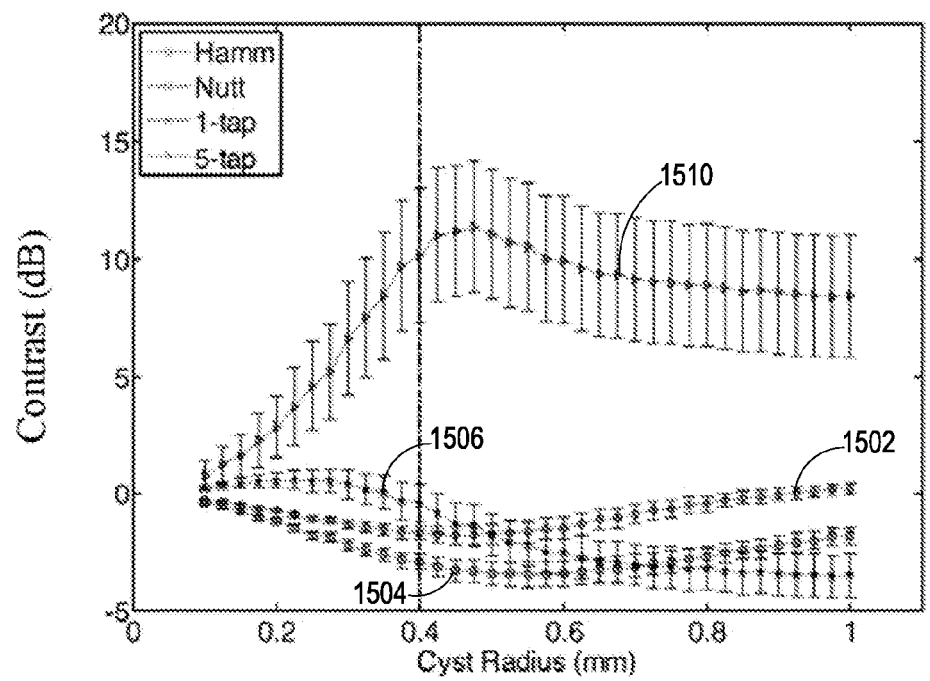
Figure 18C:
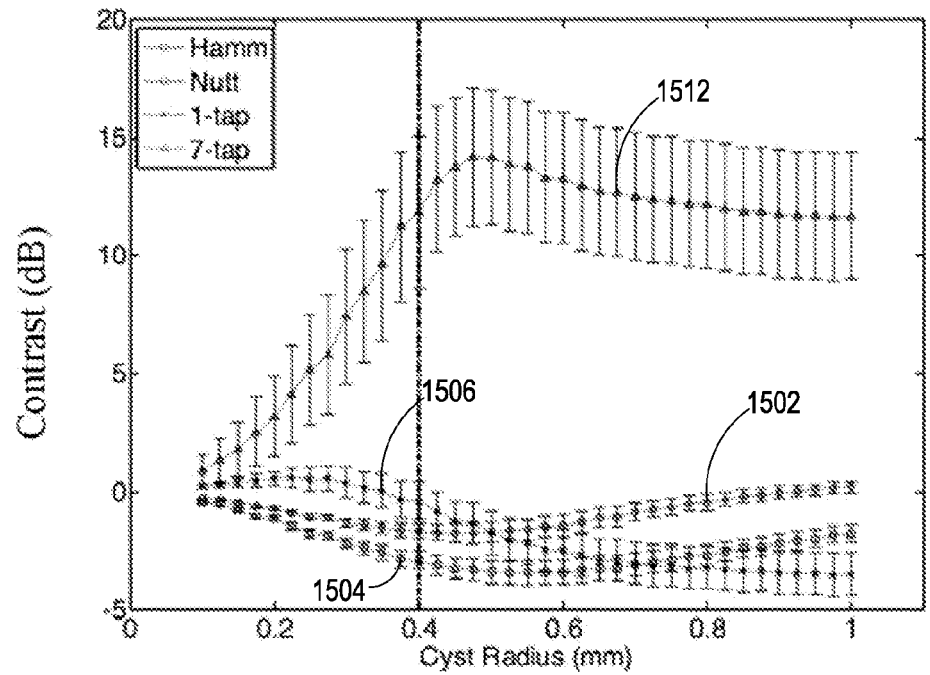

FIGS. 18A-18C20A-20C show the experimental integrated lateral beamplots (FIG. 18A20A) and GCR metric curves. The FIR-QCLS weights reduce sidelobe levels of the ISR plots 1708, 1710 for 3-tap and 7-tap algorithms, respectively, lower the total ISR energy outside the mainlobe, and decrease mainlobe width relative to the ISRs of beamplots 1702, 1704 and 1706 produced using conventional Rectangular, Hamming and Nuttall window algorithms, respectively. For clarity, only the 3-tap and 7-tap QCLS plots are shown. The contrast curves 1712, 1714, 1716, 1718 and 1720 assuming infinite SNR for the rectangular, Hamming, Nuttall, 3-tap QCLS and 7-tap QCLS experimental ISRs, respectively, are shown in FIG. 18B.20B. The FIR-QCLS ISRs show increases in cystic resolution compared to the conventional windows. Specifically, the 7-tap apodization profile improved contrast 1720 by 7 dB compared to the Hamming window 1714, by 10 dB compared to the rectangular window 1712, and by 12 dB compared to the Nuttall window 1716 over a range of cyst sizes. Furthermore, the 7-tap curve 1720 achieves the best contrast for all cyst sizes investigated. The SNR performance GCR metric curves 1722, 1724, 1726, 1728 and 1730 for the rectangular, Hamming, Nuttall, 3-tap QCLS and 7-tap QCLS experimental ISRs, respectively, are shown in FIG. 18C.20C. These results reinforce the tradeoff in SNR and cystic resolution with the FIR beamformer (that does not include the robust design) seen in the simulations.

The QCLS weights for the multi-tap FIR filters are shown in FIG. 19.21. These weights correspond to the ISRs dynamically focused at 2.0 cm in FIG. 17.19. The weights show similar characteristics to the simulations: smooth curves across the aperture, discontinuities at the edges of the aperture, and sign inversion in time. That is, the 1-tap and 3-tap FIR-QCLS weights 1800 and 1802, respectively, are mostly smooth Gaussian like functions across the aperture, except at the endpoints where discontinuities appear. The 5-tap and 7-tap weights 1804 and 1806, respectively, are much more variant and discontinuous. It is interesting to note that some FIR-QCLS weights took on negative values, a phenomenon never seen in conventional windows like the Hamming or Nuttall window. The sign of the weight values also inverted in time on some channels as seen in the middle of the array for the 5-tap and 7-tap filters. Although the weights computed from the FIR-QCLS algorithm were always real, this inversion in time suggests that a 180° phase shift between consecutive time samples reduces sidelobe energy in the ISR.

FIG. 2022 shows the magnitude and phase response for the 3-tap, 5-tap and 7-tap FIR filters represented in FIG. 19.21. Plots 2002, 2006 and 2010 show magnitude responses for the 3-tap, 5-tap and 7-tap FIR filters, respectively, and plots 2004, 2008 and 2012 show phase responses for the 3-tap, 5-tap and 7-tap FIR filters, respectively.

The responses shown in FIG. 2022 illustrate that, in general, the FIR filters are high pass, and that the cutoff frequency shifts higher as tap length increases. Much like the simulation results in FIG. 1315, the experimental FIR filters are in general high pass with increasing cutoff frequency as the tap length increases. The phase response for the experimental filters is nonlinear, but is not as discontinuous as the simulation phase responses.

Example 4

Lesion Detectability

According to the simulation and experimental results, the FIR beamformer 10 designed without using the robust methodology improves cystic contrast but degrades echo SNR. Results from the cystic resolution metric will not necessarily translate to improved lesion detectability in B-mode images, since the metric only specifies the point contrast at the center of the cyst. Therefore it is desirable to analyze detectability in B-mode images. B-mode ultrasound images were simulated and a contrast to noise ratio (CNR) was calculated. The CNR is defined as:

$$CNR = 10 \log_{10}\left(\frac{\langle I_{cyst}\rangle}{\langle I_{speckle}\rangle}\right), \quad (28)$$

Figure 21:
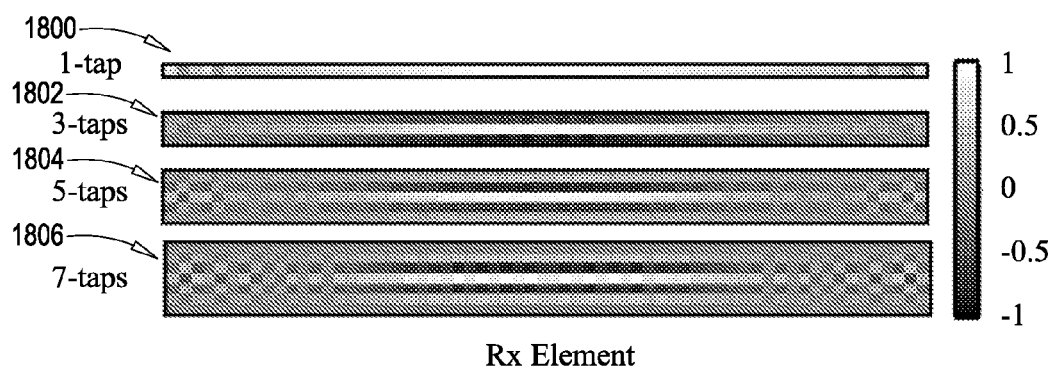
FIG. 21 shows QCLS weights for multi-tap FIR filters according to an embodiment of the present invention.
Figure 22:
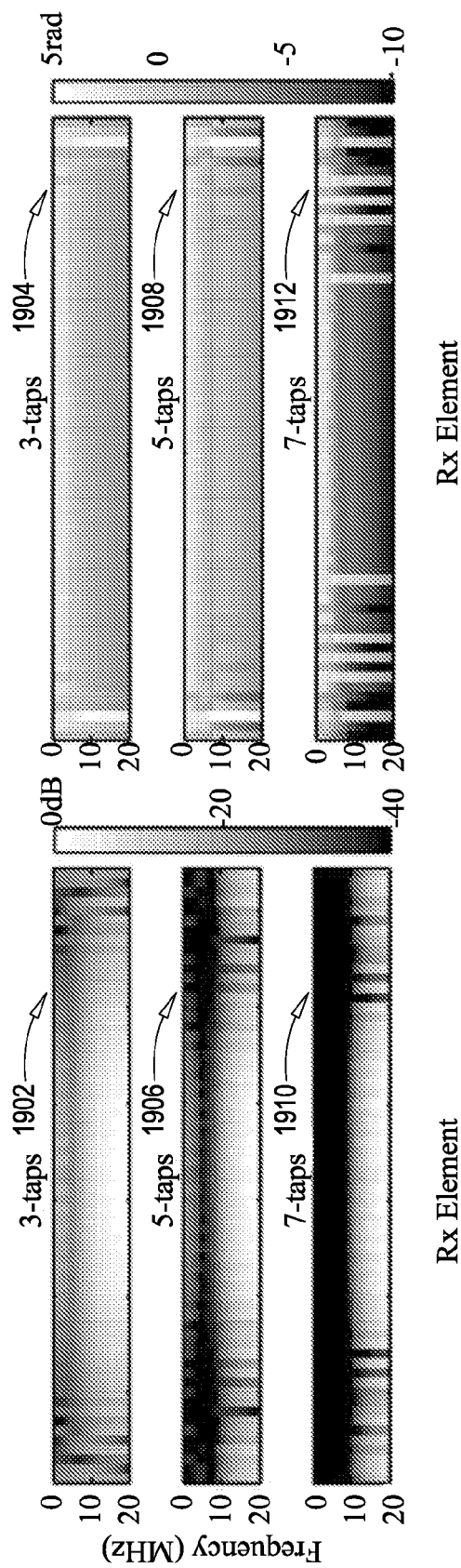
FIG. 22 shows magnitude and phase responses for the 3-tap, 5-tap and 7-tap FIR filters the weight of which are represented in FIG. 21.
Figure 23A:
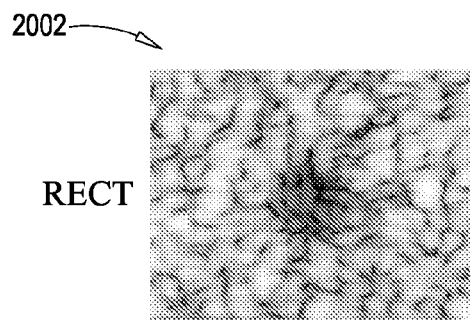
FIGS. 23A-23E show images of simulated B-mode images of a cyst, using various apodization schemes.
Figure 23B:
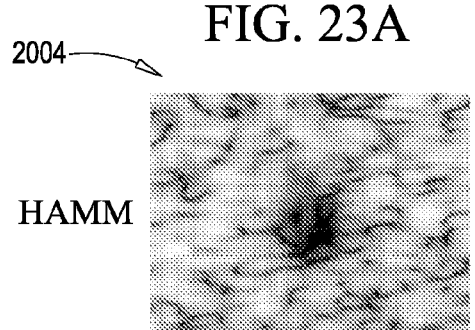
Figure 23C:
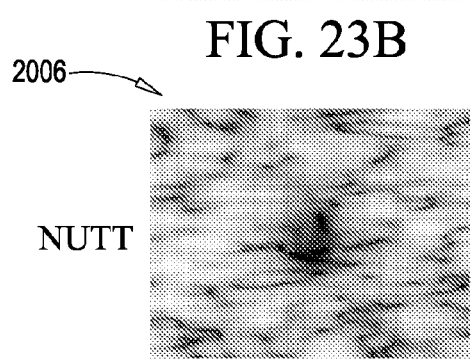
Figure 23D:
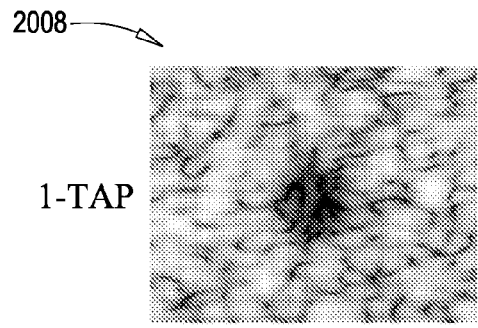
Figure 23E:
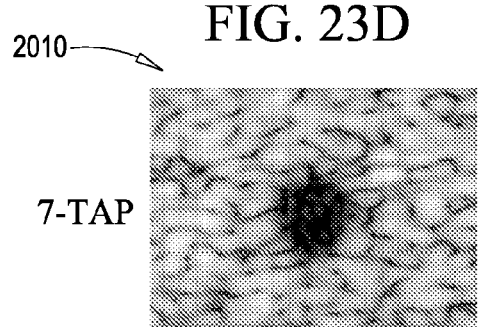
Figure 23F:
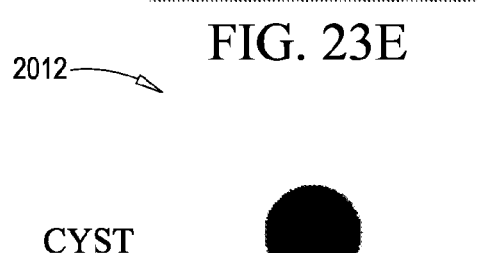
FIG. 23F is a representation of the size of the cyst used for the images of FIGS. 21A-21E23A-23E.

$\langle I_{cyst}\rangle \langle I_{speckle}\rangle$ where $\langle I_{cyst}\langle$ and $\rangle I_{speckle}\rangle$ are the mean signal intensity values for image regions inside the cyst and outside the cyst, respectively. B-mode images of cysts embedded in a speckle generating background were simulated by performing a 2-dimensional convolution of a target function and an experimental ISR. Note that this assumed spatial and temporal shift invariance of the ISR over the image region, which was a reasonable assumption over the small, simulated axial and lateral ranges. 1000 different speckle generating backgrounds were simulated to get good statistics on lesion contrast as computed by equation (11). B-mode images of cyst sizes ranging from 0.1 mm to 1.75 mm in radius were formed using the rectangular, Hamming, Nuttall, 1-tap QCLS, and 7-tap QCLS experimental ISRs (see FIG. 19). A representative realization of the simulated B-mode images for all the different ISRs is shown in FIGS. 21A23A (image 2002 using the rectangular experimental ISR), 21B23B (image 2004 using the Hamming experimental ISR), 21C23C (image 2006 using the Nuttall experimental ISR), 21D23D (image 2008 using the 1-tap experimental ISR) and 21E23E (image 2010 using the 7-tap experimental ISR). All images 2002, 2004, 2006, 2008 and 2010 were envelope detected and log compressed to 40 dB. These images show a 5 mm by 5 mm region surrounding a 0.5 mm radius cyst. The QCLS weights were designed for a 0.35 mm radius. The cyst in the image 2002 made using the rectangular apodized ISR is corrupted with clutter from the response's high sidelobes. The speckle size is finer than the other images due to the ISR's narrow mainlobe. The Nuttall image 2006 has much larger speckle size due to the large mainlobe width of the response, which severely blurs the cyst. The Hamming 2004 and the 1-tap QCLS 2008 ISRs produced similar images, with the 1-tap ISR arguably reducing the clutter inside the cyst to a greater degree. The 7-tap ISR image 2010 clearly outperformed all the conventional windows, reducing clutter inside the cyst and sharpening the cyst boundary. The actual size and shape of the cyst 2010 is shown in FIG. 23F for comparison.

Figure 24A:
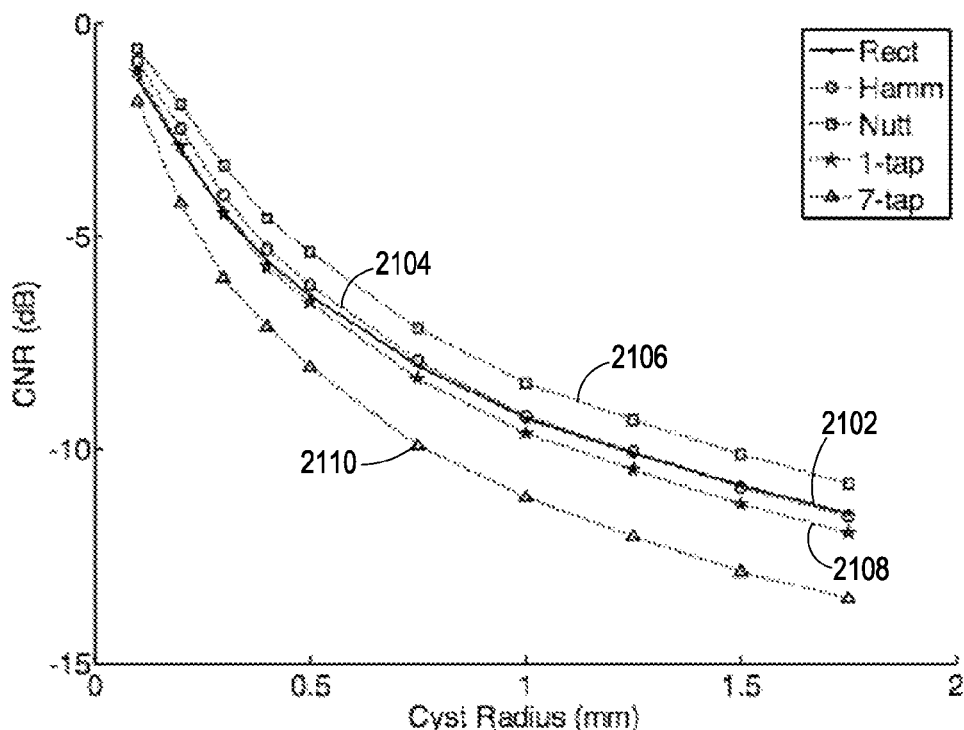
FIGS. 24A-24B plot cyst CNR curves computed from equation (11) as a function of cyst radius.
Figure 24B:
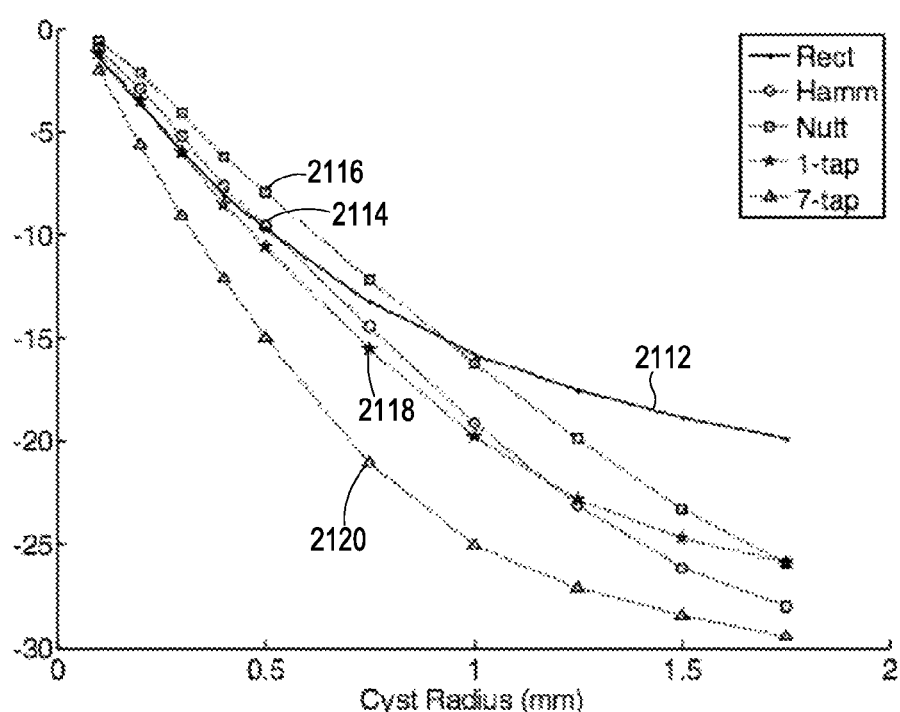

FIGS. 24A-24B plot cyst CNR computed from equation (11) as a function of cyst radius, by using one thousand different images for each cyst size. The images in FIGS. 23A-23E are just one realization with one cyst size. The mean CNR values are plotted in FIGS. 24A-24B, as computed over the 1000 trials. A more negative contrast value indicates better performance. FIG. 24A shows plots 2102, 2104, 2106, 2108, 2110 corresponding to a computed contrast at a cyst size that is the same size as the imaged cyst (100% plot) for the rectangular image 2002, Hamming image 2004, Nuttall image 2006, 1-tap image 2008 and 7-tap image 2010, respectively. FIG. 24B shows plots 2112, 2114, 2116, 2118, 2120 corresponding to a computed contrast assuming a smaller cyst size than the imaged cyst (70% plot) for the rectangular image 2002, Hamming image 2004, Nuttall image 2006, 1-tap image 2008 and 7-tap image 2010, respectively. The smaller cyst size is assumed for the computations reported by plots in FIG. 24B in order to reduce edge effect corruption in the CNR calculations. Contrast improved with increasing cyst radius for all windows. Computing contrast with the true cyst size resulted in a 2 dB improvement in B-mode CNR for the 7-tap response. Computing contrast with 70% of the true cyst size resulted in a 4-10 dB CNR improvement for the 7-tap response over the conventional windows. These results reinforce the qualitative improvements seen in the B-mode images of FIG. 23D relative to FIGS. 23A-23C.

Example 5

Robust FIR Beamforming

Figure 25A:
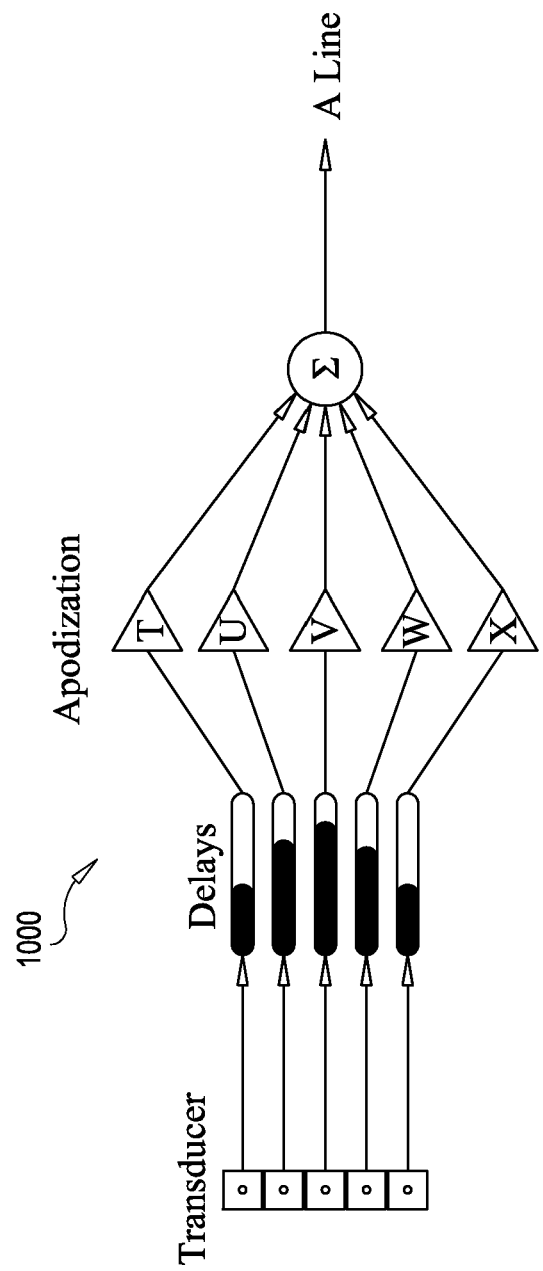
FIGS. 25A-25D show schematic representation of various beamformers, results from which are compared in some of the examples herein.

Comparisons were made between the imaging performances of two beamforming architectures according to the present invention an SMF beamformer 1150 and the conventional delay-and-sum beamformer 1000. Simplified depictions of all the different beamformers are shown in FIGS. 25A-25D. FIG. 25A shows a conventional DAS beamformer 1000 like that described above with regard to FIG. 1.

Figure 25B:
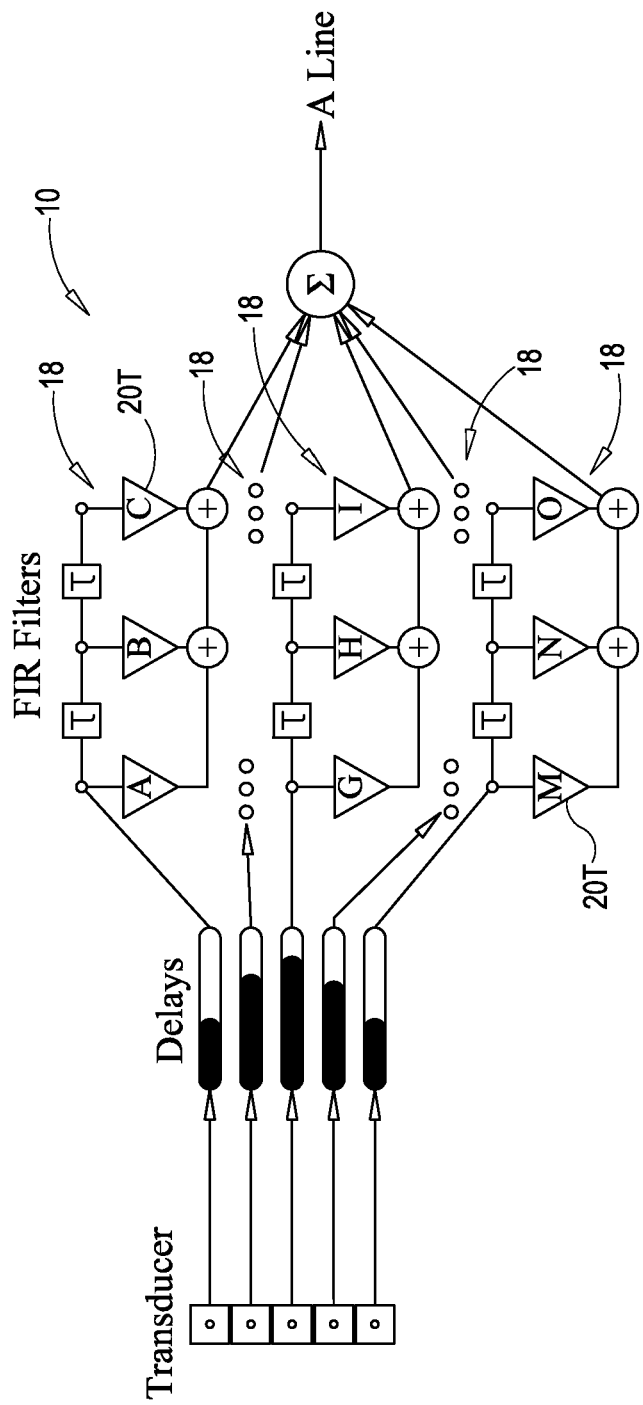

FIG. 25B illustrates a FIR beamformer 10 like that described in regard to FIG. 2 above. Note that although only three taps per filter are shown in FIG. 25B, that this is for illustration purposes only and that the number of taps may be varied in the same manner as described above. FIR beamformer 10 is referred to here as a "dynamic focus" FIR beamformer, as the FIR filters 18 are spatially and temporally variant, and can be updated for each output pixel in the final image.

Figure 25C:
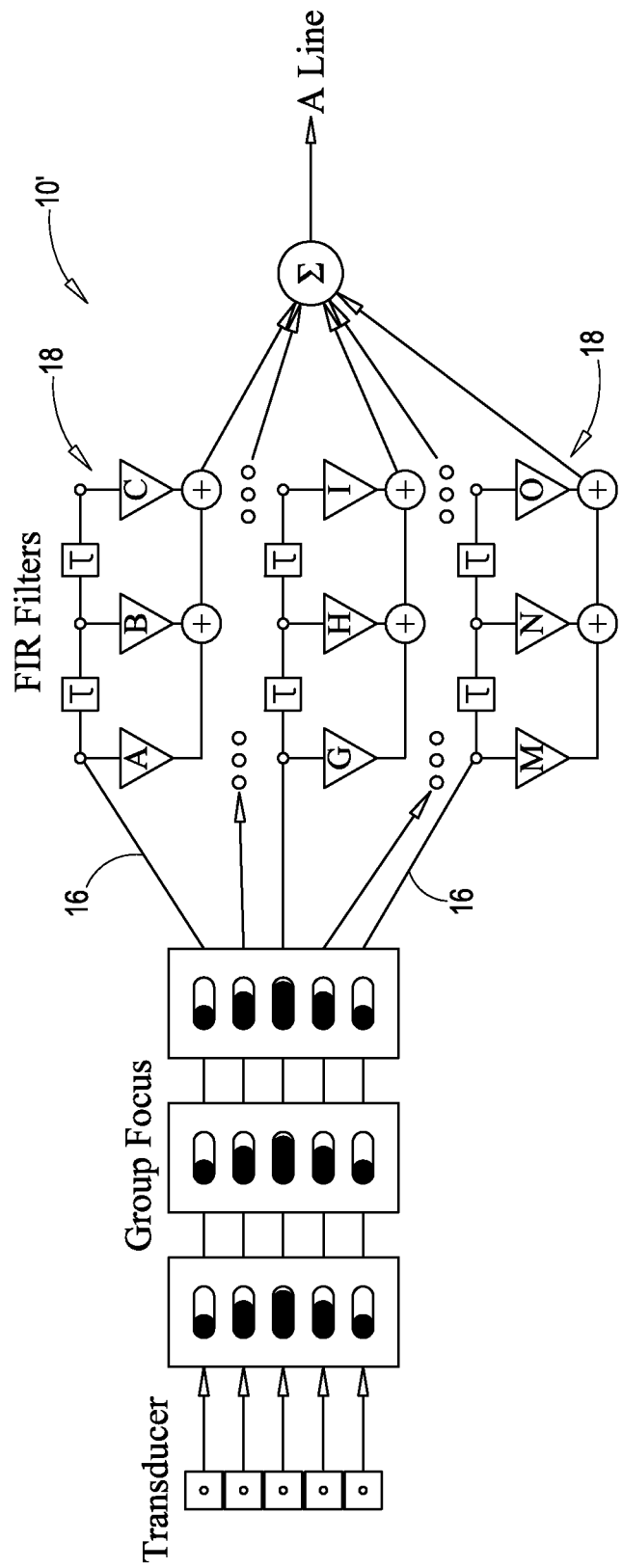
Figure 25D:
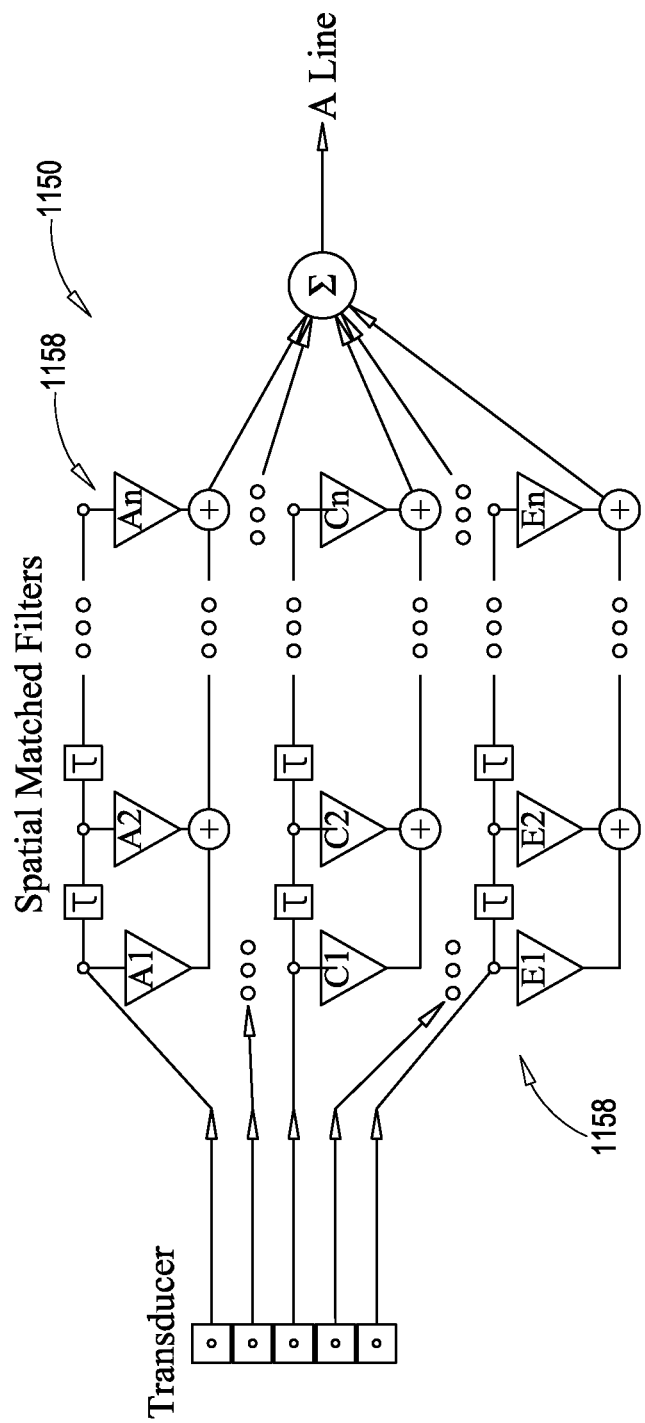

The spatial matched filter (SMF) beamformer 1150 shown in FIG. 25D also uses spatially and temporally variant FIR filters 1158 on each receive channel 16. The filters 1158 of the SMF beamformer 1150 focus the incoming RF data. While the SMF beamformer 1150 does not require any delay lines, the filters 1158 must be long enough to account for the pulse length and delay curvature of the returning echoes. The filter weights for both beamformers are independent of the receive echoes; hence these beamformers are not adaptive.

The "group focus" FIR beamformer 10' shown in FIG. 25C does not dynamically focus the RF data at each filter tap 20T. For example, the 3-tap 20T FIR filters 18 of the dynamic focus FIR (DF-FIR) beamformer 10 in FIG. 25B provide as outputs three different dynamic receive foci in one output sample. In contrast, the RF data for all the channel taps 20T of a FIR filter 18 in the beamformer 10' have the same one fixed receive focus. A simplified schematic of beamformer 10' is shown in FIG. 25C, and referred to as a "group focus" FIR (GF-FIR) beamformer. The group focus stage is required to apply the same receive focal delay profile to multiple samples on each channel. For the 3-tap example of FIG. 25C, this means that three consecutive samples of RF data all with the same dynamic focal delay are used to create one output sample. The tap length and filter weights of the GF-FIR beamformer 10' are tunable parameters. The weights for the DF-FIR beamformer 10 and GF-FIR beamformer 10' are computed using the robust QCLS apodization design algorithm, whereas, the SMF beamformer weights theoretically maximize the beamformer's output SNR in the presence of white noise.

To perform the comparisons, a 64 element, one-dimensional linear array 2 operating at 6.5 MHz and 75% fractional bandwidth was simulated in DELFI, and nine instantaneous spatial responses were measured in the azimuth-range plane. Each ISR had a different receive foci separated in range by 19.3 µm (equivalent to a 40 MHz filter sampling rate assuming a sound speed of 1540 m/s). These ISRs were required to calculate the unique 1, 3, 5, 7, and 9-tap FIR filters 18 for the DF-FIR beamformer 10 with a transmit focus at 2 cm (f/2) and a receive focus at 1.0 cm (f/1).

A different set of spatial responses was simulated in order to characterize the SMF beamformer 1150. The simulated acoustic pulse was 47 samples in length at 40 MHz sampling, so 47 spatial responses for each receive channel separated in time by 25 ns were acquired. These ISRs all had a receive focus of 1.0 cm but were measured at different instants in time. A spatial matched filtered single element response was formed by multiplying each receive channel ISR with the associated temporal acoustic pulse sample and then summing all the 47 spatial responses in time. The ISRs for the SMF beamformer 1150 were prefocused in order to save computation time and memory. Prefocusing does not change the output of the SMF beamformer 1150. The 47 ISRs originally computed for each receive channel were also used for the GF-FIR beamformer 10'. Due to memory constraints when implementing the QCLS algorithm, the longest filters investigated for the DF-FIR 10 and GF-FIR beamformer 10' were 9 taps 20T.

When computing the optimal QCLS apodization weights for the two FIR beamformers 10 and 10', a range of design cyst radii from 0.1 mm to 1.0 mm was used. QCLS apodization profiles were also computed for a range of $\sigma_{design}^2$ values from the optimal CR window to the optimal SNR window, so that these two design parameters ($\sigma_{design}^2$ (design channel SNR) and design cyst radius) could be used to construct the robust FIR-QCLS filters. Once these filters were constructed, their cystic resolution performance as a function of cyst size and robustness to noise as a function of receive channel input SNR ($\sigma_{load}^2$) were quantified. All channel SNR values were calculated based on the middle element of the receive aperture in the DAS beamformer 1000.

Figure 26A:
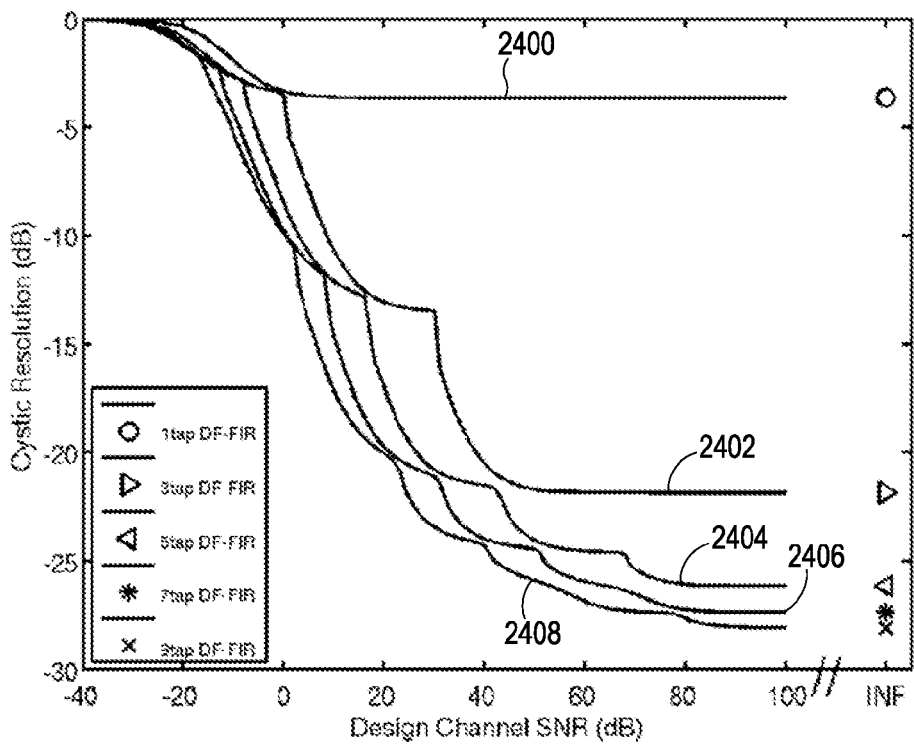
FIGS. 26A-26B show design SNR-CR curves for a DF-FIR beamformer according to the present invention, as well as the CR performance of a rectangular apodized DAS beamformer, and SMF beamformer, and five different 9-tap DF-FIR beamformers.
Figure 26B:
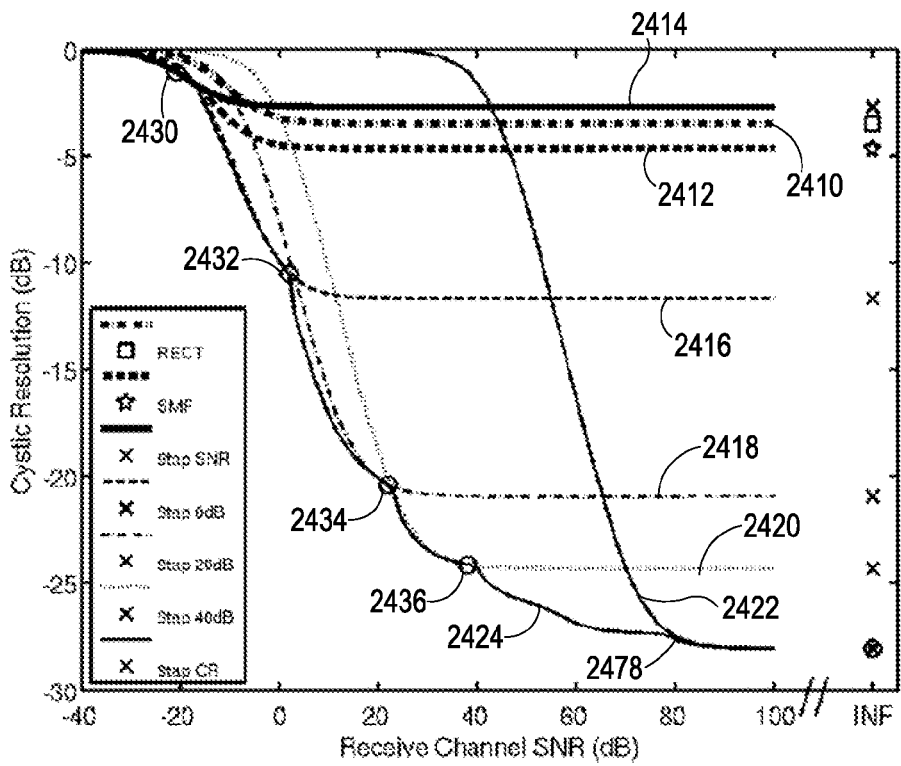

FIGS. 26A-26B show the design SNR-CR curves for the DF-FIR beamformer 10 as well as the CR performance of the rectangular apodized DAS beamformer 1000, the SMF beamformer 1150, and five different 9-tap DF-FIR beamformers 10. FIG. 26A shows the SNR-CR design curves 2400, 2402, 2404, 2406 and 2408 for the 1-tap, 3-tap, 5-tap, 7-tap, and 9-tap DF-FIR beamformers 10, respectively, each with a receive focus of 1.0 cm and a design cyst radius of 0.4 mm. Note that design receive channel SNR ($\sigma_{design}^2$) was varied from infinity to −40 dB. Each point along each of these design curves is associated with a different set of FIR filters 18. The wavy contour of the design curves arises from the eigenvalue spread of the $R_{tot}$ matrix. As tap length increases the curves become smoother. As filter tap length increases, the potential cystic resolution performance increases. FIG. 26B shows the CR curves 2410, 2412, 2414, 2416, 2418, 2420 and 2422 as a function of receive channel SNR for the rectangular apodized DAS 1000, SMF 1150, and five 9-tap DF-FIR 10 beamformers at a design cyst radius of 0.4 mm and receive focus of 1.0 cm, respectively. The SNR-CR design curve 2424 is shown and the operating points for the five different SNR constrained 9-tap DF-FIR beamformers are marked at 2430, 2432, 2434, 2436 and 2438, respectively, along curve 2424. From FIG. 26B it can be seen that the SMF beamformer 1150 offers 2-3 dB gains in cystic resolution and increased sensitivity performance compared to the rectangular apodized DAS beamformer 1000. The optimal CR 9-tap DF-FIR beamformer (i.e., see 2438) improves CR by more than 20 dB but its performance starts to degrade when channel SNR approaches 70 dB. The optimal SNR 9-tap DF-FIR beamformer 10, has worse CR performance than the DAS 1000 and SMF 1150 beamformer but better SNR performance. Using the 9-tap DF-FIR beamformer 10 designed for 20 dB channel SNR offers 15 dB improvement in CR and has a similar SNR performance to the DAS 1000 and SMF 1150 beamformers. Note that in high SNR environments it makes sense to use the 9-tap DF-FIR beamformer 10 designed for 40 dB channel SNR, or in worse SNR environments to use the 9-tap DF-FIR beamformer 10 designed for 0 dB channel SNR.

Figure 27A:
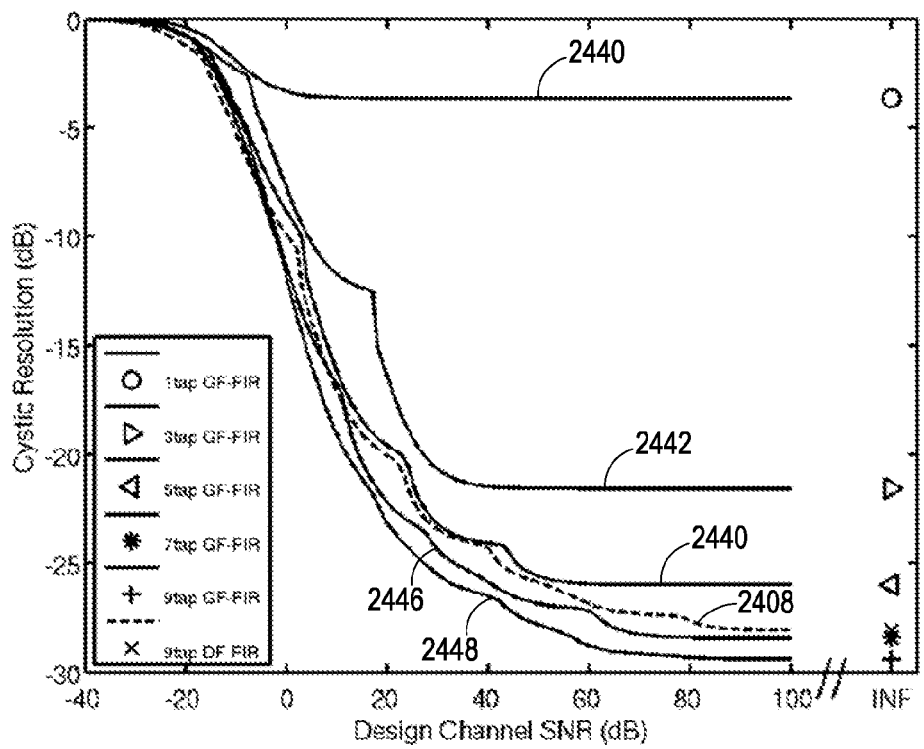
FIGS. 27A-27B show design SNR-CR curves for a GF-FIR beamformer according to the present invention as well as the CR performance of a rectangular apodized DAS beamformer, an SMF beamformer, and three different 9-tap GF-FIR beamformers.
Figure 27B:
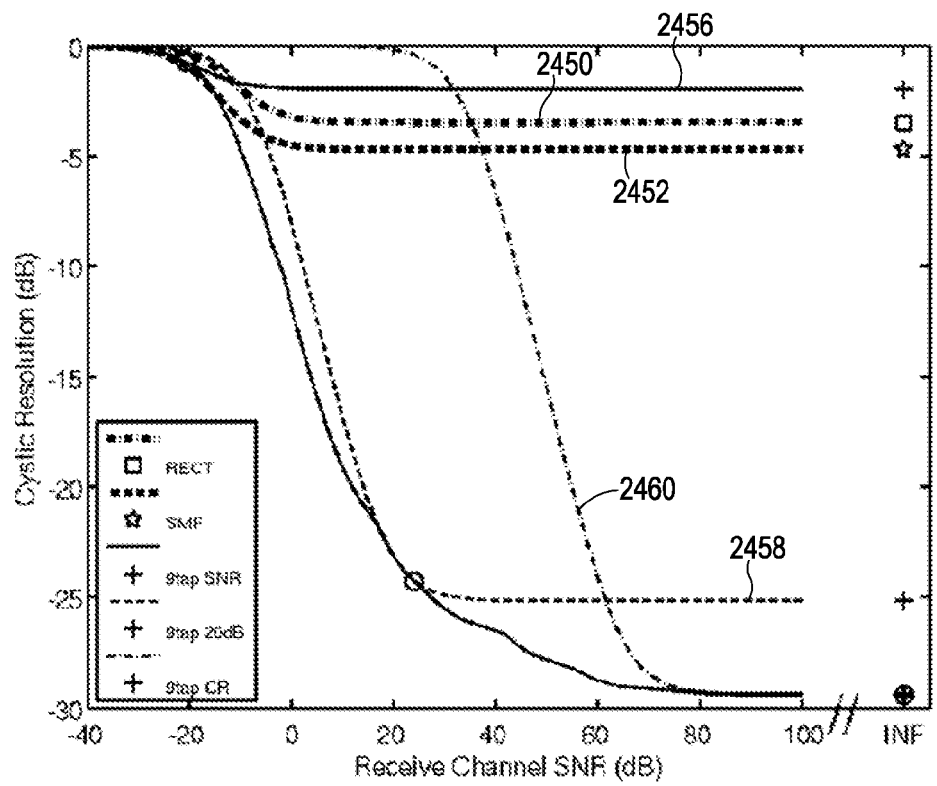

FIGS. 27A-27B show the design SNR-CR curves for the GF-FIR beamformer 10' as well as the CR performance of the rectangular apodized DAS beamformer 1000, the SMF beamformer 1150, and three different 9-tap GF-FIR beamformers 10'. FIG. 27A shows the SNR-CR design curves 2440, 2442, 2444, 2446 and 2448 for the 1-tap, 3-tap, 5-tap, 7-tap, and 9-tap GF-FIR beamformers 10', respectively, and shows curve 2408 of the 9-tap DF-FIR beamformer 10 for comparison, each with a receive focus of 1.0 cm and a design cyst radius of 0.4 mm. Note that design receive channel SNR ($\sigma_{design}^2$) was varied from infinity to −40 dB. The GF-FIR design curves of FIG. 27A show similar trends as the DF-FIR design curves of FIG. 26A, but it is noted that the 7-tap GF-FIR design curve 2446 allows for slightly better performance than the 9-tap DF-FIR design curve 2408 at almost every design channel SNR value.

FIG. 27B shows the CR curves 2450, 2452, 2454, 2456 and 2458 as a function of receive channel SNR for the rectangular apodized DAS 1000, SMF 1150, the optimal CR, optimal SNR and "knee" position 9-tap GF-FIR beamformers 10', respectively. The "knee" 9-tap GF-FIR beamformer 10' offers almost a 20 dB gain in cystic resolution compared to the conventional beamformer 10 as long as channel SNR is greater than 20 Db, as can be seen by comparing curve 2460 with curve 2450. As channel SNR worsens, the CR performance of the "knee" 9-tap GF-FIR beamformer 10' decreases until it achieves similar results to the DAS 10 and SMF beamformer 1150 around 0 dB channel SNR, see curves 2460, 2450 and 2452.

Figure 28:
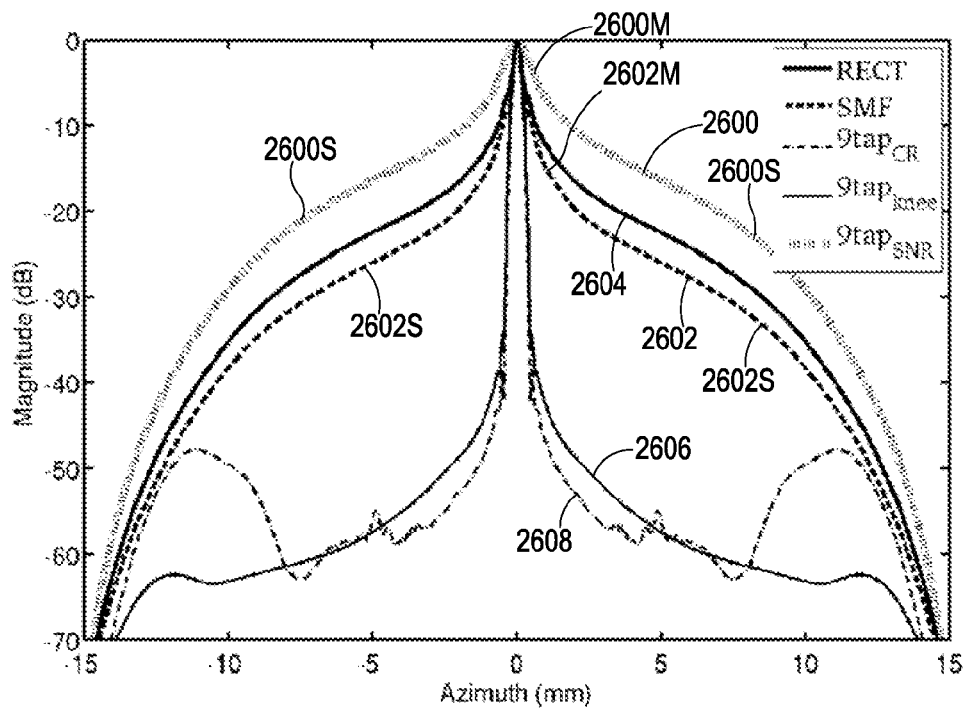
FIG. 28 shows integrated lateral beamplots for various beamformers to illustrate how the sensitivity constrained QCLS algorithm according to the present invention affects the ISR's of a FIR beamformer.

FIG. 28 shows integrated lateral beamplots for the various beamformers to illustrate how the sensitivity constrained QCLS algorithm affects the ISR's of the GF FIR beamformer 10'. These beamplots were made by integrating the energy of the individual ISRs in range and then normalizing each to 0 dB. The optimal SNR 9-tap GF-FIR beamformer 10' (see plot 2600) has the widest mainlobe 2600M and highest sidelobes 2600S hence the decreased CR performance according to the metric. The SMF beamformer 1150 lateral beamplot 2602 has a slightly narrower mainlobe 2602M and lower sidelobes 2602S than the rectangular DAS beamplot 2604. The beamplot for the 9-tap GF-FIR beamplot 2606 based on a selection at the knee of the of the sigmoidal SNR-CR design curve and optimal CR 9-tap GF-FIR beamplot 2608 show dramatically reduced sidelobe energy in the ISR as evidence by the sidelobe levels being much lower than those of the other three curves.

With regard to the weights associated with the three operating points for the 9-tap GF-FIR beamformer 10' (CR 2608, knee 2606 and SNR 2600, the temporal frequency of the filter taps 20T increases as the beamformer selected moves from optimal SNR (e.g., see curve 2600) to optimal CR (e.g., see curve 2608). The optimal SNR window functioned as a low pass filter, the optimal CR window had high pass characteristics, and the "knee" window had bandpass characteristics with the filter's center frequency slightly above 6.5 MHz. All filters had nonlinear phase characteristics and as the comparison of the windows moved from optimal SNR to optimal CR the phase response became more discontinuous across the aperture. The frequency response differences between the "knee" and optimal CR 9-tap QCLS filters explained how the "knee" filters improved SNR performance, as the knee filters kept more of the signal bandwidth compared to the optimal CR filters.

Figure 29A:
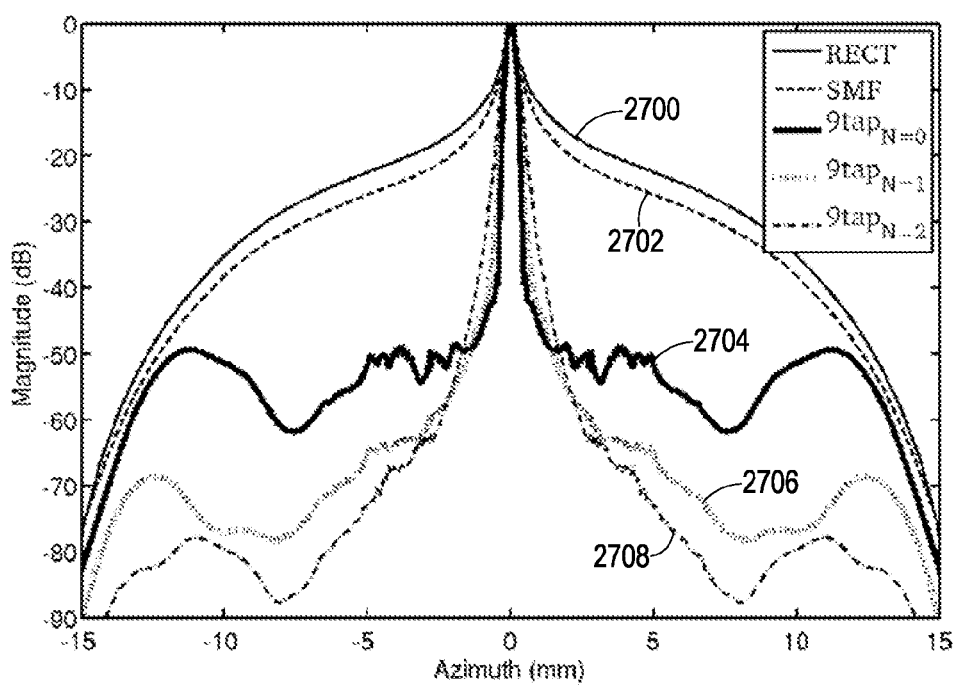
FIG. 29A shows integrated lateral beamplots for a rectangular apodized DAS beamformer, an SMF beamformer, and a 9-tap DF-FIR beamformer as the weighting term assigned to ISR energy further away from the focus increases (N=0, N=1, and N=2), respectively.
Figure 29B:
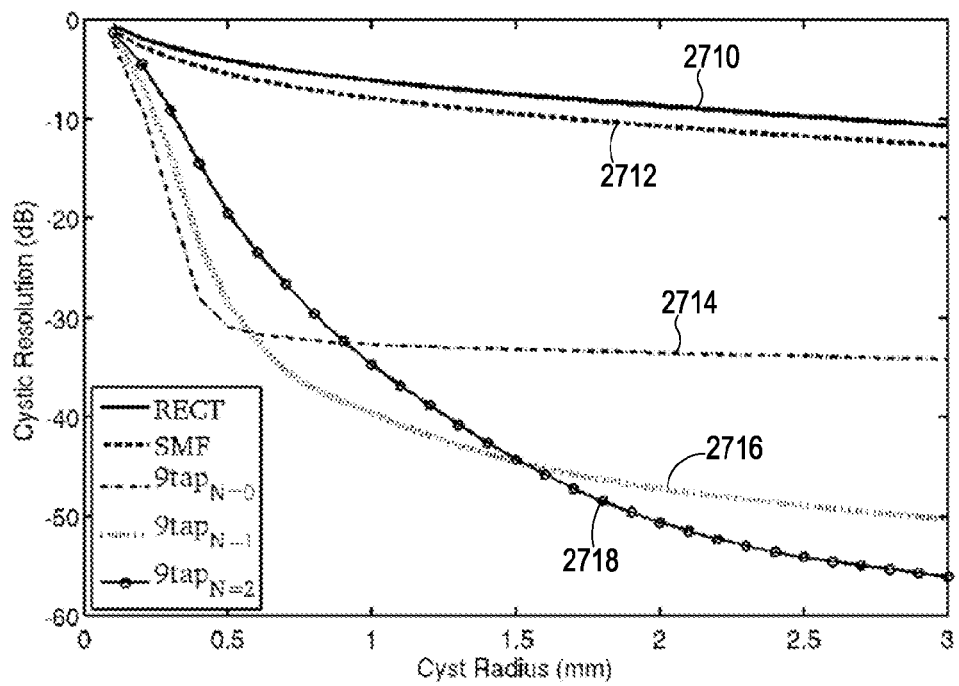
FIG. 29B shows cystic resolution curves as a function of cyst radius for the beamformers referred to in FIG. 29A.
Figure 29C:
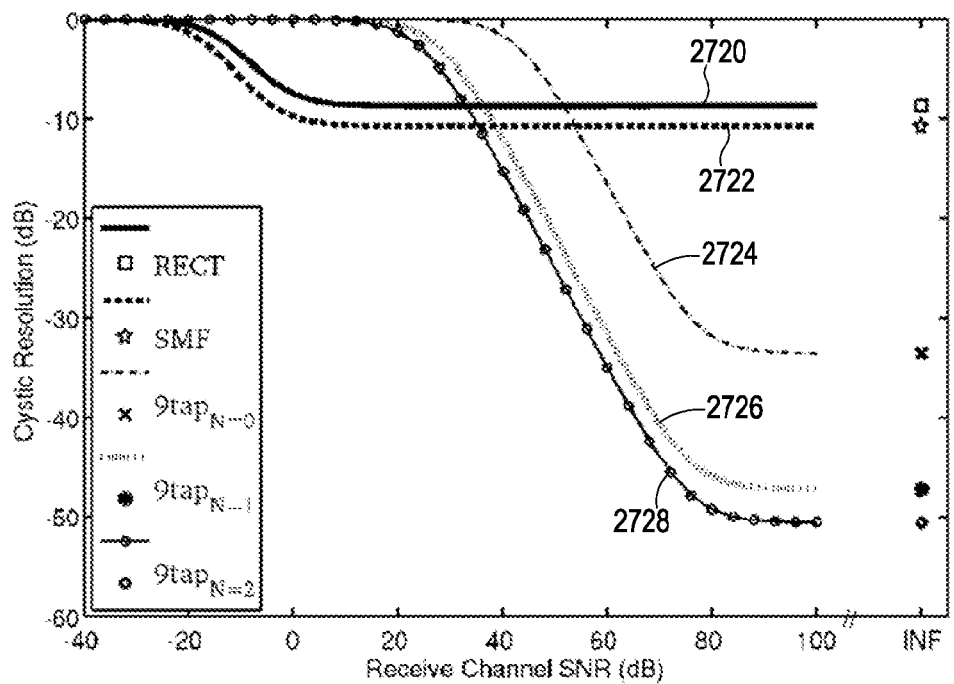
FIG. 29C shows the CR performance as a function of channel SNR for the five beamformers referred to in FIGS. 29A-29B, respectively.

A weighting function to the QCLS algorithm, as described above, was also investigated. The weighting function used emphasized ISR energy further away from the receive focus, hence, the resulting weighted ISRs were expected to show faster sidelobe rolloff compared to ISRs produced using FIR filters computed using the QCLS algorithm without the weighting function. FIG. 29A shows integrated lateral beamplots 2700, 2702, 2704, 2706 and 2708 for rectangular apodized DAS beamformer 1000, SMF beamformer 1150, and 9-tap DF-FIR beamformer 10 as the weighting term assigned to ISR energy further away from the focus increases (N=0, N=1, and N=2), respectively. FIG. 29B shows cystic resolution curves 2710, 2712, 2714, 2716 and 2718 as a function of cyst radius for the rectangular apodized DAS beamformer 10, SMF beamformer 1150, and 9-tap DF-FIR beamformer 10 for focuses of N=0, N=1, and N=2, respectively. The figure shows how the cystic resolution performance increases for larger cysts as the weighting term assigned to ISR energy further away from the focus increases (N=0, N=1, and N=2). The 9-tap WQCLS-FIR filters had a design cyst radius of 0.4 mm and an infinite design SNR (optimal CR operating point). It is interesting to note that the linearly weighted (N=1) 9-tap WQCLS-FIR filters only reduced contrast by a few dB compared to the unweighted 9-tap filters for the smaller cysts but offered a 15 dB gain in cystic resolution at the larger cyst sizes. The quadratically weighted (N=2) WQCLS-FIR filters suffered more for the smaller cysts but achieved the best cystic resolution for cysts larger than 3 mm in diameter. Large improvements were noted in all of the curves for the 9-tap WQCLS FIR filters as compared to the curves of the conventional DAS 1000 beamformer and the SMF beamformer 1150. The integrated lateral beamplots of FIG. 29A show how the weighting function can be used to decrease sidelobes for a slight increase in mainlobe width. FIG. 29C shows the CR performance as a function of channel SNR 2720, 2722. 2724, 2726 and 2728 for the five beamformer 1000, 1150, 10 (N=0), 10 (N=1) and 10 (N=2), respectively, at a constant cyst radius of 2.0 mm. Each 9-tap beamformer's cystic resolution performance begins to degrade as the channel SNR approaches 70 dB. The quadratically weighted 9-tap WQCLS-FIR beamformer 10 outperforms the rectangular DAS beamformer 1000 until channel SNR reaches 30 dB Example 6

Performance of the Robust DF-FIR Beamformer in the Presence of Phase Aberration

Example 2 above showed that aberrated non-robust FIR beamformer 10 still improved contrast by 10 dB over the unaberrated rectangular DAS beamformer 1000 for a large range of cyst sizes. In this example, a similar analysis was conducted to investigate the performance of the robust DF-FIR beamformer 10 in the presence of aberration.

Recent literature indicates that phase aberrations in the breast can be modeled as a nearfield thin phase screen characterized by a root mean square (RMS) amplitude strength of 28 ns and a full-width at half-maximum (FWHM) correlation length of 3.6 mm, see Flax et al., "Phase aberration correction using signals from point reflectors and diffuse scatterers: Basic Principles", IEEE Transactions on Ultrasonics, Ferroelectrics and Frequency Control, Vol. 35, pp 758-767, 1988 and Dahl et al., "Adaptive imaging on a diagnostic ultrasound scanner at quasi real-time rates", IEEE Transactions on Ultrasonics, Ferroelectrics and Frequency Control, vol. 53, pp 1832-1843, 2006, both of which are hereby incorporated herein, in their entireties, by reference thereto. A nearfield phase screen aberrator was simulated to distort the DF-FIR beamformer 10 ISR. Data from 150 realizations of a one-dimensional aberrator were used to get good statistics. To construct the aberrators, 150 random processes with an a priori 28 ns RMS strength and an a priori 3.6 mm FWHM correlation length were generated. Each aberrator distorted the instant in time at which each receive channel's spatial response was calculated. Note that the same aberration would apply to all the ISRs required for the input into the DF-FIR beamformer 10.

Figure 30A:
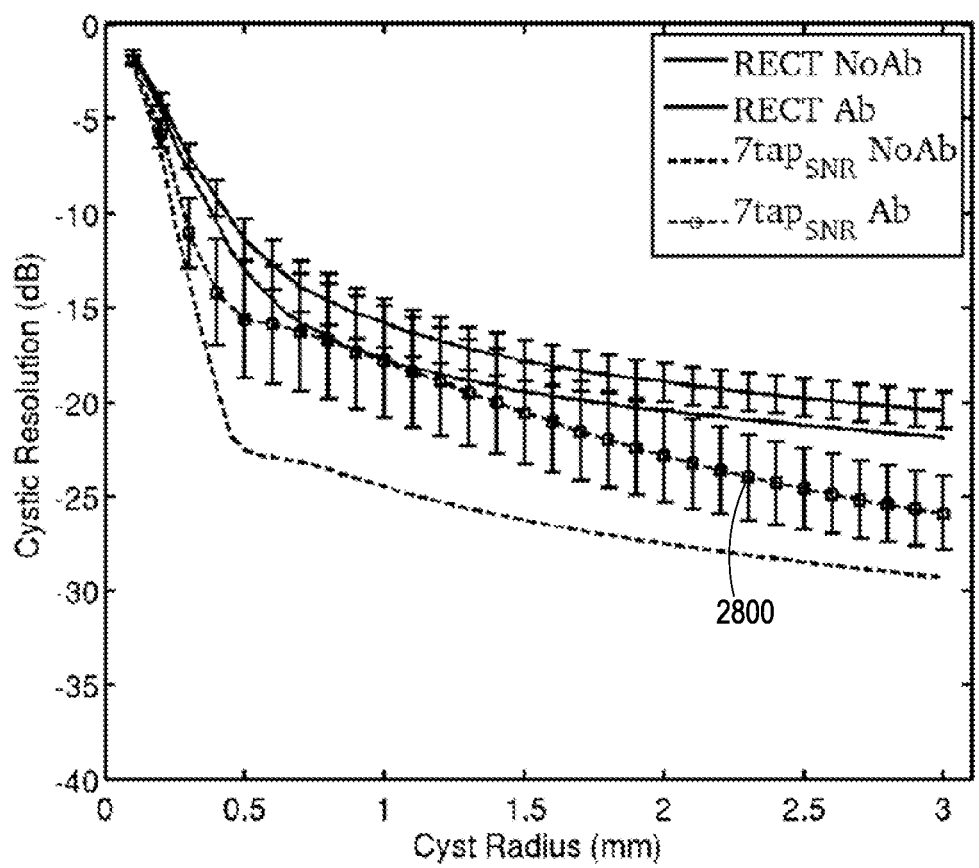
FIGS. 30A-30C show results of aberration simulations using three operating points for a 7-tap DF-FIR beamformer according to the present invention.
Figure 30B:
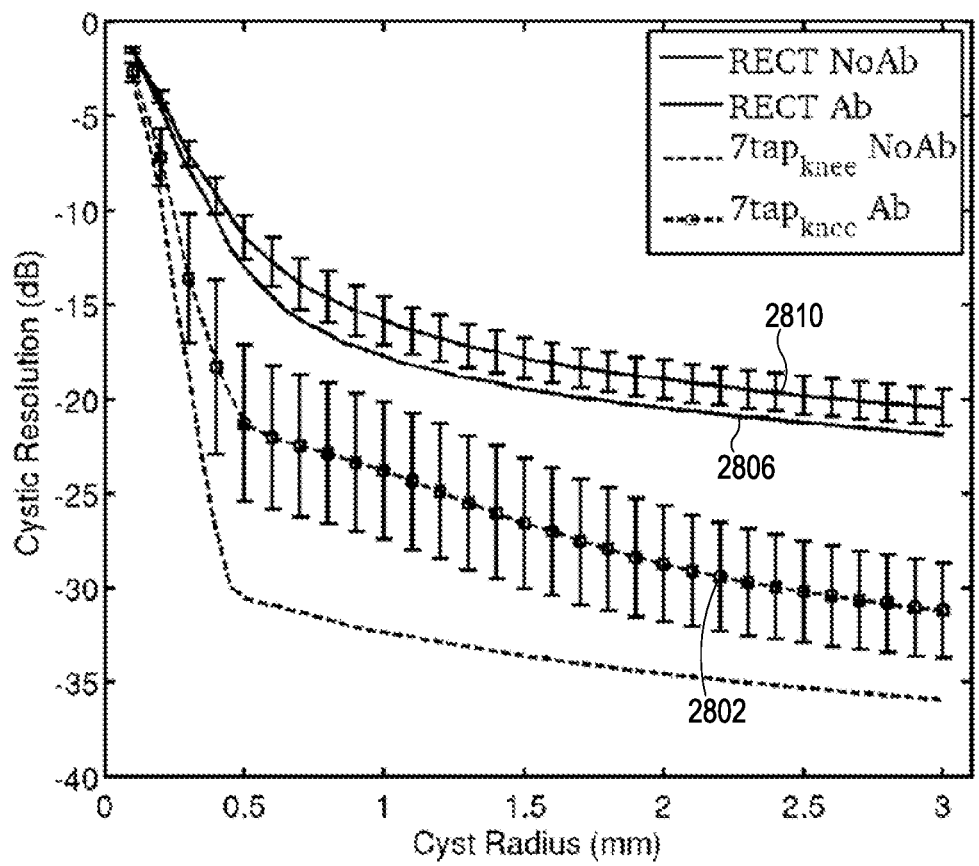
Figure 30C:
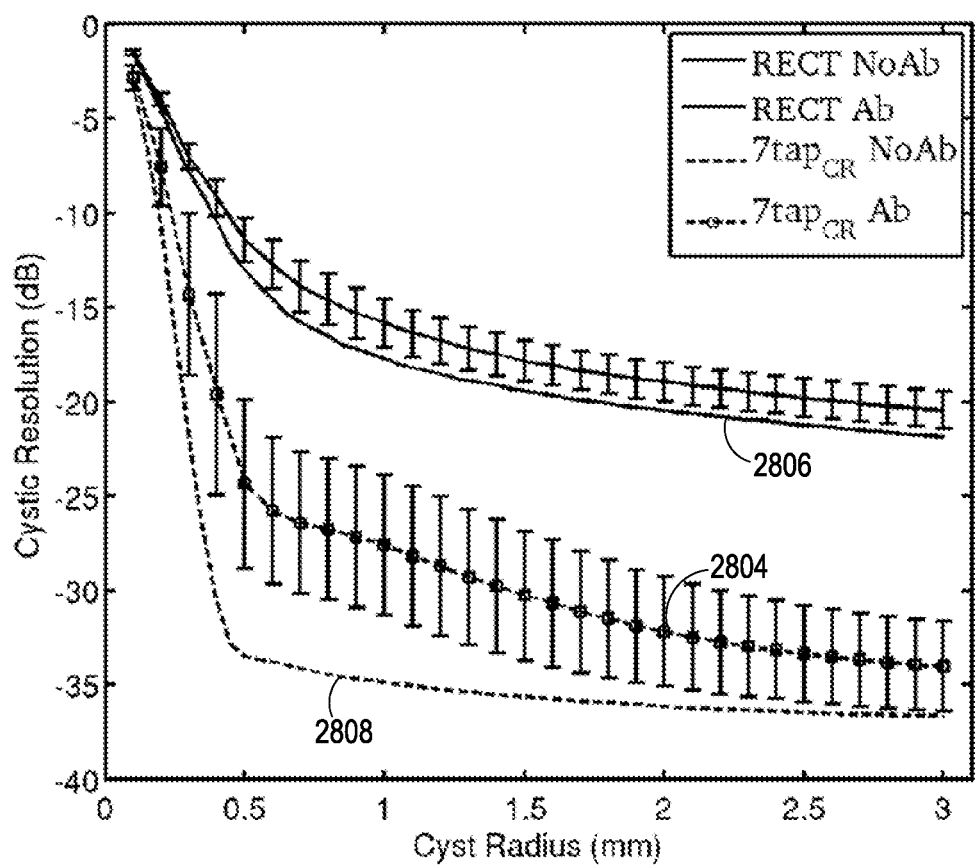

FIGS. 30A-30C show results of the aberration simulations using three operating points for the 7-tap DF-FIR beamformer. Cystic resolution curves (at infinite SNR) were plotted across a range of cyst radii from 0.1 mm to 3.0 mm. Cystic resolution was computed after centering the cyst about the peak of the aberrated ISR for each beamformer. While this assumed spatial shift invariance of the ISR over a small range, the cystic resolution metric was applied consistently. From the 150 aberration realizations, the mean and standard deviation of the cystic resolution for each cyst size was calculated. From FIGS. 30A-30C, it is clear that both the rectangular apodized DAS beamformer 1000 and 7-tap DF-FIR beamformer 10 experience degradation in cystic resolution performance due to aberration. However, it appears that all three 7-tap FIR beamformers 10 were relatively robust to phase aberration as indicated by curves 2800, 2802 and 2804. The cystic resolution performance for the "knee" and optimal CR 7-tap DF-FIR beamformers (i.e., as shown by curves 2802 and 2804, respectively) performed better in aberration than the unaberrated rectangular DAS beamformer 1000 (shown by curve 2806).

Figure 31A:
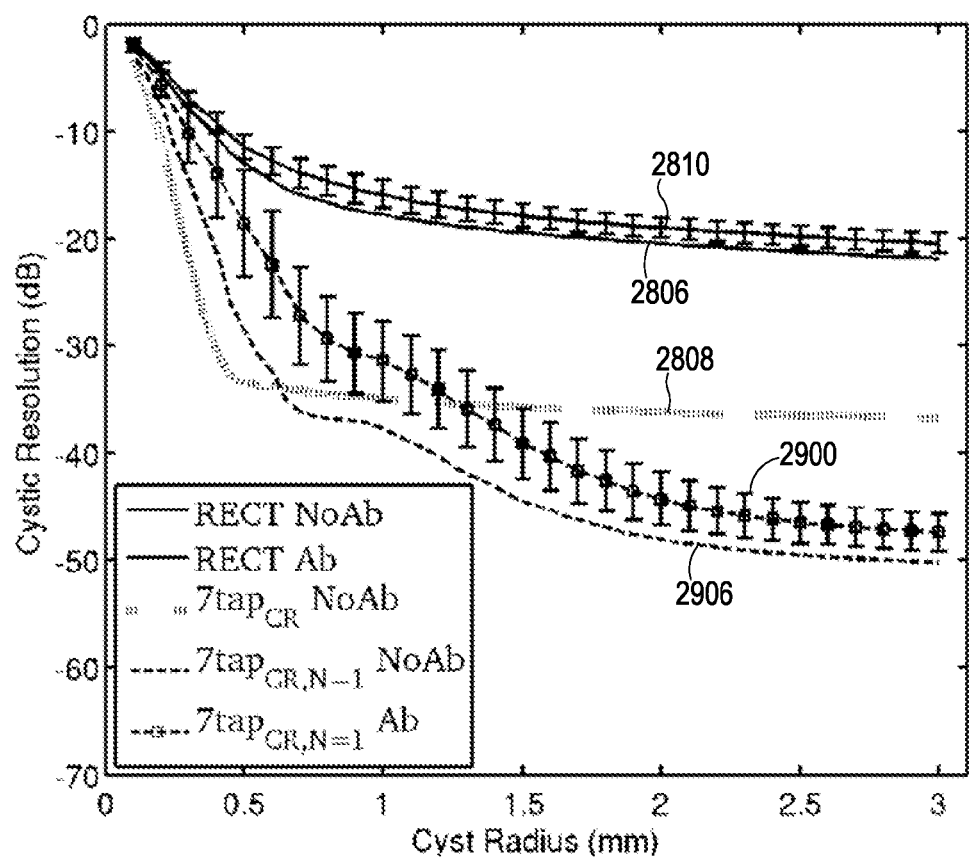
FIGS. 31A-31C show results of aberration simulations using three operating points for a 7-tap DF-FIR beamformer using WQCLS-FIR filters according to the present invention.
Figure 31B:
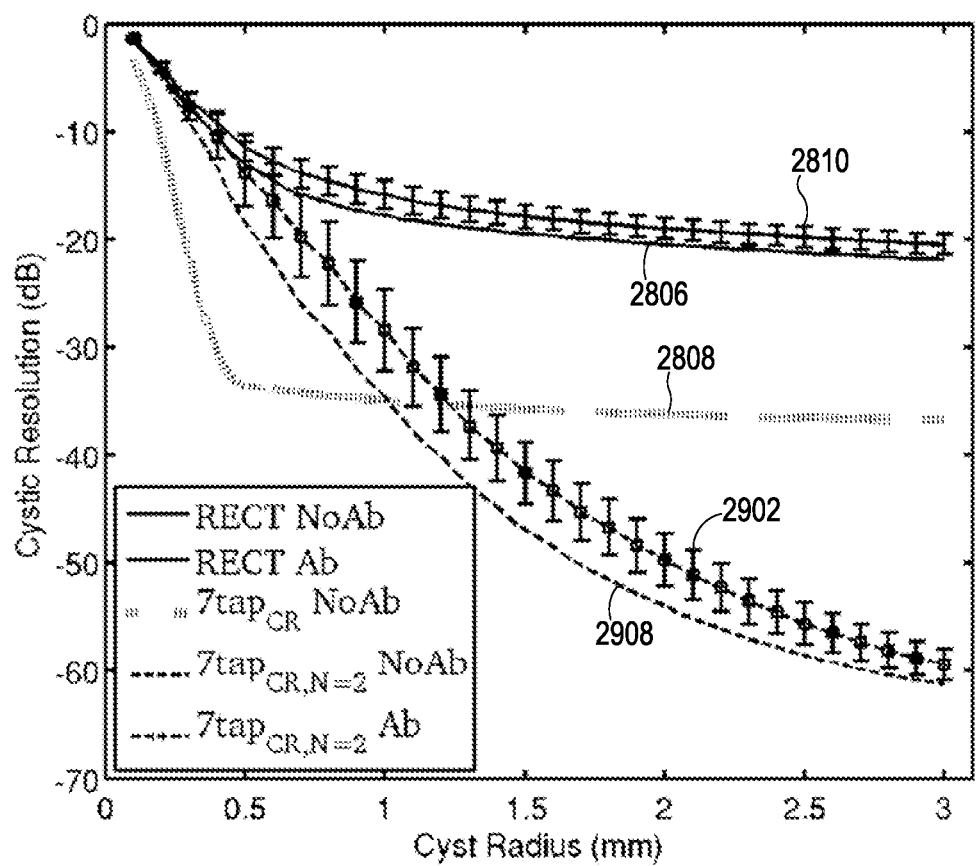
Figure 31C:
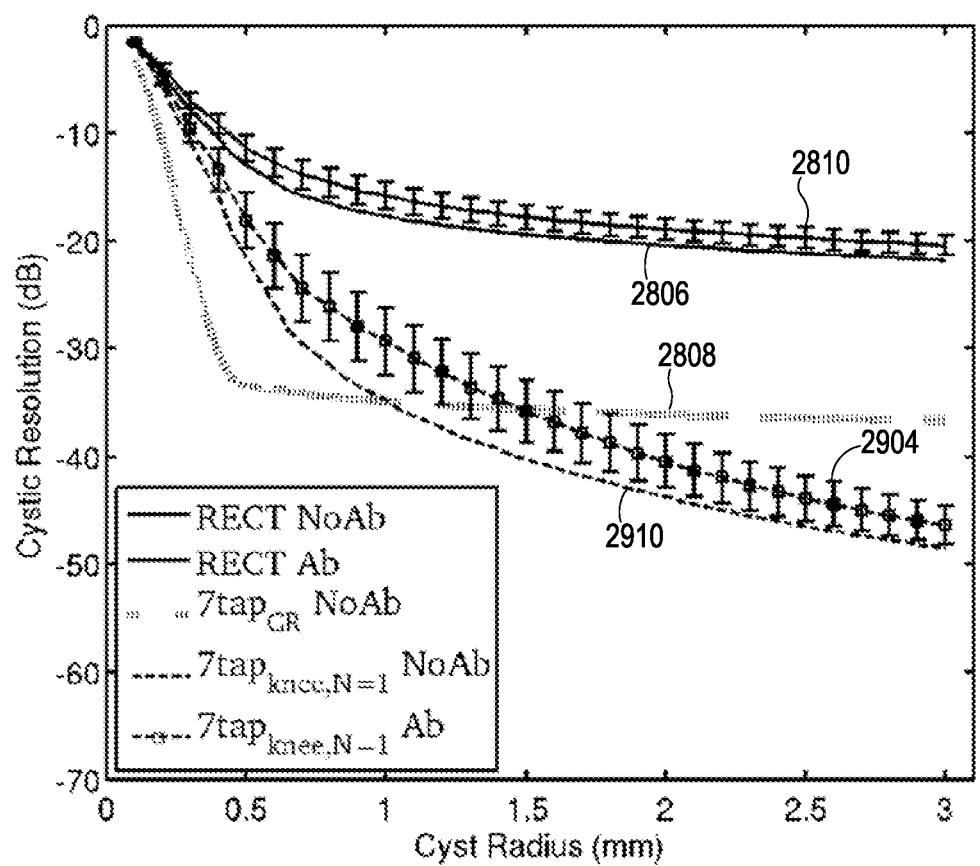

The performance of the weighted 7-tap QCLS filters was also investigated: to determine whether relatively wider mainlobes would be more robust to phase errors. The results from these simulations are shown in FIGS. 31A-31C. Three sets of 7-tap WQCLS-FIR filters for the DF-FIR beamformer were calculated. The first used a linear spatial weighting function (N=1) and infinite design SNR (results shown in FIG. 31A, aberrated 2900, unaberrated 2906), the second used a quadratic spatial weighting function (N=2) and infinite design SNR (results shown in FIG. 31B, aberrated 2902, unaberrated 2908), and the last one used a linear weighting function (N=1) and the "knee" operating point of the design SNR-CR curve (results shown in FIG. 31C, aberrated 2904, unaberrated 2910). Cystic resolution was computed in the same manner as before. The unaberrated optimal CR 7-tap DF-FIR cystic resolution curve 2808 was plotted for reference as well as the aberrated and unaberrated rectangular DAS curves 2810 and 2806, respectively. These results show that the spatial weighting function can be used to design FIR beamformers that are more robust in the presence of tissue induced aberration than the unweighted, optimal CR FIR beamformer (i.e., compare results of each of 2900, 2902 and 2904 to 2808).

Example 7

Comparison of DSIQ and FIR-DSIQ Beamforming

Computer simulations were performed to assess the performance improvements possible by incorporating the FIR apodization scheme of the present invention in concert with DSIQ beamforming. A conventional one-dimensional linear array transducer was simulated and PSFs were computed for both double cycle and transmission seven cycle transmission. This variation was chosen to explore the role of bandwidth in DSIQ-FIR performance. This is of particular interest as DSIQ beamforming is known to perform better when lower bandwidth (more transmit cycles) is used. FIR filter coefficients were designed for both the broadband and narrowband cases and for a cyst diameter of 350 microns. Note that the FIR filter coefficients were not designed using the robust methodology and thus yield some loss in sensitivity.

Simulation results are shown in FIG. 32. The 2-cycle DSIQ beamplot 3203 is the broadest and has the highest sidelobe levels. This is a very poor quality beamplot and would be expected to yield particularly poor image quality. The 7-cycle DSIQ beamplot 3200 has a significantly narrower mainlobe, but still exhibits a high sidelobe level. The 7-cycle DSIQ-FIR beamplot 3204 maintains the narrow mainlobe of the 7-cycle DSIQ beamformer, but lowers the sidelobe levels by roughly 10 dB. This is a dramatic improvement that would be expected to notably improve image contrast. Finally, the 2-cycle DSIQ-FIR beamplot 3206 shows a narrow mainlobe with sidelobes well below those seen for any other beamformer. These results indicate that the combination of FIR apodization with DSIQ beamforming improves imaging performance under all conditions, and enables the DSIQ beamformer to operated with broadband signals. This is particularly important as the conventional DSIQ beamformer cannot operate effectively with narrowband signals.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

That which is claimed is:

1. A method for enhancing contrast resolution of an imaging or sensing system, comprising:
    receiving information from an array of transducers using multiple data channels;
    digitally filtering the received information on the multiple data channels using respective finite impulse response (FIR) filters corresponding to respective data channels, the FIR filters having multiple taps, the taps including tap weights determined (1) as a function of a distance of the array from an object that energy is being transmitted to or reflected from, and (2) corresponding to an a priori system model; and
    aggregating outputs of the finite impulse response filters to provide a sample.

2. The method of claim 1, wherein the digital filtering comprises dynamically adjusting the tap weights.

3. The method of claim 2, wherein the dynamically adjusting the tap weights includes adjusting respective tap weights temporally and spatially.

4. The method of claim 1, wherein the tap weights are established according to varying spatial sensitivity to distances between objects and the transducer array.

5. The method of claim 1, wherein the finite impulse response (FIR) filters comprise separate I and Q channel finite impulse response (FIR) filters.

6. The method of claim 1, wherein the finite impulse response (FIR) filters include tap weights specified to compensate for phase aberration in the data.

7. The method of claim 1, wherein the finite impulse response (FIR) filters include tap weights specified to compensate for amplitude aberration in the data.

8. The method of claim 1, wherein the finite impulse response (FIR) filters include tap weights specified to compensate for spatially distributed aberrations in the data.

9. The method of claim 1, where the aggregating the outputs of the finite impulse response filters to provide a sample includes summing data from the weighted taps across the respective finite impulse response (FIR) filters corresponding to the respective data channels; and
using the samples to generate an image.

10. The method of claim 9, comprising presenting the image to a user.

11. The method of claim 10, comprising updating the image and presenting an updated image to provide real-time imaging to the user.

12. The method of claim 9, wherein using the samples to generate an image includes:
iterating the digital filtering the channels of data and summing data;
generating an A-line when a sufficient number of samples have been provided; and
repeating the iterating, summing, and forming the A-lines until a sufficient number of A-lines have been generated to produce the image.

13. The method of claim 9, wherein using the samples to generate an image includes:
iterating the digital filtering the channels of data and summing data to obtain samples; and
generating an image representation of a specified depth plane or volume using the obtained samples.

14. The method of claim 1, wherein the receiving information from the array of transducers using multiple data channels includes using Direct Sampled In-phase Quadrature (DSIQ) sampling to provide in-phase and quadrature data channels.

15. The method of claim 1, wherein the tap weights are pre-determined.

16. The method of claim 15, wherein the tap weights are pre-determined using a quadratically constrained least squares (QCLS) technique using a cystic resolution metric.

17. The method of claim 16, wherein the quadratically constrained least squares (QCLS) technique includes using a weighted quadratically constrained least squares (WQCLS) technique.

18. The method of claim 15, wherein the tap weights are selected from a look-up table including respective sets of filter weights corresponding to particular FIR apodization profiles.

19. A non-transitory computer-readable medium comprising instructions that, when performed by a processor, cause the processor to perform a method including:
receiving information from an array of transducers using multiple data channels;
digitally filtering the received information on the multiple data channels using respective finite impulse response (FIR) filters corresponding to respective data channels, the FIR filters having multiple taps, the taps including tap weights determined (1) as a function of a distance of the array from an object that energy is being transmitted to or reflected from, and (2) corresponding to an a priori system model; and
aggregating outputs of the finite impulse response filters to provide a sample;
wherein the finite impulse response (FIR) filters comprise separate I and Q channel finite impulse response (FIR) filters; and
wherein the receiving information from the array of transducers using multiple data channels includes using Direct Sampled In-phase Quadrature (DSIQ) sampling to provide in-phase and quadrature data channels.

20. A system for enhancing contrast resolution for imaging or sensing, the system comprising:
an array of sensors electrically connected to a plurality of channels for performing at least one of receiving and sending the multiple channels of data; and
finite impulse response (FIR) filters connected respectively to respective channels of the plurality of channels, the FIR filters having multiple taps, the taps including tap weights determined (1) as a function of a distance of the array from an object that energy is being transmitted to or reflected from, and (2) corresponding to an a priori system model; and
a processor configured to aggregate outputs of the finite impulse response filters to provide a sample.

* * * * *